United States Patent [19]
Kobayashi et al.

[11] Patent Number: 5,552,448
[45] Date of Patent: Sep. 3, 1996

[54] PLASTIC FOAM MATERIAL COMPOSED OF THERMOPLASTIC RESIN AND SILANE-MODIFIED THERMOPLASTIC RESIN AND METHOD FOR MAKING SAME

[75] Inventors: Tomoyuki Kobayashi; Kenji Miyazaki, both of Kyoto; Masanori Nakamura, Osaka, all of Japan

[73] Assignee: Sekisui Chemical Co., Ltd., Osaka, Japan

[21] Appl. No.: 309,960

[22] Filed: Sep. 21, 1994

[30] Foreign Application Priority Data

Sep. 21, 1993 [JP] Japan ..................................... 5-235037

[51] Int. Cl.$^6$ .................................................. C08G 77/00
[52] U.S. Cl. .......................... 521/154; 521/50; 521/73; 521/79; 521/82; 521/92; 521/93; 521/94; 521/134; 521/139; 521/140; 525/88; 525/89; 525/100; 264/41; 264/45.9; 264/51
[58] Field of Search ................................ 521/50, 73, 79, 521/82, 92, 93, 94, 134, 139, 140, 154; 525/88, 89, 100; 264/41, 45.9, 51

[56] References Cited

U.S. PATENT DOCUMENTS

| | | | |
|---|---|---|---|
| 4,351,876 | 9/1982 | Doi et al. | 428/349 |
| 4,413,066 | 11/1983 | Isaka et al. | 521/149 |
| 4,702,868 | 10/1987 | Pontiff et al. | 264/50 |
| 4,753,992 | 6/1988 | Umpleby | 535/100 |
| 4,870,111 | 9/1989 | Donuiff et al. | 521/60 |
| 5,026,736 | 6/1991 | Pontiff | 527/60 |

FOREIGN PATENT DOCUMENTS

| | | |
|---|---|---|
| 0181637 | 5/1986 | European Pat. Off. . |
| 0279668 | 8/1988 | European Pat. Off. . |
| 0280993 | 9/1988 | European Pat. Off. . |
| 57-0025627 | 2/1982 | Japan . |
| 59-0174101 | 8/1984 | Japan . |
| 59-0225492 | 10/1984 | Japan . |
| 59-0265875 | 12/1984 | Japan . |
| 2-0118121 | 5/1990 | Japan . |

*Primary Examiner*—Samuel A. Acquah
*Attorney, Agent, or Firm*—Morrison Law Firm

[57] ABSTRACT

A plastic foam material composed of a blended resin composition which includes at least two thermoplastic resins and a silane-modified based resin. The blended resin composition consists essentially of 100 parts by weight of at least two thermoplastic resins, from about 1 to about 50 parts by weight of a silane-modified, cross-linked, thermoplastic resin; from about 0.001 to about 2.5 parts by weight of a cross-linking catalyst for use in a silane compound and from about 1 to about 20 parts by weight of a foaming agent. According to one embodiment of the present invention, the thermoplastic resins include at least two substantially incompatible and substantially uncross-linked thermoplastic resins, while in another embodiment the two thermoplastic resins need not be substantially incompatible. The blended resin composition may further include reinforcers such as glass fibers and filler. The thermodecomposition foaming agent decomposes at sufficiently high temperatures to yield a plastic foam material. The resultant plastic foam material, in turn, exhibits superior resilience, improved compression strength and superior heat-insulating properties. A method to produce the plastic foam material from foamable tubes and foamable pieces is also disclosed.

40 Claims, 13 Drawing Sheets

PLASTIC FOAM MATERIAL COMPOSED OF THERMOPLASTIC RESIN AND SILANE-MODIFIED THERMOPLASTIC RESIN AND METHOD FOR MAKING SAME

BACKGROUND OF THE INVENTION

This invention relates to a plastic foam material. More specifically, this invention relates to a plastic foam material composed of a blended resin composition containing thermoplastic resins and a silane-modified resin (hereinafter referred to as "plastic foam material") and products derived therefrom. The present invention is also directed to a method of making the plastic foam material.

The present invention is also directed to a plastic foam material which has resin walls which include lattice-shaped or honeycomb-shaped cross-sections with foam inside. The present invention also relates to a method for making the same.

The plastic foam material of the present invention and products derived therefrom exhibit improved softness and superior heat-insulating properties. They are thus capable of being used as heat-insulating materials. Because of their softness, superior heat-insulating properties and lightness, products derived from the plastic foam material of the present invention, can be used extensively in many applications in different fields.

Products composed of the plastic foam material of the present invention are well suited for use as building materials. Such building materials include ceilings and installment panels. Due to their superior heat-insulating properties, the plastic foam material will find widespread use as aircraft, train and automobile components such as panels and seating. Various plastic foam material composed of resin compositions are commercially available but almost all of them are inferior in either heat resistance or foam generation. Most prior resin compositions which form prior art plastic foam materials exhibit excessive gel fractions and inner stresses imparting inferior qualities to conventional plastic foam materials and their derived products.

Notwithstanding increased heat resistance properties of conventional plastic foam materials, prior art plastic foam materials are well known for generating less foam and yielding foam materials that have inadequate compression strength. Accordingly, conventional plastic foam materials and their derived products are not suited for use inside buildings, as building materials or as materials for use inside automobiles, trains, and aircraft.

Many attempts have been proposed to overcome the aforementioned drawbacks. Unfortunately, to date the proposed improvements have been insufficient.

One such attempt at improving the overall quality of prior art plastic foam materials, disclosed in Japanese Laid Open Patent Publication S 58-134131, includes using a cross-linked polypropylene based resin composition as the starting material. The cross-linked polypropylene based resin composition further includes a silane-modified polypropylene based resin, together with a silanol condensation catalyst and a foaming agent.

However, the proposed resin composition is plagued by numerous drawbacks. Chief among them is the even cross-linking among the various constituents when a cross-linking agent is added to the starting material. Since the starting material includes a polypropylene based resin composition which is thermally grafted by an ethylene type unsaturated silane compound, the entire plastic foam material is evenly cross-linked upon addition of a cross-linking agent. This, in turn, increases the inner stresses within the plastic foam material, particularly upon heating.

Moreover, the amount of the silane-modified resin added to the proposed mixture is excessive compared to the other resin. The excessive silane-modified resin results in even cross-linking among the various constituents, resulting in an increase in the gel fraction of the resulting plastic foam material. The increased gel fraction of the plastic foam material, in turn, causes a subsequent decrease in the moldability of the plastic foam material. The decrease in the moldability properties of the plastic foam material, in turn, results in articles which are considerably weak and easily breakable. The derived products are unable to maintain and retain their shapes, due, in part, to the compromised moldability of the plastic foam material.

In an attempt to improve the compression strength of conventional plastic foam material and products derived therefrom, Japanese Laid-Open Publication No. S52-104574 discloses a method for making a foam compound that uses two extruders, where one extruder extrudes a plastic containing a foaming agent to form a core, while the other extruder extrudes plastic to cover the thus formed core. This is injected into a metal mold and foamed.

However, because this method involves the injection into a metal mold of a plastic containing a foaming agent and a separate covering plastic, it is difficult to provide a uniform feed of the plastic containing the foaming agent.

Thus, it is impossible to form a plastic column that penetrates both the front and back of the resulting plastic foam material. It is even less possible to form a plastic column uniformly in the plastic foam material. Thus, the compression strength of the resulting plastic foam material is inadequate.

On the other hand, honeycomb structures are porous and have high compression strength. A honeycomb structure involves a honeycomb form sandwiched between surface materials.

Notwithstanding the presence of the honeycomb structure which increases compression strength, conventional plastic foam materials according to this publication exhibit increased heat conductivity. This is because of the convection which results from an increase in internal space. The honeycomb structure thus imparts inadequate insulating properties to the resulting plastic foam material.

Japanese Laid Open Publication No. 4-151238 also attempts to improve the compression strength of conventional plastic foam materials by using a resin foam material connected to a fiber-reinforced resin layer by a plurality of columns. The space between the layers is filled with foam, except for the space occupied by the resin columns.

However, the reinforcing effect of this resin foam material is ineffective because resin columns are embedded in foam and thus are not continuous. Additionally, to effectively increase the compression strength of the resin foam material, it is deemed necessary to embed a large number of columns, making the resin foam material substantially heavy.

In an attempt to overcome the aforementioned deficiency, Japanese Laid-Open Patent Publication S61-59339 discloses a plastic foam material composed of a resin composition containing a copolymer consisting of ethylene and an unsaturated silane, a silanol condensation catalyst and a foaming agent.

According to this publication, a copolymer containing at least ethylene and unsaturated silane compound, among others, can be used instead of the copolymer containing an ethylene like olefin resin and the unsaturated silane copolymer.

However, the proposed plastic foam material composed of the aforementioned resin composition exhibits a high gel fraction and increased thermal deformation. The gel fraction has been reported to be substantially high. The increase in gel fraction and thermal deformation makes such a plastic foam material unsuitable for use in molding the proposed plastic foam material into large objects requiring increased stability.

Japanese Laid Open Patent Publication S56-109229 proposes the use of a plastic foam material composed of a silyl-modified ethylene based polymer together with an ethylene based polymer, and a foaming agent.

The proposed resin composition contains a substantial amount of a silane-modified ethylene based polymer per 100 parts by weight of the ethylene based polymer.

However, articles made of the disclosed plastic foam material exhibit increased inner stress. The inner stress, in turn, causes extensive thermal deformation.

None of the prior art references manage to overcome the problem of the high gel fractions and inner stresses.

OBJECTS AND SUMMARY OF THE INVENTION

It is an object of this invention to provide a plastic foam material and its derived products which overcome the deficiencies associated with prior art plastic foam materials.

It is a further object of this invention to provide a method of making the plastic foam material.

It is still a further object of this invention to provide a plastic foam material which exhibits superior formability in thermoforming and forming products therefrom.

It is yet another object of this invention to provide a resin composition which exhibits minimal thermal deformation when forming a plastic foam material.

It is also a further object of this invention to provide plastic foam material composed of a resin composition which exhibits superior dimensional stability.

It is still a further object of this invention to provide plastic foam material which exhibits superior heat resistance.

It is still a further object of this invention to provide a plastic foam material composed of at least two thermoplastic resins which exhibits improved elongation at high temperature.

It is still a further object of this invention to provide a plastic foam material composed of thermoplastic resins which exhibits superior secondary processing properties when it forms a layered structure in conjunction with a substrate.

It is still a further object of this invention to provide a method for producing plastic foam material which is light and exhibits improved heat-insulation properties.

It is still a further object of this invention to provide a method for producing a plastic foam material which has high compression strength and good resilience.

Briefly stated, the present invention provides a plastic foam material composed of a blended resin composition that includes thermoplastic resins and a silane-modified thermoplastic resin. The blended resin composition includes 100 parts by weight of at least two thermoplastic resins, from about 1 to about 50 parts by weight of a silane-modified thermoplastic resin; from about 0.001 to about 2.5 parts by weight of a cross-linking catalyst and from about 1 to about 20 parts by weight of a thermodecomposition foaming agent.

According to a first embodiment of the invention, the two thermoplastic resins are substantially incompatible with each other (hereinafter referred to as "two incompatible thermoplastic resins"), while in the second embodiment, the two thermoplastic resins need not be incompatible (hereinafter referred to as "two thermoplastic resins").

The blended resin composition may further include specified amounts of reinforcers such as glass fibers and fillers.

The thermodecomposition foaming agent decomposes at sufficiently high temperatures to yield a plastic foam material. The resulting plastic foam material, in turn, exhibits superior resilience, improved compression strength and superior heat-insulating properties.

According to an embodiment of the present invention, there is provided a plastic foam material which includes 100 parts by weight of a at least two substantially incompatible thermoplastic resins selected from the group consisting of a polyethylene, polypropylene, ethylene-propylene copolymer, ethylene-vinyl acetate copolymer, polystyrene and similar resins.

The plastic foam material further includes from about 1 to about 50 parts by weight of a silane-modified thermoplastic resin of the same polymer type as at least one of said two incompatible resins, together with from about 0.001 to about 2.5 parts by weight of a cross-linking catalyst effective to cross-link the silane-modified thermoplastic resin, and from about 1 to about 20 parts by weight of a foaming agent.

According to another feature of the present invention, there is provided a plastic foam material which includes 100 parts by weight of at least two thermoplastic resins selected from the group consisting of a polyethylene, polypropylene, ethylene-propylene copolymer and similar resins.

The plastic foam material further includes from about 1 to about 50 parts by weight of a silane-modified thermoplastic resin of the same polymer type as at least one of the two thermoplastic resins together with from about 0.001 to about 2.5 parts by weight of a cross-linking catalyst effective to cross-link said silane-modified thermoplastic resin, and from about 1 to about 20 parts by weight of a foaming agent.

According to another feature of the present invention, there is provided a method for preparing a plastic foam material comprising thermoplastic resins, which includes preparing a first mixture containing 100 parts by weight of at least two substantially incompatible thermoplastic resins selected from the group consisting of polyethylene, polypropylene, ethylene-propylene copolymer, ethylene-vinyl acetate copolymer, polystyrene and similar resins.

Added to the first mixture are from about 1 to about 50 parts by weight of a silane-modified thermoplastic resin of the same polymer type as at least one of the two substantially incompatible thermoplastic resins, together with from about 0.001 to about 2.5 parts by weight of a cross-linking catalyst effective to cross-link the silane-modified thermoplastic resin, and from about 1 to about 20 parts by weight of a foaming agent to yield a blended resin composition.

The blended resin composition is thereafter extruded to form an object. The object is then exposed to a cross-linking source to form a cross-linked thermoplastic object wherein the cross-linked resin sheet includes only cross-linked silane-modified thermoplastic resin.

This is followed by exposing the cross-linked object to a foaming heat source to form a plastic foam material.

According to another feature of the present invention, there is provided a method for preparing a plastic foam material comprising thermoplastic resins, which includes preparing a first mixture containing 100 parts by weight of at least two thermoplastic resins selected from the group consisting of polyethylene, polypropylene, and ethylene-propylene copolymer.

Added to the first mixture are from about 1 to about 50 parts by weight of a silane-modified thermoplastic resin of the same polymer type as at least one of the two thermoplastic resins, together with from about 0.001 to about 2.5 parts by weight of a cross-linking catalyst effective to cross-link the silane-modified thermoplastic resin, and from about 1 to about 20 parts by weight of a foaming agent to form a blended resin composition.

The blended resin composition is then extruded to form a thermoplastic object. The thermoplastic object is then exposed to a cross-linking source to form a cross-linked thermoplastic object wherein the cross-linked thermoplastic object includes only cross-linked silane-modified thermoplastic resin.

This is followed by exposing the cross-linked thermoplastic object to a foaming heat source to form a plastic foam material.

According to another feature of the present invention, there is provided method for preparing a plastic foam material comprising thermoplastic resins, which includes forming a plurality of foamable tubes, wherein each of the plurality of foamable tubes include an inner layer and an outer layer containing thermoplastic resins.

This is followed by arranging the plurality of foamable tubes essentially parallel, supporting the tubes between dimension determining structures, wherein the dimension determining structures includes thickness regulating bodies effective to limit foaming in an axial direction of the foamable tubes, exposing the foamable tubes to a cross-linking source to form cross-linked foamable tubes and exposing the cross-linked foamable tubes to a foaming heat source. The foaming heat source is effective to fuse contacting parallel outer layers of the plurality of foamable tubes and also effective to initiate a foaming reaction to form the plastic foam material.

According to another feature of the present invention, there is provided a method for forming a foamable tube which includes preparing a first mixture and preparing a second mixture. The first mixture is extruded coaxially together with the second mixture to form a foamable tube with the first mixture including an inner layer and the second mixture including an outer layer of the foamable tube.

According to another feature of the present invention, there is provided a method for forming a foamable tube which includes preparing a first mixture and preparing a second mixture. The first mixture is extruded to form an inner core, while the second mixture is extruded coaxially onto the inner core to form a foamable tube. The thus formed foamable tube include an inner layer formed from the first mixture and an outer layer formed from the second mixture.

According to another feature of the present invention, there is provided a method for forming a foamable tube which includes preparing a first mixture and a second mixture. The first mixture is extruded to form an inner core. The second mixture is dissolved in a solvent effective to form a second mixture solution. Thereafter, the inner core is coated with the thus formed second mixture solution. The solvent is then removed to provide a foamable tube wherein the inner layer includes the first mixture while the outer layer includes the second mixture.

According to another feature of the present invention, there is provided a method for forming foamable tubes which includes preparing a first mixture and a second mixture. The first mixture is blended and extruded to form a blended first object. Thereafter, the blended first object is extruded to form a tubular object for forming an inner layer.

The second resin composition mixture is extruded to form a blended second object for forming an outer layer. The outer layer is then extruded co-axially onto the tubular object to form foamable tubes.

The foamable tubes are next exposed to a cross-linking source to form cross-linked foamable tubes. The cross-linked foamable tubes are thereafter exposed to a foaming source to form foamable tubes.

According to another feature of the present invention, there is provided a method for forming foamable tubes which includes forming a first mixture and a second mixture. The first and second mixtures are co-extruded to form foamable tubes having an inner layer and an outer layer, wherein the inner layer includes the first mixture and the outer layer includes the second mixture. Thereafter, the foamable tubes are exposed to a cross-linking source to form cross-linked foamable tubes.

Then the cross-linked foamable tubes are exposed to a foaming source to form said foamable tubes.

According to another feature of the present invention, there is provided a method for forming a tubular-celled resin sheet which includes forming an uncross-linked resin tube containing a foaming agent, followed by cross-linking the resin tube without activating the foaming agent. Thereafter, the resin tube is cut into substantially uniform lengths.

The uniform lengths are arranged upon a surface with axes thereof parallel to each other, with the peripheral surfaces of substantially all of the uniform lengths being in contact with peripheral surfaces of adjacent uniform lengths, followed by limiting an upper end of the uniform lengths, and activating the foaming agent, whereby a unitary tubular-celled resin sheet is formed by adherence of peripheral surfaces to each other.

According to another feature of the present invention, there is provided a tubular-celled thermoplastic resin sheet which includes a plurality of lengths of a resin tube in an array in which axes thereof are parallel to each other, the plurality of lengths having been foamed to urge peripheral surfaces of the plurality of lengths into an adhering unitary body, and the axes being at least partly open, whereby a plurality of openings pass through the tubular-celled thermoplastic resin sheet.

According to another feature of the present invention, there is provided a method for preparing a plastic foam material comprising thermoplastic resins, which includes the steps of forming a plurality of foamable pieces, wherein each of the plurality of foamable pieces include a core material and a cover material comprising thermoplastic resins. The core material includes a foaming agent.

Thereafter the plurality of foamable pieces are arranged essentially parallel. The parallel arranged pieces are then supported between dimension determining structures. Such dimension determining structures include thickness regulating bodies effective to limit foaming in an axial direction of the foamable pieces.

Next, the arranged, constrained pieces are exposed to a cross-linking source to form cross-linked foamable pieces.

Afterwards, the cross-linked foamable pieces are subjected to a foaming heat source which is sufficient to fuse contacting parallel outer layers of the foamable pieces and effective to initiate a foaming reaction to form a thermoplastic foam material.

According to another feature of the present invention, there is provided a method for preparing foamable pieces comprising thermoplastic resins, which includes the steps of forming a first and a second mixture. The first mixture is extruded to form a blended first object. The first object is then extruded to form a tubular object for forming a core material. The second mixture is extruded to form a blended second object for forming a cover material. The cover material is then extruded co-axially onto the tubular object to form foamable pieces.

The foamable pieces are next exposed to a cross-linking source to form cross-linked foamable pieces. The cross-linked foamable pieces are thereafter exposed to a foaming source to form foamable pieces.

According to another feature of the present invention, there is provided a method for forming foamable tubes which includes forming a first mixture and a second mixture. The first and second mixtures are co-extruded to form foamable pieces having a core material and a cover material, wherein the core material includes the first mixture and the cover material layer includes the second mixture.

According to another feature of the present invention, there is provided a plastic foam material comprising a cover material which includes at least one of a thermoplastic resin and a thermoplastic resin together with a foaming agent, wherein the cover material includes honeycomb structures, and a core material being integrally placed within the cover material.

The above, and other objects, feature and advantages of the present invention will become apparent from the following description read in conjunction with the accompanying drawings.

DETAILED DESCRIPTION OF THE PREFERRED EMBODIMENT

Figure 1:
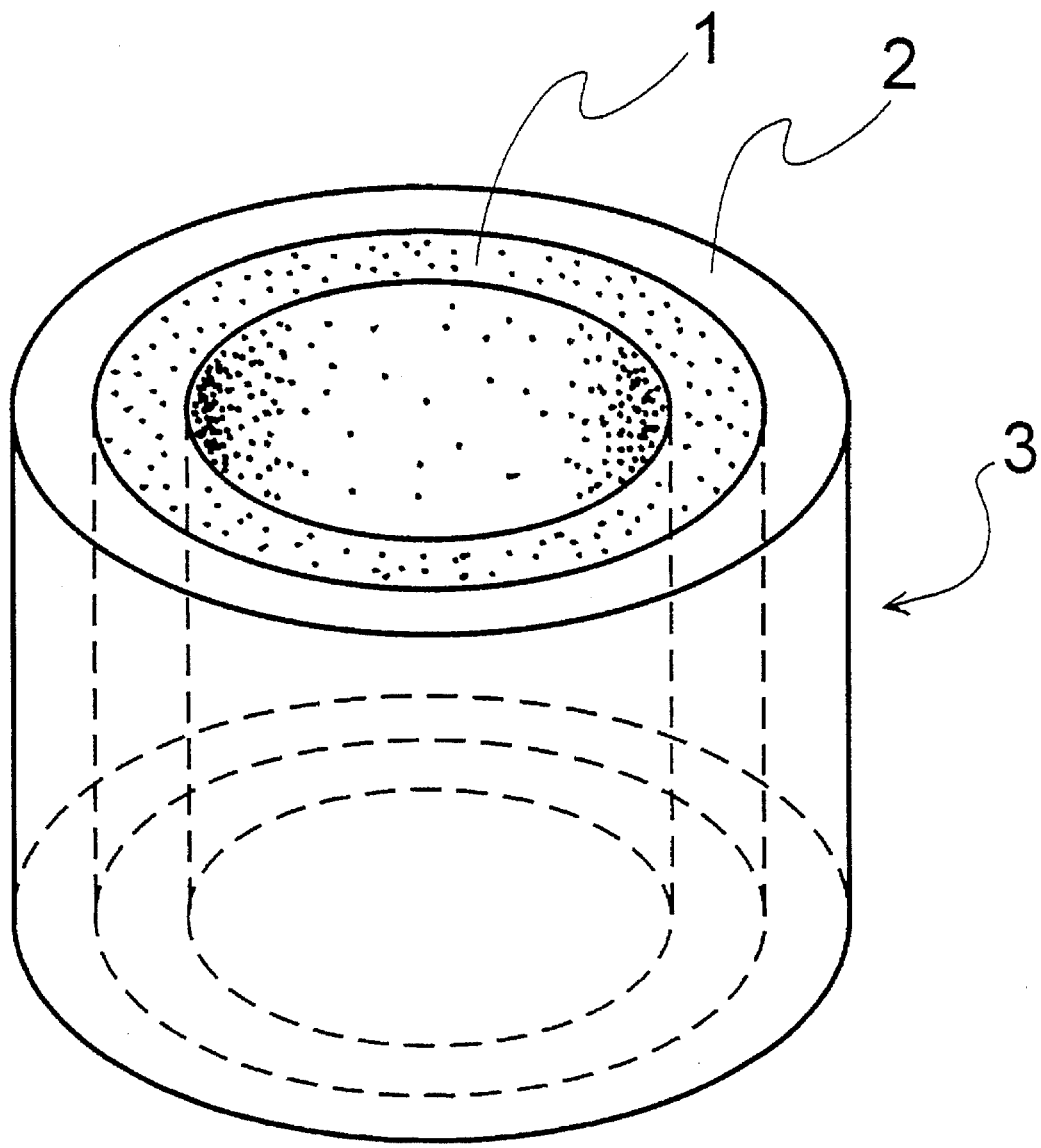
FIG. 1 is a perspective view of a two-layer foam tube according to an embodiment of the present invention.

The plastic foam material of the present invention is composed of thermoplastic resins and a silane-modified thermoplastic resin. The starting material for forming the plastic foam material may further include specified amounts of cross linking catalysts and thermodecomposition foaming agents.

EMBODIMENT 1

According to a first embodiment, a plastic foam material includes a blended resin composition containing thermoplastic resins and a silane-modified thermoplastic resin. The thermoplastic resins include at least two substantially incompatible, uncross-linked thermoplastic resins (hereinafter referred to as "two incompatible thermoplastic resins").

Essentially, the blended resin composition consists of 100 parts by weight of at least two substantially incompatible thermoplastic resins, from about 1 to about 50 parts by weight of a silane-modified resin; from about 0.001 to about 2.5 parts by weight of a cross-linking catalyst for use in a silane compound and from about 1 to about 20 parts by weight of a thermodecomposition foaming agent (hereinafter referred to as "foaming agent").

The plastic foam material exhibiting superior heat-tolerance and compression strength properties of the present invention is composed of the following elements, described hereinafter. All percentages hereinafter referred to are in weight terms (parts by weight) unless otherwise stated.

Thermoplastic Resins

The thermoplastic resins for use in the blended resin composition are uncross-linked and need not be limited to specific resins, so long as the resins are highly foamable.

The two substantially incompatible thermoplastic resins for use in the blended resin composition include at least two members selected from the group consisting of a polyethylene, polypropylene, a ethylene-propylene copolymer, an ethylene-vinyl acetate copolymer, polystyrene, and similar compounds.

The term "propylene" includes at least one of a homopolypropylene, block polypropylene, and random polypropylene. A "block polypropylene includes an ethylene-propylene copolymer containing small amounts of an ethylene component. Random polypropylene includes a static polypropylene copolymer containing small amounts of an ethylene component. It is preferred that the two substantially incompatible thermoplastic resins include at least two members selected from the group consisting of polyethylene, polypropylene, and polystyrene. In general, highly foamable thermoplastic resins provide for increased "foaming stability".

The degree of polymerization of the aforementioned polyethylene should be from about 500 to 6000, more preferably from 600 to 5000. The degree of polymerization of the aforementioned polypropylene should be from about 800 to 12000, more preferably from 1000 to 10000. The degree of polymerization of the aforementioned polystyrene should be from about 250 to 5000, more preferably from 1000 to 4000. Outside these preferred ranges, the dispersion of the silane-modified, cross-linked, plastic resin is substantially compromised.

Melt Index

The melt index (hereinafter referred to as "MI" as g per 10 minutes) of the two substantially incompatible thermoplastic resins is determined in accordance with Japanese Industrial Standard (JIS) K7210.

The MI of the two substantially incompatible thermoplastic resins preferably ranges from about 0.1 to about 50 g per 10 minutes, and more preferably, from about 1 to about 15 g/10 minutes. When the MI of the two substantially incompatible thermoplastic resin exceeds 50 or falls below 0.1 g/10 minutes, dispersion of the silane-modified thermoplastic resin substantially deteriorates, which leads to poor foaming performance.

If polyethylene and polypropylene are selected as the two substantially incompatible thermoplastic resins for use in the blended resin composition, then a density of each respective resin is preferably higher than about 0.91 and 0.89 g/cm$^3$, respectively. The plastic foam material becomes markedly weak and exhibits inferior heat resistance properties when the density of at least one of the polyethylene and polypropylene resins falls below the cited values.

Similarly, if ethylene-vinyl acetate copolymer and polystyrene are selected to form the two substantially incompatible thermoplastic resins for use in the blended resin composition, then a density of each respective resin is preferably from about 0.92 to about 0.95 g/cm$^3$ and from about 1.040 to about 1.60 g/cm$^3$, respectively.

When the density of the ethylene-vinyl acetate copolymer falls below 0.92 g/cm$^3$, the rigidity of the plastic foam material deteriorates. A similar effect is observed when the density of the polystyrene falls below 1.040 g/cm$^3$.

On the other hand, when the density of the ethylene-vinyl acetate copolymer exceeds 0.95 g/cm$^3$, the crystallinity of this polymer become high while its dispersion substantially deteriorates. Similar to the ethylene-vinyl acetate copolymer, the crystallinity of polystyrene becomes high with a significant decrease in its dispersion, when the density of the polystyrene exceeds 1.60 g/cm$^3$.

The two thermoplastic resins for use in the present invention according to the first embodiment, are characterized as being substantially incompatible with each other. The two substantially incompatible thermoplastic resins have individual melt indexes (MI). The difference in the MI between the two substantially incompatible thermoplastic resins (hereinafter referred to as "MI'") varies from about 3 to about 15 g per 10 minutes.

The weight ratio of the two substantially incompatible thermoplastic resins should be from about 2:8 to about 8:2.

When the MI' exceeds 15 g/10 minutes, the "sea and island" structure of the thermoplastic resin composition becomes "rough". Essentially, the size of the "island" becomes too large with poor foaming performance as a consequence.

On the other hand, when the difference in the melt index between the two substantially incompatible thermoplastic resins becomes small, the dispersed "sea and island" structure becomes too small or non-existent and poor foaming performance is again the consequence.

When the MI' is from about 3 to about 15 g per 10 minutes, a uniform sea-and-island structure with fine particle size is observed. It is preferable that MI' be from about 7 to about 11 g per 10 minutes.

For purposes of this invention, the term "solubility parameter" refers to the value calculated from the following formula:

$$\sigma = \rho \Sigma Fi/M.$$

where,

σ is the solubility parameter,

ρ is the density of the thermoplastic resins,

M is the molecular weight of the monomer which forms the thermoplastic resins, and Fi is the molar attraction constant of the constituent groups of the monomer.

The degree of incompatibility between the two substantially incompatible thermoplastic resins can be measured and represented as a "solubility parameter". When the degree of incompatibility, i.e., solubility parameter between the aforementioned two substantially incompatible resins falls below 0.1, there is an absence of a uniform sea-structure.

On the other hand, when the degree of incompatibility between the aforementioned two substantially incompatible thermoplastic resins exceeds 2, the difference in the solubility parameter between the two resins becomes small. In this case, no sea-and-island structure is formed. The difference in the solubility parameter between the two substantially incompatible thermoplastic resins should preferably be from about 0.1 to 2, and more preferably, from about 0.2 to 1.5.

It is preferred that the weight ratio of the two substantially incompatible resins be limited to be from about 2:8 to about 8:2, and the areas of the island and the sea in the "sea-and-island" structure be approximately the same.

When a weight fraction of one of the two substantially incompatible thermoplastic resins is high, it becomes exceedingly difficult to obtain a suitable shear viscosity for forming foam. In order to uniformly disperse one of the substantially incompatible thermoplastic resins into the other substantially incompatible thermoplastic resin, it is preferred that the weight ratio of the two substantially incompatible resins be from about 4:6 to about 6:4, and more preferably, 5:5.

Silane-Modified Thermoplastic Resins

As mentioned previously, the plastic foam material of the present invention is composed of a blended resin composition. The blended resin composition, in turn, contains at least two thermoplastic resins (i.e., substantially incompatible or compatible) and a silane-modified thermoplastic resin.

The silane-modified thermoplastic resin includes a resin type similar to at least one of the two substantially incompatible thermoplastic resins. The silane-modified thermoplastic resin is capable of being cross-linked with or without the aid of a cross-linking catalyst. The gel fraction of the silane-modified thermoplastic resin, after cross-linking, should be from about 60 to about 85 parts by weight.

The difference in the MI between the silane-modified thermoplastic resin and the substantially incompatible resin of the same polymer type (hereinafter referred to as MI") is less than 1 g per 10 minutes.

The above mentioned silane-modified resin may include at least one of a conventional silane-modified thermoplastic resin exemplified by a silane-modified thermoplastic resin of polyethylene, a silane-modified thermoplastic resin of polypropylene, a silane-modified thermoplastic resin of an ethylene-vinyl acetate copolymer, a silane-modified thermoplastic resin of polystyrene.

Because of their superior foam forming properties, at least one of polyethylene, polypropylene, and polystyrene as the silane-modified thermoplastic resin is preferred.

For purposes of this embodiment, the term "silane-modified thermoplastic resin" includes thermoplastic resins modified by an unsaturated silane compound by graft polymerization.

An unsaturated silane compound is a compound given by the following general formula:

$$R'SiR''_m Y_{3-m}.$$

where,

R' includes an organic functional group, e.g., an alkenyl group such as a vinyl group, an allyl group, a propenyl group or a cyclohexanyl group; a glycidyl group; an amino group; a methacrylic group; a halogenated alkyl group such as a γ-chloroethyl group or γ-bromoethyl group;

R" includes one of an alkyl group (a saturated aliphatic hydrocarbon group), an aryl group (an aromatic hydrocarbon group), such as a methyl, ethyl, propyl, butyl, phenyl groups, and similar groups;

m represents one of 0, 1, or 2;

Y is an organic group which can be hydrolyzed;

For example, Y may be one of a methoxy group, ethoxy group, formyloxy group, acetoxy group, propionoxy group, alkyl group, aryl amino group, etc. When m equals 0 or 1, Y can be either identical or different.

It is preferred that the aforementioned unsaturated silane compound be represented by a general formula $$CH_2=CHSi(OA)_3$$

where,

A includes a hydrocarbon group with 1 to 8 carbon atoms, and more preferably, from 1 to 4 carbon atoms. For example, $CH_2=CHSi(OA)_3$ may be vinyl trimethoxysilane, vinyl triethoxysilane, vinyl triacetoxysilane, etc.

In cases where the silane-modified thermoplastic resin contains a methoxy group, the methoxy group hydrolyzes to yield a hydroxyl group upon contacting water.

The, thus obtained hydroxyl group, in turn, can react with a hydroxyl group of another molecule to form a Si—O—Si bond. In essence, two silane-modified thermoplastic resins become cross-linked. It is preferred that a cross-linking catalyst be used to promote the cross-linking reactions.

The gel fraction of the silane-modified thermoplastic resin after cross-linking is limited to from 60 to 85 parts by weight, and more preferably, from 70 to 80 parts by weight. When the gel fraction of the silane-modified thermoplastic resin, after cross-linking, is below 60 parts by weight, the cross-linking density is low, and the foaming properties of the blended resin composition are adversely effected.

To substantially improve the foaming stability of the cross-linked resin, it is advisable to limit the gel fraction of the silane-modified thermoplastic resin to from about 70 to about 80 parts by weight.

The gel fraction is used to indicate the degree of cross-linking and is expressed as the parts by weightage of the residue obtained after xylene extraction at 120° C. To measure the residue resulting from the xylene extraction, a predetermined amount of plastic/ham material was immersed in predetermined amount of xylene and kept there at 120° C. for 24 hours. This effectively dissolves the uncross-linked portion of the plastic foam material. The contents of the container were then poured through a mesh screen to effectively separate the residue from solution. The resulting residue retained by the screen was collected, dried at 80° C. and 10 mm Hg pressure for 5 hours, and weighed.

The amount (parts by weightage) of the resulting residue is calculated by utilizing the formula:

Residue (parts by weight)=(b/a)×100 where, a equals initial weight of the sample plastic foam material (gram)

b equals weight of the dried residue collected (gram).

According to the present invention, MI" should be less than 1 g per 10 minutes.

When MI" exceeds 1 g per 10 minutes, it becomes increasingly difficult to disperse the silane-modified thermoplastic resin into the aforementioned thermoplastic resin of the same polymer type.

When the amount of the silane-modified thermoplastic resin added to the blended resin composition exceeds 50 parts by weight, the dimensional stability of the plastic foam material substantially deteriorates.

On the other hand, when the total content of the silane-modified thermoplastic resin added falls below 1 part by weight to 100 parts by weight of the two thermoplastic resins, the blended resin composition exhibits decreased elongation viscosity which is required for forming foam.

In order to effectively generate sufficient foam, the blended resin composition should have sufficient elongation viscosity. When the elongation viscosity is decreased, as when the amount of the silane-modified thermoplastic resin added to 100 parts by weight of the two thermoplastic resins falls below 1 part by weight, the attendant decrease in elongation viscosity leads to a halt in foam production.

It is preferable that the amount of the silane-modified thermoplastic resin added to 100 parts by weight of the two thermoplastic resins be from about 5 to about 40 parts by weight, and more preferably from about 10 to 30 part by weight.

Cross-Linking Catalyst

The blended resin composition may further include a cross-linking catalyst for use in a silane compound.

The cross-linking catalyst for use in the present invention can include a cross-linking catalyst effective to catalyze a cross-linking reaction between the silane-modified thermoplastic resin molecules. It need not be limited to any specific cross-linking catalyst. It includes at least one of a dibutyl tin diacetate, dibutyl tin dilaurate, dioctyl tin dilaurate, tin octanoate, tin oleate, lead octanoate, 2-ethyl hexane zinc, cobalt octanoate, lead naphtenate, zinc caprylate, zinc stearate, etc.

The foaming property (the ability of the blended resin composition to form foam at predetermined temperatures) of the blended resin composition deteriorates when the amount of the cross-linking catalyst per 100 parts by weight of the blended resin composition exceeds 2.5 parts by weight. The degree of cross-linking between the constituents to form the plastic foam material is then insufficient.

Similarly, if the amount of the cross-linking catalyst per 100 parts by weight of the blended resin composition falls below 0.001 parts by weight, the cross-linking reaction rate between silane-modified thermoplastic resin molecules is severely hampered and slowed.

Accordingly, it is preferable that the amount of the cross-linking catalyst added to 100 parts by weight of the total of the two thermoplastic resins and silane-modified thermoplastic resin be from about 0.001 to about 2.5 parts by weight, and more preferably from about 0.1 to 1.5 parts by weight.

Foaming Agent

A thermodecomposition foaming agent capable of decomposing at high temperatures is added to the blended resin composition. The foaming agent may include one of a conventional thermodecomposition foaming agent exemplified by an azodicarbonamide (1,1'-azobisformamide), azobisisobutylonitrile, N,N'-dinitrosopentamethylene tetramine, 4,4-oxybis(benzene sulfonyl hydrazide) barium azodicarboxylate, trihydrazinotriazine, benzene sulfonyl hydrazide, toluene sulfonyl hydrazide, and similar compounds.

Azodicarbonamide (1,1'-azobisformamide) is preferred because of its sensitive decomposition peak temperature.

The ability of the blended resin composition to form foam upon thermal interaction is greatly compromised when the amount of the foaming agent in the blended resin composition falls below 1 part by weight.

On the other hand, the overall strength of the resulting plastic foam material deteriorates when the amount of the foaming agent in 100 parts by weight of the two thermoplastic resins and the silane-modified thermoplastic resin exceeds 20 parts by weight. Additionally, the ability to form uniform foam cells is severely compromised when the amount of the foaming agent exceeds 20 parts by weight. It is preferable that the total amount of the foaming agent be from about 5 to about 15 parts by weight.

Other Additives

In addition to the above noted compounds, the blended resin composition may further contain glass fiber. The glass fiber is added to improve the overall strength and the dimensional stability of plastic foam material and its derived products.

The amount of the glass fiber added to the blended resin composition should be such that its addition does not harm the physical properties of the plastic foam material composed of a blended resin composition.

When a diameter of the glass fiber exceeds 30 μm, the glass fiber makes kneading the blended resin composition exceedingly difficult. On the other hand, when the diameter of the glass fiber falls below about 5 μm, the glass fiber breaks easily. This, in turn, substantially weakens the plastic foam material.

Accordingly, it is recommended that the average diameter of the added glass fiber be from about 5 to about 30 μm. It is preferable that the diameter of the glass fiber be from about 7 to about 20 μm.

When the length of the glass fiber is too great, the cell walls of the plastic foam material may be punctured by the glass fiber, causing a substantial decrease in the overall volume of foam produced.

On the other hand, when the length of the glass fiber is too short, the plastic foam material fails to exhibit a suitable improvement in overall strength. Accordingly, it is preferred that the length of the glass fiber be from about 0.1 to about 10 mm, and more preferably, from about 0.5 to 5

When the amount of the added glass fiber exceeds 20 parts by weight of the two olefin based resins and the silane-modified thermoplastic resin, the ability of the blended resin composition to form foam is substantially impaired. Alternatively, when the amount of the added glass fiber falls below 1 part by weight, the overall strength of the plastic foam material is impaired. Thus, the amount of the glass fiber to be added is preferably from about 1 to about 20 parts by weight, to 100 parts by weight of the two thermoplastic resins and the silane-modified thermoplastic resin.

Embodiment 2

According to a second embodiment of the present invention, the plastic foam material is composed of a blended resin composition which contains thermoplastic resins and a silane-modified thermoplastic resin. The blended resin composition consists of 100 parts by weight of at least two thermoplastic resins, from about 1 to about 50 parts by weight of a silane-modified thermoplastic resin and a thermodecomposition foaming agent.

Described hereinafter, are the various components which form the plastic foam material in accordance with the second embodiment. All parts by weightages hereinafter referred to are in weight terms unless otherwise stated.

Thermoplastic Resins

Unlike the first embodiment, the uncross-linked thermoplastic resins for use in this embodiment need not be substantially incompatible. Similar to the first embodiment, the thermoplastic resins include at least two resins selected from a group exemplified by polyethylene, polypropylene, and an ethylene-propylene copolymer.

The degree of polymerization of the polyethylene should be from 1,000 to about 10,000, and more preferably, from about 2,000 to 5,000. The dispersion of the polyethylene deteriorates when the degree of polymerization of the polyethylene is either below 1,000 or above 10,000. The deterioration in the dispersion of the polyethylene, in turn, impairs the dispersion of the silane-modified thermoplastic resins.

The degree of polymerization of the polypropylene is from about 5,000 to about 12,000, and preferably, from about 7,000 to 10,000.

The degree of polymerization of the ethylene-propylene copolymer polyethylene should be from 8,000 to about 10,000.

Melt Index (MI)

The MI of the two thermoplastic resins is determined in accordance with Japanese Industrial Standard (JIS) K7210.

The MI of the polyethylene is from about 0.6 to about 20 g per 10 minutes, and preferably, from about 5 to 15 g per 10 minutes. The dispersion of the polyethylene deteriorates when the MI of the polyethylene falls below 5 g per 10 minutes. The deterioration in the dispersion of the polyethylene, in turn, impairs dispersion of the silane-modified thermoplastic resin.

The MI of the polypropylene should be from about 2 to about 25 g per 10 minutes. Outside the aforementioned range, the dispersion of the polypropylene and the silane-modified thermoplastic resins is severely hampered.

The MI of the ethylene-propylene copolymer should be from about 3 to 8 g per 10 minutes. Outside these preferred ranges, the dispersions of the silane-modified thermoplastic resin and the ethylene-propylene copolymer are severely compromised.

The density of the polyethylene should be higher than 0.94 g/cm$^3$. The plastic foam material becomes markedly weak and exhibits inferior foaming performance when the density of the polyethylene falls below 0.94 g/cm$^3$.

The density of the polypropylene should be higher than 0.90 g/cm$^3$.

Similar to the polyethylene and the polypropylene, the plastic foam material becomes markedly weak and exhibits inferior foaming performance when the density of the ethylene-propylene copolymer falls below 0.90 g/cm$^3$.

It is preferred that the ethylene content in the thermoplastic resins is from about 20 to about 80 parts by weight. The dispersion of the silane-modified thermoplastic is impaired when the ethylene content in the two thermoplastic resins for use in the blended resin composition, falls outside the aforementioned preferred range.

Silane-Modified Thermoplastic Resin

The silane-modified thermoplastic resin according to this embodiment must be compatible with at least one of polyethylene, polypropylene, and an ethylene-propylene copolymer.

The silane-modified thermoplastic resin may be one of a silane-modified polyethylene, a silane-modified polypropylene, a silane-modified, ethylene-propylene copolymer, etc.

The silane-modified thermoplastic resin may be prepared using a conventional method. For example, a silane-modified polyethylene can be prepared by the reaction of polyethylene with an unsaturated silane compound and an organic peroxide. The unsaturated silane compound may be represented by $$RSiR'Y_2$$

where,

R includes an organic functional group, e.g., an alkenyl group such as a vinyl group, an allyl group, a propenyl group or a cyclohexanyl group; a glycidyl group; an amino group; a methacrylic group; a halogenated alkyl group such as a $\gamma$-chloroethyl group or $\gamma$-bromoethyl group;

Y represents an organic group that can be hydrolyzed, and

R' represents either a R group or a Y group as defined above.

When the amount of the silane-modified thermoplastic resin falls below 1 part by weight per 100 parts by weight of the two thermoplastic resins, an elongation viscosity of the blended resin composition during thermofoaming becomes insufficient. The decrease in elongation viscosity substantially reduces the output of the plastic foam material.

On the other hand, when the amount of the silane-modified thermoplastic resin exceeds 50 parts by weight per 100 parts by weight of the thermoplastic resin, there is a concurrent enhancement in the foaming stability. Further, the ground material cannot be re-extruded and thus it becomes difficult to reuse and reutilize the plastic foam material.

The amount of the silane-modified thermoplastic resin according to this embodiment should preferably be from about 1 to about 50, and more preferably, from about 5 to about 30 parts by weight per 100 parts by weight of the total polyolefin based thermoplastics.

Cross-Linking Catalyst

The cross-linking catalysts are similar to those described previously.

If the amount of the cross-linking catalyst added is insufficient, the cross-linking reaction between the silane-modified thermoplastic resins will not progress. On the other hand, if the amount of the cross-linking catalyst added is too large, the ability of the blended resin composition to produce foam upon thermal decomposition deteriorates.

Accordingly, the amount of the cross-linking catalyst to be added to the blended resin composition should preferably be from about 0.001 to about 10, and more preferably, from about 0.01 to 5 parts by weight of the total amount of the two polyolefin based thermoplastics and the silane-modified thermoplastic resin.

Foaming Agent

Similar to the first embodiment, the blended resin composition may further include specified amounts of a thermodecomposition foaming agent.

The foaming agent must be capable of decomposing at sufficiently high temperatures to yield a plastic foam material. Similar to the other embodiments, the foaming agent includes at least one of a azodicarbonamide (1,1'-azobisformamide), azobisisobutylonitrile, N,N'-dinitrosopentamethylene tetramine, 4,4'-oxybis(benzene sulfonyl hydrazide) also known as p,p'-oxybis(benzene sulfonyl hydrazide), barium azodicarboxylate, trihydrazinotriazine, benzene sulfonyl hydrazide, toluene sulfonyl hydrazide.

The ability of the blended resin composition to form foam upon thermal decomposition is greatly compromised when the amount of the foaming agent in the blended resin composition falls below 1 part by weight.

On the other hand, the overall strength of the resultant plastic foam material deteriorates when the amount of the foaming agent in the blended resin composition exceeds 20 parts by weight. Additionally, the ability to form uniform foam cells is severely compromised when the amount of the foaming agent in the blended resin composition exceeds 20 parts by weight. Accordingly, the total amount of the foaming agent per 100 parts by weight of the two thermoplastic resins and the silane-modified thermoplastic resin should be from about 1 to about 20 parts by weight.

Other Additives

In addition to the aforementioned polyolefin based thermoplastic resins, the silane-modified thermoplastic resin, the cross-linking catalyst and the foaming agent, the blended resin composition may further include specified amounts of glass fiber.

Similar to the first embodiment, the amount of the glass fiber added to the blended resin composition should be such that its addition does not harm the physical properties of the plastic foam material composed of a blended resin composition.

The glass fiber is added to improve the overall strength and dimensional stability of the plastic foam material.

The preferred diameters of the glass fiber are similar to the first embodiment. The amount of the glass fiber added to 100 parts by weight of the two thermoplastic resins and the silane-modified thermoplastic resin is similar to the first embodiment.

Similar to the previous embodiment, when the length of the glass fiber is too great, the cell walls of the plastic foam material can be punctured by the glass fiber, causing a substantial decrease in the overall volume of foam produced.

On the other hand, when the length of the glass fiber is short, the plastic foam material fails to exhibit the desired improvement in overall strength. Accordingly, it is preferred that the length of the glass fiber be at least 3 mm.

Preparation of the blended resin composition and its derived plastic foam material:

For the purposes of this invention, the blended resin composition is prepared from one of two possible general types of compositions.

In the first (Type I, in accordance with embodiment 2), predetermined amounts of (1) two uncross-linked thermoplastic resins selected from the group consisting of polyethylene, polypropylene, and an ethylene-propylene copolymer, (2) a silane-modified thermoplastic resin, (3) a cross-linking catalyst for the silane-modified thermoplastic resin, and (4) a thermodecomposing foaming agent are mixed by kneading in a conventional kneading machine.

In the second (Type II, similar to embodiment 1), predetermined amounts of (1) two substantially incompatible uncross-linked thermoplastic resins, (2) a silane-modified thermoplastic resin, (3) a cross-linking catalyst for the silane-modified thermoplastic resin and (4) a thermodecomposing foaming agent are mixed by means of melt kneading in a conventional kneading machine.

The thermoplastic resin of either type composition is kneaded and molded into shapes of plate, sheet, or tube, etc. It is usually molded into a thermoplastic resin sheet at a temperature sufficient to prevent decomposition of the foaming agent or to assure that there is no substantial progression towards the cross-linking. The method used to form the articles may include extrusion and similar processes.

A kneading machine for use in the mixing may include a conventional single screw extruder, a twin screw extruder, a Banbury type mixer, a kneader mixer, a roller, or any other suitable apparatus.

The kneaded resin of either type is rolled or extruded to form a resin sheet. The resulting thermoplastic resin sheet is next subjected to a process called "water treatment" in order to effectively cross-link only the silane-modified, cross-linked resin component of the thermoplastic resin sheet. During the water treatment, the thermoplastic resin sheet is heated to a temperature sufficient to initiate the cross-linking catalyst but lower than the thermodecomposition temperature of the foaming agent. Only the molecules of the silane-modified thermoplastic resin are cross-linked together. After the cross-linking reaction, the blended resin composition is heated to a temperature higher than the decomposition temperature of the type foaming agent.

During the water treatment, the foamable resin composition can be treated by methods other than immersing the blended resin composition in water. For example, the blended resin composition can be treated by exposure to steam.

The temperature of the water treatment for Type I compositions should generally be from about 50° C. to about 130° C. Pressurized conditions are necessary for temperatures above 100° C. If the temperature of the water is too low, the reaction rate is too slow and the time needed to complete cross-linking is too long. The preferred time for water treatment is at least 2 hours to assure complete cross-linking of the silane-modified thermoplastic resin component.

The temperature of the water treatment for Type II blended resin compositions is preferably from about 50° to about 130° C., and more preferably, from about 80° to 120° C. When the water treatment temperature is too high, the resin composition tends to fuse together. This leads to poor expansion ratios during the foaming process. If the temperature of the water treatment is too low, the cross-linking reaction time is too long and the cross-linking reaction may not go to desired completion.

The thus obtained thermoplastic resin sheet of either type composition with the cross-linked silane-modified thermoplastic resin component is then heated in an oven above the decomposition temperature of the foaming agent. This heating step forms a foam material upon thermal decomposition of the foaming agent. Alternatively, the resin sheet with the cross-linked silane-modified thermoplastic resin component may be placed in a heating roller and heated to form the plastic foam material. Alternatively, the resin sheet with the cross-linked silane-modified thermoplastic resin component can be placed in a mold and heated to form the foam material.

According to this invention, for Type II compositions, of the two uncross-linked thermoplastic resins, the particle size of the resin with the lower melt index importantly affects the melt-kneading of the blended resin. When the particle size of the uncross-linked polyolefin based resin with the lower melt-index is too large, the dispersion of the uncross-linked thermoplastic resins becomes poor and the foaming property of the blended resin composition deteriorates.

It is preferred that the particle size of the uncross-linked thermoplastic resin with lower melt-index be smaller than about 50 μm, desirably, smaller than about 10 μm.

The heating time to decompose the foaming agent should be sufficiently long to assure complete foaming/foam formation/foam generation. It is preferred that the heating time be longer than 30 seconds.

After the water treatment of the blended resin of Type I composition, but before the thermal foaming step, the blended resin composition may be covered by an inorganic fabric sheet. This is desirable because it forms a plastic foam material with less thermal deformation.

After the water treatment of the polyolefin resin of Type II composition, but before the thermal foaming step, the foamable resin composition may be sandwiched between two inorganic fabric sheets. This is desirable because it improves the dimensional stability of the resulting plastic foam material.

The aforementioned inorganic fabric sheets can be any conventional inorganic fabric sheet. For example, a sheet made from rock wool, a sheet made from carbon fiber, a glass cloth, a surfacing sheet may be suitably used as an inorganic fabric sheet noted above. The glass cloth is woven of glass thread which is obtained by converging glass fibers. The surfacing sheet is obtained from piling glass fibers randomly to a uniform thickness and binding with an adhesive.

Examples embodying the blended resin composition of the present invention are described hereinafter.

EXAMPLES 1–6 AND 9–10 AND COMPARATIVE EXAMPLES 1–2

Predetermined amounts of high density polyethylene, polypropylene, ethylene-propylenecopolymer, silane-modified polyethylene, silane-modified polypropylene, azodicarbonamide, and dibutyl tin dilaurate as set forth in Table 1 are mixed in a twin-screw extruder to give various resin compositions of Type I.

The screw of the twin-screw extruder used has a diameter of 30 mm. The blended resin composition obtained from the extruder is cylindrical and is 2 mm in diameter.

Subsequently, the blended resin composition obtained from the extruder is rolled by a cooling roller to form a 0.7 mm thick material. The 0.7 mm thick material is cut and pelletized by a right angular pelletizer. The pellets obtained are then subjected to a water treatment for 2 hours where the temperature of the water for immersion is kept at 99° C.

The water-treated, pelletized, blended resin composition is put in an air oven at 210° C. where the pellets of the resin composition are fused together, to allow the formation of plastic foams to take place and the plastic foamed material of the resin composition is obtained after cooling in air.

The expansion ratio, the melt index, and the parts by weightage of shrinkage of the plastic foam material of the resin composition are measured following the methods described below and the results are shown in Table 1.

TABLE 1

|  | Example | | | | | | | | | | Comparative Example | |
|---|---|---|---|---|---|---|---|---|---|---|---|---|
|  | 1 | 2 | 3 | 4 | 5 | 6 | 7 | 8 | 9 | 10 | 1 | 2 |
| High density polyethylene | 50 | 50 | 50 | 50 | — | 40 | 50 | 50 | 50 | 50 | 50 | 50 |
| Polypropylene | 50 | 50 | 50 | — | 50 | 40 | 50 | 50 | 50 | 50 | 50 | 50 |
| Ethylene-propylene copolymer | — | — | — | 50 | 50 | 20 | — | — | — | — | — | — |
| Silane-modified polyethylene | 5 | 15 | — | 15 | — | 15 | 5 | 5 | 30 | 40 | — | 60 |
| Silane-modified polypropylene | — | — | 15 | — | 15 | — | — | — | — | — | — | — |
| Dibutyl tin dilaurate | 0.25 | 0.75 | 0.75 | 0.75 | 0.75 | 0.75 | 0.25 | 0.25 | 1.50 | 1.50 | — | 1.50 |
| Azodicarbonamide | 8 | 8 | 8 | 8 | 8 | 8 | 8 | 8 | 8 | 8 | 8 | 8 |
| Expansion Ratio | 10.2 | 11.0 | 9.8 | 10.6 | 9.4 | 10.8 | 10.2 | 10.2 | 10.0 | 9.0 | NMF | 7.0 |
| Melt viscoxity index (g/10 min.) | 0.8 | 0.3 | 1.0 | 0.2 | 0.9 | 0.7 | 0.3 | 0.3 | 0.08 | 0.05 | 2.8 | 0.02 |
| Percentage of shrinkage (%) | 0.10 | 0.15 | 0.10 | 0.15 | 0.10 | 0.10 | 0.05 | 0.10 | 0.30 | 0.50 | 0.05 | 0.75 |

Note: NMF means "Not Meaningful." No stable foaming.

EXAMPLE 7

The water-treated, pelletized, blended resin composition obtained from Example 1 was layered with glass paper FEO-025 (approximate weight, 25 g/m³, provided by Oribest Co, Ltd.) to give a layered, blended resin composition. This was further clamped by a Chuko Flow G-Type belt (manufactured by Chuko Kasei Kogyo) and heated to form a glass paper-layered, plastic foam material that was 180 mm long, 300 mm wide, and 5 mm thick. The approximate weight of the glass paper-layered, plastic foam material obtained was 700 g/m².

EXAMPLE 8

Similar to Example 7, except that a surfacing sheet SM-3600-E (approximate weight, 30 g/m², provided by Asahi Glass) was substituted for the glass paper. This example yielded a plastic foam material that was also 180 mm long, 300 mm wide, and 5 mm thick. The approximate weight of the glass paper-layered, plastic foam material obtained was also 700 g/m².

EXAMPLES 11–22 AND 25 AND COMPARATIVE EXAMPLES 3–10

Predetermined amounts of the uncross-linked plastic resins polyethylene, polypropylene, ethylene-propylene copolymer, ethylene-vinyl acetate copolymer, polystyrene and a silane-modified cross-linked plastic resin as set forth by Table 2, in addition to 0.1 part by weight of dibutyl tin dilaurate, and 15 parts by weight of azodicarbonamide are fed to a tumbler and mixed to from various mixtures.

The azodicarbonamide is used as the thermodecomposition type foaming agent whereas the dibutyl tin dilaurate is used as the cross-linking catalyst. The mixtures are mixed in a twin-screw extruder and melt-kneaded at 180° C. to give various Type II resin compositions.

Similar to the Type I composition examples above, the screw of the twin-screw extruder used had a diameter of 30 mm. The blended resin composition obtained from the extruder was cylindric and was 2 mm in diameter.

Subsequently, the blended resin composition obtained from the extruder was rolled by a cooling roller to form a 0.7 mm thick material. The 0.7 mm thick material was cut and pelletized by a right angular pelletizer. The pellets obtained were then subjected to a water treatment for 2 hours where the temperature of the water for immersion is kept at 99° C.

TABLE 2

|  | Melt Index | Example | | | | | | | | | | | | | | | Comparative Example | | | | | | | |
|---|---|---|---|---|---|---|---|---|---|---|---|---|---|---|---|---|---|---|---|---|---|---|---|---|
|  |  | 11 | 12 | 13 | 14 | 15 | 16 | 17 | 18 | 19 | 20 | 21 | 22 | 23 | 24 | 25 | 3 | 4 | 5 | 6 | 7 | 8 | 9 | 10 |
| Polyethylene 1 | 1.5 | 50 | 50 | 30 | 70 |  |  |  |  |  |  |  |  | 50 | 50 | 50 | 50 | 10 | 90 |  |  | 50 | 50 | 50 |
| Polyethylene 2 | 9 |  |  |  |  |  |  |  |  |  | 50 | 50 | 50 |  |  |  |  |  |  |  |  |  |  |  |
| Polyethylene 3 | 11 |  |  |  |  |  |  |  |  |  |  |  |  |  |  |  |  |  |  | 50 | 50 |  |  |  |
| Polyethylene 4 | 20 |  |  |  | 50 |  |  |  |  |  |  |  |  |  |  |  |  |  |  |  |  |  |  |  |
| Polyethylene 5 | 0.35 |  |  |  |  |  | 50 |  |  |  |  |  |  |  |  |  |  |  |  |  |  |  |  |  |
| Polyethylene 6 | 0.6 |  |  |  |  | 50 |  |  |  |  |  |  |  |  |  |  |  |  |  |  |  |  |  |  |
| Polypropylene 1 | 1.2 |  |  |  |  |  |  |  |  |  |  |  |  |  |  |  |  |  |  |  |  | 50 |  |  |
| Polypropylene 2 | 11 | 50 | 50 | 70 | 30 | 50 | 50 | 50 | 50 | 50 |  | 50 |  | 50 | 50 | 50 | 50 | 90 | 10 | 50 | 50 |  | 50 | 50 |
| Polypropylene 3 | 2.8 |  |  |  |  |  |  |  |  |  | 50 |  | 50 |  |  |  |  |  |  |  |  |  |  |  |
| Ethylene vinyl acetate copolymer | 3 |  |  |  |  |  |  |  | 50 |  |  |  | 50 |  |  |  |  |  |  |  |  |  |  |  |
| Polystyrene | 3 |  |  |  |  |  |  | 50 |  |  |  |  | 50 |  |  |  |  |  |  |  |  |  |  |  |
| Silane modified cross-linked polyethylene | 10 |  |  |  |  |  |  |  |  |  | 20 | 20 | 20 |  |  |  |  |  |  |  | 20 |  |  |  |
| Silane Modified cross-linked polypropylene | 10 | 20 | 5 | 20 | 20 | 20 | 20 | 20 | 20 | 20 |  |  |  | 20 | 20 | 30 | 20 | 20 | 20 |  |  | 20 | 60 | 80 |

The water-treated, pelletized, blended resin composition was put in an air oven at 210° C. where the pellets of the resin composition were fused together, to allow the formation of plastic foams to take place and the plastic foamed material of the resin composition was obtained after cooling in air.

The expansion ratio, formability, and percentage of shrinkage of the plastic foam material of the resin composition were measured following the methods described below and the results are shown in Table 3.

TABLE 3

|  |  | Expansion Ratio | Thermal Shrinkage | Formability |
|---|---|---|---|---|
| Example | 11 | 30 | 0.25 | 100 |
|  | 12 | 15 | 0.15 | 120 |
|  | 13 | 25 | 0.25 | 80 |
|  | 14 | 15 | 0.25 | 100 |
|  | 15 | 10 | 0.25 | 140 |
|  | 16 | 25 | 0.25 | 80 |
|  | 17 | 20 | 0.25 | 70 |
|  | 18 | 20 | 0.25 | 100 |
|  | 19 | 20 | 0.25 | 100 |
|  | 20 | 25 | 0.25 | 110 |
|  | 21 | 25 | 0.25 | 100 |
|  | 22 | 20 | 0.25 | 100 |
|  | 23 | 30 | 0.25 | 60 |
|  | 24 | 30 | 0.25 | 60 |
|  | 25 | 30 | 0.35 | 50 |
| Comparative Example | 3 | 3 | 0.05 | 130 |
|  | 4 | 5 | 0.25 | 50 |
|  | 5 | 2 | 0.25 | 50 |
|  | 6 | 10 | 0.25 | 120 |
|  | 7 | 11 | 0.25 | 120 |
|  | 8 | 11 | 0.25 | 40 |
|  | 9 | 20 | 0.75 | 20 |
|  | 10 | 15 | 0.90 | 10 |

EXAMPLE 23

The water-treated, pelletized, blended resin composition obtained from Example 11 was layered with glass paper FEO-025 (approximate weight, 25 g/m$^2$, provided by Oribest Co., Ltd) to give a layered, blended resin composition. This was further clamped by a Chuko Flow G-Type belt (manufactured by Chuko Kasei Kogyo) and heated to form a glass paper-layered, plastic foam material that was 180 mm long, 300 mm wide, and 5 mm thick. The approximate weight of the glass paper-layered, plastic foam material obtained was 700 g/m$^2$.

EXAMPLE 24

Similar to Example 23, except that a surfacing sheet SM-3600-E (approximate weight, 30 g/m$^2$, provided by Asahi Glass) was substituted for the glass paper. This example yielded a plastic foam material that was also 180 mm long, 300 mm wide, and 5 mm thick. The approximate weight of the glass paper-layered, plastic foam material obtained was also 700 g/m$^2$.

Expansion Ratio

The density of the pellet of the pelletized, blended resin composition before the formation of the plastic foam material was measured and designated "$d_1$". After the formation of plastic foam material, a density of the plastic foam material composed of the blended resin composition was measured and designated "$d_2$". The expansion ratio was calculated as the ratio expressed as $d_1/d_2$.

Percentage of Thermal Shrinkage

The resulting plastic foam material was cut into various plate-shaped pieces measuring 200 mm long, 20 mm wide, 5 mm thick. The thus obtained small plate-shaped plastic foam pieces were heated to 180° C. and drawn by about 10 percent to form pieces measuring about 220 mm long. The 220 mm long, drawn plastic foam pieces were then charged in an oven and heated to 80° C. for 24 hours.

The length of the thermally shrunk, plastic foam material ($l_1$) was measured in mm and the percentage of thermal shrinkage was calculated from the Equation below:

Percentage of Thermal Shrinkage=$(100)\times(220-l_1)/(220)$.

Formability

The thus obtained plastic foam material was cut into 200 mm long, 200 mm wide, 5 mm thick, small, plate-shaped, samples.

Formability (the ability to mold the plastic foam material into plastic articles) of the plate-shaped samples was determined by various methods. One method included the use of a cylindrical shaped object having a circular cross-section. The mouth of the cylindrical object included flanges around the mouth. The bottom portions of the mouth was circular having an 8 cm diameter. This cylindrical object included a pre-determined depth.

The surfaces of the aforementioned plate-shaped samples were heated to 180° C. The respective mouths of each cylindrical member was covered by the heated plate-shaped samples.

Using a circular column member with a 7 cm diameter, the plate-shaped samples were pushed into the mouths of the cylindrical members. At a time just prior to breakage of the plate-shaped samples, a depth (h) (cm) of the circular column pushed inside the mouth of a cylinder-like member was measured.

A drawing ratio defined by the equation below was obtained and used as the index of formability. It was determined that a large drawing ratio was indicative of superior formability.

Drawing ratio=$100 \times h/8$

In Comparative Example 3, the blended resin composition exhibited insufficient shear viscosity. Generally, insufficient shear viscosity compromises the ability of the blended resin composition to produce significant foam, during the foaming process. The inability to form foam, can be attributed to the absence of a silane-modified polypropylene resin. A lack of suitable shear viscosity suitable for forming foam, in turn, impairs the expansion ratio of the plastic foam material.

In Comparative Example 4, the prior art blended resin composition also exhibits insufficient shear viscosity. This insufficiency, in turn, imparts a low expansion ratio to the resulting plastic foam material. The insufficient shear viscosity and low foam production is due to excess amounts of at least one of the two substantially incompatible resins in the resin composition.

Similar to Comparative Example 4, Comparative Example 5 also indicates a low shear viscosity. The insufficient shear viscosity and its attendant low foam production can be attributed to excessive amount of one of the polyolefin (uncross-linked) thermoplastic resins such as polyethylene 1.

In Comparative Example 6, it seems apparent that there is a lack of a uniform sea-and-island structure. This deficiency can be traced to the similar melt indexes of the two substantially incompatible thermoplastic resins, i.e., polyethylene 3 and polypropylene 2. The absence of the sea-andisland structure is believed to impart a low expansion ratio to the plastic foam material.

In Comparative Example 7, even though the two substantially incompatible thermoplastic resins are different from the one used previously in Comparative Example 6, the overall effect on the plastic foam material is similar to Comparative Example 6. The low expansion ratio of the plastic foam material is due to the similar melt indexes of the added two substantially incompatible resins.

In Comparative Example 8, the absence of a uniform sea-and-island structure can be traced to the infinitesimal difference (less than 0.3 g per 10 minutes) between the melt indexes of the two substantially incompatible polyolefin based thermoplastic resins, exemplified by polyethylene 1 and polypropylene 1. The absence of a uniform sea-and-island structure imparts a low expansion ratio to the plastic foam material.

It seems clear from the test results that one of the two substantially incompatible thermoplastic resins can be finely and evenly dispersed in the remaining one thermoplastic resin, forming a "micro" sea-and-island structure.

Because of its specific correlation with the two thermoplastic resins, the silane-modified thermoplastic resins also can be uniformly dispersed in the blended resin composition. The blended resin composition, as whole, has a shear viscosity suitable for forming foam.

This in turn yields a plastic foam material with a high expansion ratio. The blended resin composition is characterized as having an uncross-linked portion, with improved fluidity. This feature, in turn, imparts superior formability properties to the plastic foam material. Furthermore, the blended resin composition of this invention is re-utilizable.

The portion with low cross-linking density can be re-melted. The portion with high cross-linking density can be used as filling material. On the other hand, the amount of the silane-modified, thermoplastic resin added is limited to less than 50 parts by weight per 100 parts of the blended resin composition.

During the foaming process, the aforementioned limitation substantially reduces the undesirable inner stress caused by cross-linking. Accordingly, the plastic foam material obtained from such a blended resin composition exhibits excellent dimensional stability.

Described hereinafter is embodiment 3 encompassing a method for producing a plastic foam material which is light weight, and exhibits improved heat-insulating properties, has increased compression strength and good resilience.

EMBODIMENT 3

For the third embodiment, a plurality of foamable tubes are used to make the plastic foam material. The foamable tube includes an outer layer and an inner layer. The outer layer is composed of at least one of a thermoplastic resin and a blended resin composition consisting of a thermoplastic resin and a foaming agent.

The inner layer is composed a blended resin composition consisting of a thermoplastic resin and a foaming agent.

The thermoplastic resin for use in the blended resin composition includes at least one of an olefin resin such as low-density polyethylene, high-density polyethylene, straight-chain low-density polyethylene, random polypropylene, homopolypropylene, block polypropylene; polyvinyl chloride, chlorinated polyvinyl chloride, ABS resin, polystyrene, polycarbonate, polyamide, polyvinylidene fluoride, polyphenylene sulfide, polysulfone, and polyether ether ketone.

The aforementioned resins can be used individually or in combination with others as copolymers. In order to substantially increase the resiliency of the resulting plastic foam material, it is desirable to use at least one olefin based resin such as low-density polyethylene, high-density polyethylene, straight-chain low-density polyethylene, random polypropylene, homopolypropylene, or block polypropylene. A mixture of the aforementioned resins is preferred.

In particular, a mixture containing at least one of high-density polyethylene or homopolypropylene is especially desirable.

The thermoplastic resins for use in the blended resin composition for forming the inner layer and the outer layer can be identical or different. If different, the thermoplastic resins used in both must be capable of thermally adhesing to each other.

Examples of thermoplastic resins that satisfy the above condition of thermo-adhesiveness include the following combinations: high-density polyethylene and low-density polyethylene, high-density polyethylene and straight-chain low-density polyethylene, high-density polyethylene and homopolypropylene.

In order to improve the resilience and strength of the resulting foam bodies, it is desirable to include combinations exemplified by high-density polyethylene and low-density polyethylene, high-density polyethylene and straight-chain polyethylene, high-density polyethylene and homopolypropylene. In particular, the combination of high-density polyethylene and homopolypropylene is especially desirable.

The thermoplastic resins can be cross-linked as needed. Cross-linking effectively increases the expansion ratio which, in turn, makes the resulting plastic foam material lighter.

Various methods can be utilized to achieve effective cross-linking of the respective components, such as (1) radiation, (2) use of a peroxide which is melt-mulled into a thermoplastic resin at a temperature below the decomposition point of the peroxide, or (3) melt-mulling a silane-modified thermoplastic resin. In (2) above, the resulting mixture is then heated at a temperature above the decomposition point of the peroxide. In (3) above, the silane-modified thermoplastic resin is melt-mulled together with a cross-linking catalyst specifically active only to the silane-modified thermoplastic resin to produce a plastic resin, followed by water-processing the mixture.

For purposes of this embodiment, the term "silane-modified thermoplastic resin" includes thermoplastic resins modified by an unsaturated silane compound by graft polymerization. The silane-modified thermoplastic resin may include silane-modified thermoplastic polyethylene or silane-modified thermoplastic polypropylene.

The unsaturated silane compound noted above can be generally expressed as $$R'SiR''_m Y_{3-m}.$$

where

R' includes an organic functional group, e.g., an alkenyl group such as a vinyl group, an allyl group, a propenyl group or a cyclohexanyl group; a glycidyl group; an amino group; a methacrylic group; a halogenated alkyl group such as a γ-chloroethyl group or γ-bromoethyl group;

R" includes an aliphatic saturated hydrocarbon such as a methyl group, an ethyl group, a propyl group or a decyl group;

Y includes a hydrolytic organic functional group such as a methoxyl group, an ethoxyl group, a formyloxyl group or a propionoxyallyl amino group;

"m" can be 0, 1 or 2.

Because cross-linking is quick, it is preferable to use an unsaturated silane compound generally expressed as:

where

A includes an aliphatic saturated hydrocarbon with 1–8 carbon atoms, preferably from 1–4 carbon atoms. Examples of $CH_2=CHSi(OA)_2$ include vinyl trimethoxysilane, vinyl triethoxysilane and vinyl triacetoxysilane, etc.

The method for producing the silane-modified thermoplastic resin noted above includes producing a silane-modified polyethylene from a reaction between polyethylene, an organic peroxide and a silane compound, expressed as

where

R' includes at least one of an ethylene-like unsaturated group, an epoxy group, or an amino group. The ethylene-like unsaturated group may further include at least one of a vinyl group, allyl group, propenyl group, cyclohexenyl group, γ-methacryloxypropyl group, etc;

Y is a hydrolytic organic groups, and

R" is either a R group or Y group as defined above.

In cases where the silane modified thermoplastic resin includes a silyl group, such as methoxyl, hydrolysis with water will produce a hydroxyl group.

The thus obtained hydroxyl group, in turn, can react with a hydroxyl group of another molecule to create Si—O—Si bonds which in turn, aid in cross-linking silane-modified thermoplastic resins. It is preferred that a silanol condensation catalyst be used to promote the cross-linking reactions.

Any conventional method for adding silane-modified thermoplastic resins can be utilized so long as the graft polymer is added uniformly. According to one method, a thermoplastic resin and silane-modified thermoplastic resin can be fed into a single-axis or twin-axis extruder and melt-mulled. Another method includes melt-mulling the respective constituents with a roller. Yet another method utilizes a kneader to melt-mull.

The step of water processing can be accomplished by immersing in water. Water processing can also be accomplished by exposure to steam, followed by processing at a temperature of 100° C. or greater. For temperatures greater than 100° C., pressurization is required.

If the water or steam temperature during water processing is too low, the cross-linking reaction proceeds too slowly. If the temperature is too high, the outer layers fuse to each other. Therefore, a temperature of from about 50° to about 130° C. is desirable, with 90° to about 120° C. being especially desirable.

If the duration of the water processing is too short, the cross-linking reaction may not proceed to completion. If the duration is too long, the outer layers may fuse to each other. Therefore, a duration time of from 5 minutes to about 12 hours is preferred.

If the amount of silane-modified thermoplastic resin added is too great, too much cross-linking will occur, and the resulting foam material will have too low an expansion ratio. If the amount is too small, the foam cells burst, preventing generation of uniform cells. Therefore, about 5 to about 50 parts by weight of the silane-modified thermoplastic resin to 100 parts by weight of thermoplastic resin is preferred, more preferably from about 20 to about 35 parts by weight.

A cross-linking catalyst can be added to the resin composition to aid in cross-linking the silane-modified thermoplastic resins. Suitable cross-linking catalysts are exemplified by one of a dibutyl tin diacetate, dibutyl tin dilaurate, dioctyl tin dilaurate, tin octanoate, tin oleate, lead octanoate, 2-ethyl hexane zinc, cobalt octanoate, lead naphtenate, lead caprylate and zinc stearate.

If the amount of cross-linking catalyst added to 100 parts by weight of the thermoplastic resin exceed 1 part by weight, the expansion ratio of the resulting plastic foam material is decreased. Alternatively, if the amount of the cross-linking catalyst falls below 0.001 parts by weight, the rate of the cross-linking reaction is slowed thus requiring additional water processing time.

It is preferable that the amount of the cross-linking catalyst be from about 0.01 to about 0.1 parts by weight.

The peroxide for use in the cross-linking reaction may include one of a dibutyl peroxide, dicumyl peroxide, tert-butylcumyl peroxide, diisopropyl peroxide. In particular, dicumyl peroxide, tert-butylcumyl peroxide are desirable, and dicumyl peroxide is especially desirable.

Adding too much peroxide facilitates the decomposition reaction of the resin, resulting in coloration of the resulting foam material. If there is too little peroxide, the cross-linking in the thermoplastic resin is inadequate.

Therefore, for 100 parts by weight of the thermoplastic resin, from about 0.5 to about 5 parts by weight of peroxide is preferable and, more preferably, from about 1 to about 3 parts by weight.

If radiation is used as a means to cross-link the thermoplastic resins, then excessive radiation causes excessive cross-linking to take place. In this event, the expansion ratio of the resulting plastic foam material decreases.

Alternatively, a very low radiation dosage causes the foam cells to burst, preventing uniform cell formation. Accordingly, a radiation dosage of from 1 to about 20 Mrad is desirable, with from about 3 to about 10 Mrad being especially desirable.

Radiation may be applied in many ways, one of which may include using two electron beam generators between which the plastic resin is passed to expose the two thermoplastic resins.

If necessary, a reinforcer such as short-fiber glass, short-fiber carbon, or short-fiber polyester or a filler such as calcium carbonate, aluminum hydroxide, or glass powder can be added to the plastic resin in order to increase the strength of the plastic foam material.

If excessive amounts of the short-fiber glass is added as a reinforcer, cells get destroyed during foaming, thus lowering the expansion ratio. If too little short-fiber glass is added, the reinforcing strength of the plastic foam material is inadequate. Therefore, for 100 parts by weight of the thermoplastic resins, 1 to 20 parts by weight of short-fiber glass is desirable, and 3 to 10 parts by weight is especially desirable.

If the short-fiber glass fibers are too long, the resulting plastic foam material becomes too heavy. If the short-fibers glass fibers are too short, the resulting plastic foam material is not adequately reinforced. Therefore, a length of from about 1 to about 30 mm is desirable, and a length of from 3 to about 5 mm is especially desirable.

When adding a filler, it is desirable to add from about 10 to about 100 parts by weight of the filler to about 100 parts by weight of the thermoplastic resins. If too much filler is added, the resulting plastic foam material is too heavy. If too little is added, the resulting plastic foam material is not adequately reinforced. It is preferable to add from about 30 to about 50 parts by weight of the filler.

The foaming agent referred to above must be one which has a decomposition temperature that is higher than the melting point of the thermoplastic resins being used. Examples include inorganic thermodecomposing foaming agents such as sodium bicarbonate, ammonium carbonate, ammonium bicarbonate, azide compounds, or sodium borohydride and organic thermodecomposing foaming agents such as azodicarbonamide, azobisisobutylnitrile, N,N'-dinitrosopentamethylene tetramine, P,P'-dinitrosopentamethylene tetramine, P,P'-oxy bisbenzenesulfonyl, hydrazide, barium azodicarbonate, or trihydradinotriazine.

Azodicarbonamide, which has a high gas yield, good hygienic properties and an easily adjustable decomposition point and decomposition rate, is desirable.

In the present invention, high-foaming materials and low-foaming materials are relative labels referring to the expansion ratio of the plastic foam material. The material with the higher expansion ratio is referred to as the high-foaming material, and the material with the lower expansion ratio is referred to as the low-foaming material. Generally, the inside layer is made up of a high-foaming material relative to the outer layer's low-foaming material.

The expansion ratio of the plastic foam material made from the foam composition can be adjusted through selection of the type of thermoplastic resin, degree of polymerization, crystallization, density of cross-linking, type and amount of foaming agent added. It is desirable, from the point of view of ease of adjusting the expansion ratio, to adjust the amount of the foaming agent. In this case, if the amount of the foaming agent is too large, cells break, resulting in cells that are not uniform. This decreases the compression strength of the resulting plastic foam material. If the amount is too small, foaming does not occur. Therefore, for 100 parts by weight of the thermoplastic resin, it is desirable to add from about 1 to about 25 parts by weight of foaming agent.

More concretely, adjustments can be made by finding the gas yield corresponding to the desired expansion ratio, and a corresponding amount of foaming agent can be added.

In the case of high foaming materials, a high expansion ratio results in greater radiative heat transfer, which increases the heat conductivity of the plastic foam material while simultaneously decreasing its heat-insulating properties; whereas a low expansion ratio makes the resulting plastic foam material heavier. Therefore, an expansion ratio of from about 10 to about 50 is desirable. A expansion ratio of from about 25 to about 40 is especially desirable, and a expansion ratio of from about 30 to about 40 is most desirable.

For low foaming materials, a high expansion ratio results in a lower compression strength in the resulting plastic foam material. Therefore, an expansion ratio of 5 or lower is desirable, with an expansion ratio of 3 or lower being especially desirable.

Thus, it is preferable to adjust the amount of the foaming agent in high or low foaming materials so that the expansion ratio falls within the above respective ranges.

The thermoplastic resin for use in the outer surface of the foamable tube can include the same thermoplastic resin as the one used for the plastic foam material described above.

It is desirable to use a thermoplastic resin for the outer surface. A thermoplastic resin has the added advantage of imparting improved rigidity to the lattice-shaped or honeycomb-shaped resin walls. This feature, in turn, significantly improves the compression strength of the resulting plastic foam material.

In the present invention, "honeycomb" refers to a structure where hexagons are arranged continuously with shared segments.

The thermoplastic resin that forms the outer layer and the thermoplastic resin that forms the inner layer can be identical or different. If they are different, they need to be thermo-adhesive (capable of fusing in the presence of heat).

Examples of combinations of thermoplastic resins exhibiting thermo-adhesiveness are high-density polyethylene and low-density polyethylene, high-density polyethylene and straight-chain low-density polyethylene, high-density polyethylene and homopolypropylene, and polyvinyl chloride and polyvinyl acetate.

As with the thermoplastic resin for use in the blended resin composition, the thermoplastic resin for forming the outer layer can be supplemented with reinforcing agents such as short-fiber glass, short-fiber carbon, short-fiber polyester or with fillers such as calcium carbonate, aluminum hydroxide, and glass powder.

The method of producing the foamable tube can involve, for example, feeding the thermoplastic resin and a foaming agent which forms the inner layer into a twin-axis extruder, melt-mulling at a temperature lower than the decomposition point of the foaming agent, and extruding the result into a tube shape.

If the outer layer is composed of a blended resin composition, a different twin-axis extruder is fed with a thermoplastic resin and a foaming agent.

If the outer layer is a plastic resin compound, then the thermoplastic resin is fed into the twin-axis extruder. If necessary, melt-mulling is performed at a temperature lower than the decomposition point of the foaming agent. Then they are co-extruded so that the inner layer is covered in a concentric fashion. The extruded tube is then cut to prescribed lengths. Foaming is done later.

Another method for producing foamable tubes is to feed the foaming agent and a thermoplastic resin into a twin-axis extruder. Melt-mulling is performed at a temperature lower than the decomposition point of the foaming agent. The product is then extruded in a tube shape and cut to prescribed lengths. Then, the thus obtained precut foamable tubes are immersed in an organic solvent solution which dissolves the low-foaming resin material.

If the method for forming the foamable tubes includes the use of an organic solvent solution, the organic solvent solution must be capable of dissolving the blended resin composition. The following are examples of such solutions: aromatic hydrocarbons such as toluene and xylene, halogenated hydrocarbons such as methylene chloride and dichloromethane, and ketone compounds such as acetone and methyl ethyl ketone.

More specifically, if polystyrene or polyvinyl chloride is used as the thermoplastic resin in the blended resin composition, it is desirable to use methylene chloride as the organic solution. If polyvinyl chloride is used as the thermoplastic resin in the blended resin composition, it is desirable to use methyl ethyl ketone as the organic solution.

If the thermoplastic resins used for the outer layer are very thick, the resulting plastic foam material is heavier. If the thermoplastic resins are very thin, the compression strength of the resulting plastic foam material is decreased. Therefore, a thermoplastic resin ranging in thickness of 0.05 to about 5.0 mm is desirable, with 0.1 to about 2.0 mm being especially desirable.

It is preferred that the cross-section of the foamable tube be circular in shape, but in certain cases, it is acceptable to form ellipses and rectangles with rounded corners.

The present invention also involves a method for producing plastic foam material wherein a plurality of foamable tubes are arranged together, so that during foaming, adjacent outer layers either fuse together, or by foamable tubes being arranged in a staggered fashion so that the foamable tubes touch each other.

The foamable tubes are supported by a pair of thickness-regulating bodies in order to limit foaming in the axis-direction. The interval between the thickness-regulating bodies is kept constant. The foamable tubes are heated and foaming takes place.

Whether the thickness-regulating bodies used in the present invention are stationary or whether they can be moved in a certain direction is not specified. For example, it is possible to use a pair of iron plates or iron meshes or a pair of belts that move at identical speeds in identical directions. In terms of ease of assembly and mass production, the use of the belts described above is desirable.

The foamable tubes are supported by the thickness regulating bodies described above which limit foaming in the axis-direction. The foamable tubes between the thickness-regulating bodies are arranged so that adjacent outer layers fuse together during foaming or are arranged in a staggered fashion so that the foamable tubes touch each other.

"Adjacent outer layers" refers to the outer layers of the foamable tubes surrounding one foamable tube. "A staggered arrangement" refers to 6 foamable tubes arranged with a foamable tube at their center.

When the foamable tubes are arranged so that adjacent outer layers fuse together, it is desirable to have at least one other foamable tube arranged so that it is touching. This is because the adjacent foamable tubes can prevent the outer layer from foaming or expanding toward the outside, thereby giving inward foaming priority over outward foaming. This permits the inside of the resin or resin foam outer layer to be filled with the foam created by the inner layer. This provides improved heat-insulating properties.

When the foamable tubes are arranged so that adjacent outer layers fuse together, it is desirable to have the foamable tubes arranged so that they have fixed horizontal and vertical intervals. This is because the resin or resin foam forming the outer layer can form a lattice improving the compression strength of the resulting plastic foam material.

When the foamable tubes are placed in a staggered arrangement, the resin walls or the resin foam formed from the outer layer takes on a honeycomb structure. Foaming in this manner provides improved compression strength in the resulting plastic foam material compared to the arrangement involving adjacent outer layers fused together.

When the foamable tubes are arranged in a staggered arrangement, the foamable tubes should preferably satisfy the equation below. Satisfaction of the equation improves the compression strength and insulating properties of the resulting plastic foam material because the space inside the outer layer is completely filled up during foaming.

$$\phi_2/\phi_3)^2 < 1 - 2\sqrt{3}/(\pi TI),$$

where $\phi_2$ is the inner diameter of the inner layer, $\phi_3$ is the outer diameter of the inner layer, and TI is the expansion ratio of the foam obtained from the inner layer after foaming.

If a thermoplastic resin is used for the outer layer of the foamable tube, the outer layer becomes a resin wall having a honeycomb-shaped cross-section. This provides further improvements in compression strength as well as improved rigidity in bending strength.

In the present invention, the foamable tubes are supported on both ends by a pair of thickness-regulating bodies. Possible methods for supporting the foamable tubes includes arranging the foamable tubes on the first thickness-regulating body and then stacking the second thickness-regulating body on top.

An alternative method includes arranging the foamable tubes on a moving thickness-regulating body located at the bottom. This is then fed to top and bottom thickness-regulating bodies. In this method, the interval between the thickness-regulating bodies must be adjusted to the height of the foamable tubes.

When foamable tubes are arranged with their adjacent outer surfaces fused together, it is possible to use a rotating roller with holes for foamable tubes arranged around the perimeter so the tubes have a perpendicular arrangement. This aids in melting and fusing the adjacent outer.

Foamable tubes are supplied from the top and foamable tubes fall straight down and are arranged on the moving thickness-regulating body.

When the foamable tubes are arranged in a manner wherein each tubes contact at least one other tube, the above feeding method can still be used. In this case, the rotating roller sends foamable tubes to a vibrating feed plate having side walls arranged to the left and right oriented downward and diagonal toward the moving thickness-regulating bodies. Then the foamable tubes are sent from the feed plate to the thickness-regulating bodies.

When the foamable tubes are placed in a staggered arrangement, the above method can be used. In this case, the side walls of the feed plate are tapered narrowing toward the thickness-regulating bodies.

In order to improve the compression strength of the resulting plastic foam material, it is desirable to use a flat reinforcing material between the thickness regulating bodies and the foamable tubes. The flat reinforcing material is exemplified by glass paper, a chopped strand mat, a metal sheet, a thermoplastic resin sheet or a thermosetting resin sheet.

If the glass paper or the fibers in the glass paper used are too heavy, the resulting plastic foam material is too heavy, and if they are too light, the resulting plastic foam material is too weak. Therefore, glass paper, including one with fibers in it, should weigh from about 10 to about 100 g/m$^2$ and preferably from about 20 to about 50 g/m$^2$.

The thermoplastic resin for use in the thermoplastic resin sheet described above include at least one of polyethylene, polypropylene and polyethylene terephthalate. In order to improve adhesion between the plastic resin sheet and the plastic foam material, it is desirable to use the same type of thermoplastic resin as the one used to form the plastic foam material.

The thermosetting resin for use in the thermosetting resin sheet can include melamine resin, phenol resin, epoxy resin or unsaturated polyester.

The metal to be used in the metal sheet may include aluminum or iron.

If the plastic resin, thermosetting resin, or metal sheet described above is too thick, the resulting plastic foam material becomes too heavy. If it is too thin, the resulting plastic foam material is not adequately reinforced. Accordingly, the plastic resin, thermosetting resin, or metal sheet should range in thickness from about 0.05 to about 1 mm. and preferably from about 0.1 to about 0.5 mm.

In the present invention, when the foamable tubes are supported with thickness-regulating bodies, heating is performed while maintaining a constant interval between the thickness-regulating bodies. The heating method is not particularly specified as long as the temperature goes above the decomposition point of the foaming agent forming the foaming material. Examples include electric heaters, infrared heaters, and heating devices that circulate a heating medium such as oil or air.

The method for producing foam bodies of the present invention is as described above.

The foamable tubes of the present invention have an internal hollow area in the axis direction. Therefore, when heat is applied to the foamable tube, heat goes not only to the outside but also to the inside of the foamable tube through the hollow area. This makes uniform foaming possible and prevents the need for overheating the outside in order to heat the inside. This keeps the outside foam from bursting and maintains the lightness and compression strength of the resulting plastic foam material.

When the foamable tubes are arranged so that adjacent outer layers fuse together, the outer layer, made from a low-foaming material or a plastic resin, forms a plastic wall that provides a plastic foam material with improved compression strength.

Furthermore, when the foamable tubes are arranged so that the outer layers fuse together and each foamable tube is in contact with at least one other foamable tube, the plastic foam material fills the inside of the resin wall formed by the outer layer of the resin foam wall. This improves heat-insulation properties.

Also, when the foamable tubes are arranged so that the outer layers fuse together and the foamable tubes are arranged so that they have fixed horizontal and vertical intervals, the resin walls or the resin foam walls resulting from the outer layers form a lattice-shaped cross-section. This provides a plastic foam material with improved compression strength compared to the arrangement where the outer layers fuse together and each foamable tube is in contact with at least one other foamable tube.

If a staggered arrangement is used, the outer layers form resin walls or resin foam walls have a honeycomb-shaped cross-section. Therefore, the resulting plastic foam material has improved compression strength as well as bending strength as compared to the arrangement described above where the outer layers fuse together.

In cases where the foamable tubes are arranged in a staggered arrangement, provided the foamable tubes satisfy equation below, the resin walls or the resin foam walls resulting from the outer layers are filled with foam from the inner layers, thus improving heat-insulation properties.

$$(\phi_2/\phi_3)^2 < 1 - 2\sqrt{3}/(\pi TI)$$

where, $\phi_2$ is the inner diameter of the inner layer, $\phi_1$ is the inner diameter of the inner layer, and TI is the expansion ratio of the foam obtained from the inner layer after foaming.

Finally, since the inner layers foam to become a high-foaming plastic foam material, a light plastic foam material is obtained.

According to this embodiment, a 50 mm single-axis extruder is fed with the materials to make up the inner layer: 50 parts by weight of a high-density polyethylene exemplified by Mitsubishi Petrochemicals product name EY40H, 50 parts by weight of a polypropylene exemplified by Mitsubishi petrochemicals product name PY230, 20 parts by weight of a silane-modified thermoplastic polypropylene exemplified by Mitsubishi Petrochemicals product name XPM800H, and 8 parts by weight of an azodicarbonamide.

These are melt-mulled at 180° C. and extruded in a tube shape. At the same time, the following materials making up the outer layer are fed to a 25 mm single-axis extruder in the amounts specified in Table 4: a high-density polyethylene exemplified by Mitsubishi Petrochemicals product name EY40H, a polypropylene exemplified by Mitsubishi Petrochemicals product name PY230, a silane-modified thermoplastic polypropylene exemplified by Mitsubishi Petrochemicals product name XPM800H, and an azodicarbonamide. These are melt-mulled at 180° C. and are co-extruded using a crosshead die. After cutting into 25 mm lengths, the product is immersed in water at a temperature of 98° C. for one hour.

Referring to FIG. 1, this results in a foamable tube 3 comprising an inner layer 1 and an outer layer 2. The thickness and inner diameter of the inner layer as well as the thickness of the outer layer are indicated in Table 4.

In the examples, described below, foamable tube 3 is used to produce a plastic foam material.

EXAMPLE 26 AND 27 OF TABLE 4

In the figures, "front" refers to the rightward direction.

Figure 2:
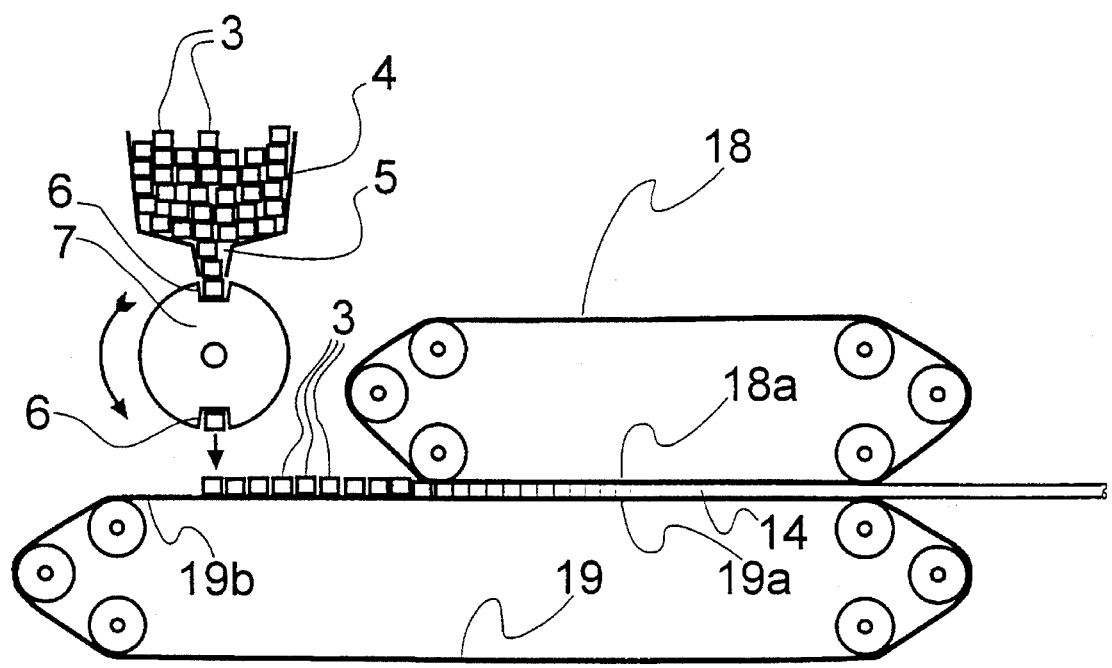
FIG. 2 is a fragmentary side view of an embodiment of a device used to produce plastic foam material according to an embodiment of the present invention.

Referring to FIG. 2, plastic foam material 3, produced as described above, is fed to a hopper 4.

An exit hole 5 is arranged at a bottom of hopper 4 having a shape corresponding to cavities 6 arranged on a circumference of a 200 mm radius rotating roller 7. Rotating roller 7 is near exit hole 5.

Figure 3:
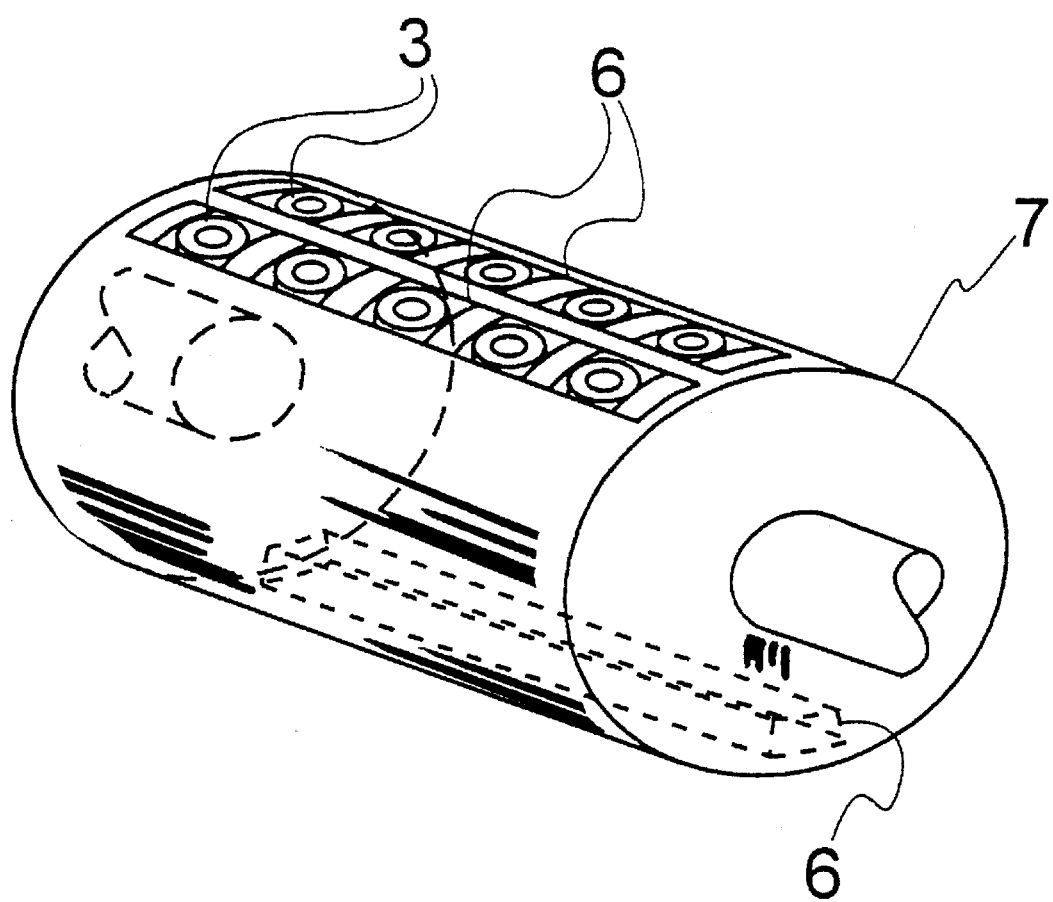
FIG. 3 is a perspective view of a rotating roller in the embodiment of FIG. 2.

Referring to FIG. 3, cavities 6 arranged on the circumference of rotating roller 7 have a shape that corresponding to foamable tube 3, and are arranged at 100 mm intervals in the axis direction and 157 mm intervals along the circumference. FIG. 3 shows only one part of cavities 6.

Referring again to FIG. 2, rotating roller 7 rotates in a counterclockwise direction. When cavity 6 is directly below exit hole 5, foamable tubes 3 in hopper 4 drop into cavity 6. A rear extension 19b of a tetrafluoroethylene lower continuous moving belt 19 is located below rotating roller 7 at a distance roughly equal to the height of plastic foam material 3. When rotating roller 7 rotates and cavity 6 is positioned straight down, foamable tubes 3 are placed onto rear extension 19b. Continuous moving belts 18, 19 are arranged in front of rotating roller 7 at a distance equal to the height of foamable tube 3.

An upper continuous moving belt facing side 18a and a lower continuous moving belt facing side 19a act as thickness-regulating bodies. The foamable tubes 3 dropped from rotating roller 7 are arranged and supported naturally between continuous moving belt facing sides 18a, 19a by continuous moving belt 19, located below rotating roller 7. A heating device, not shown in the figures, applies 230° C. for 7 minutes, causing the blended resin composition to foam.

Figure 4:
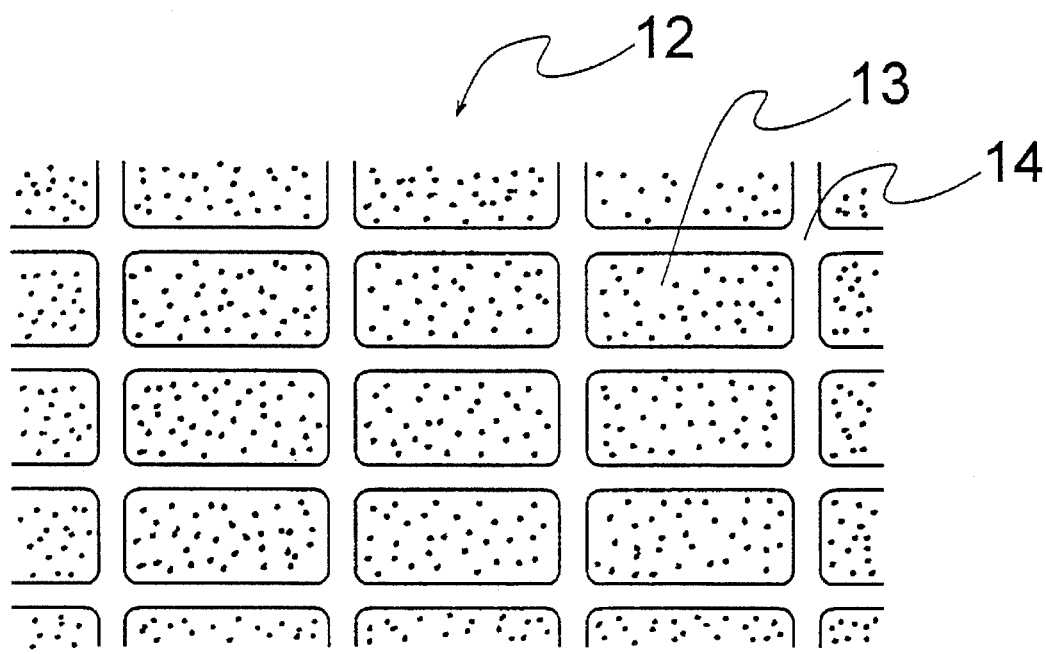
FIG. 4 is a detail plan view of a plastic foam material according to an embodiment of the present invention.

Referring to FIG. 4, a sheet-shaped plastic foam material 12 is formed by the fusion of foam from inner layer 1 within a resin wall 14 resulting from the metamorphosis of outer layer 2 of tubes 3.

Table 4 shows the results of measuring the following properties of the resulting plastic foam material: the expansion ratios as observed from the inner layer and the outer layer of the plastic foam material, the thickness of the plastic foam material, 25 percent compression strength, compression-permanent-setting, and heat conductivity. The measurements were made according to the methods described below.

The expansion ratios were measured according to JIS K6767. The thickness of the plastic foam material was measured by measuring ten arbitrary points on the plastic foam material and calculating the average. The 25 percent compression strength was measured according to JIS K6767. The compression-permanent-setting was measured according to JIS K6767. Heat conductivity was measured according to JIS A1418.

EXAMPLES 28 AND 29 OF TABLE 4

Figure 5:
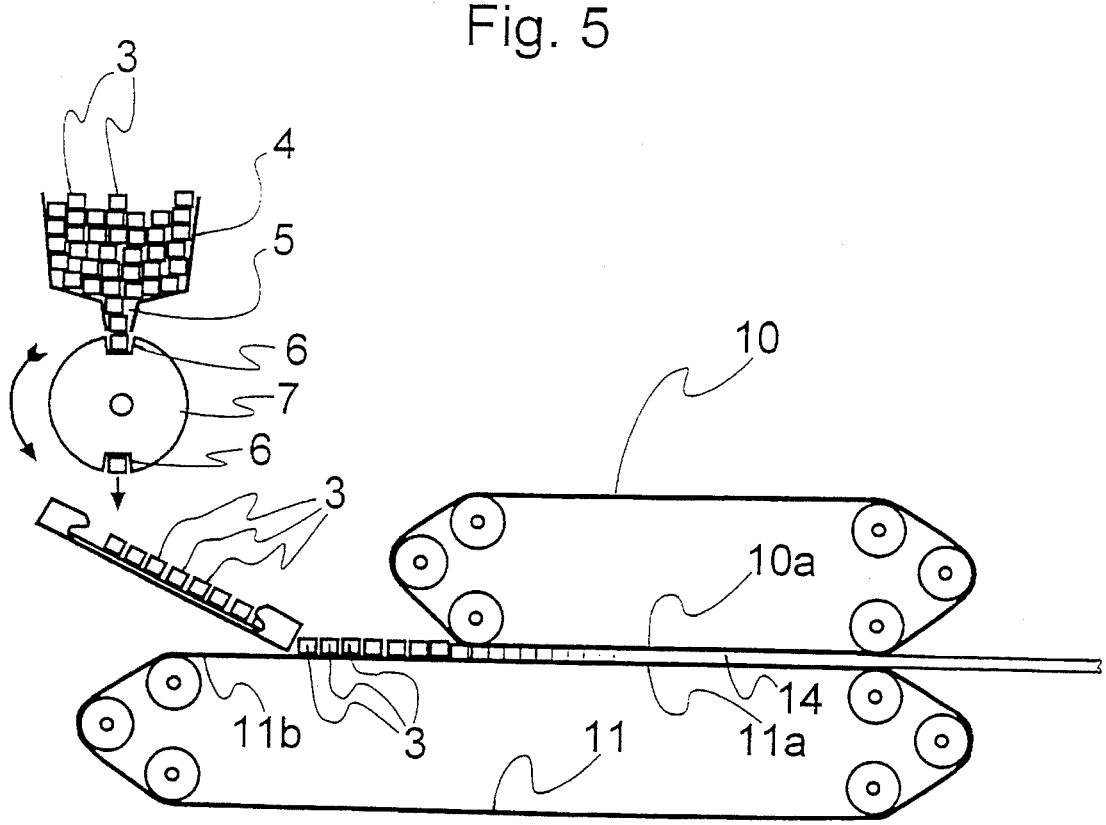
FIG. 5 is a fragmentary side view of an embodiment of a device used to produce foam bodies according to an embodiment of the present invention.
Figure 6:
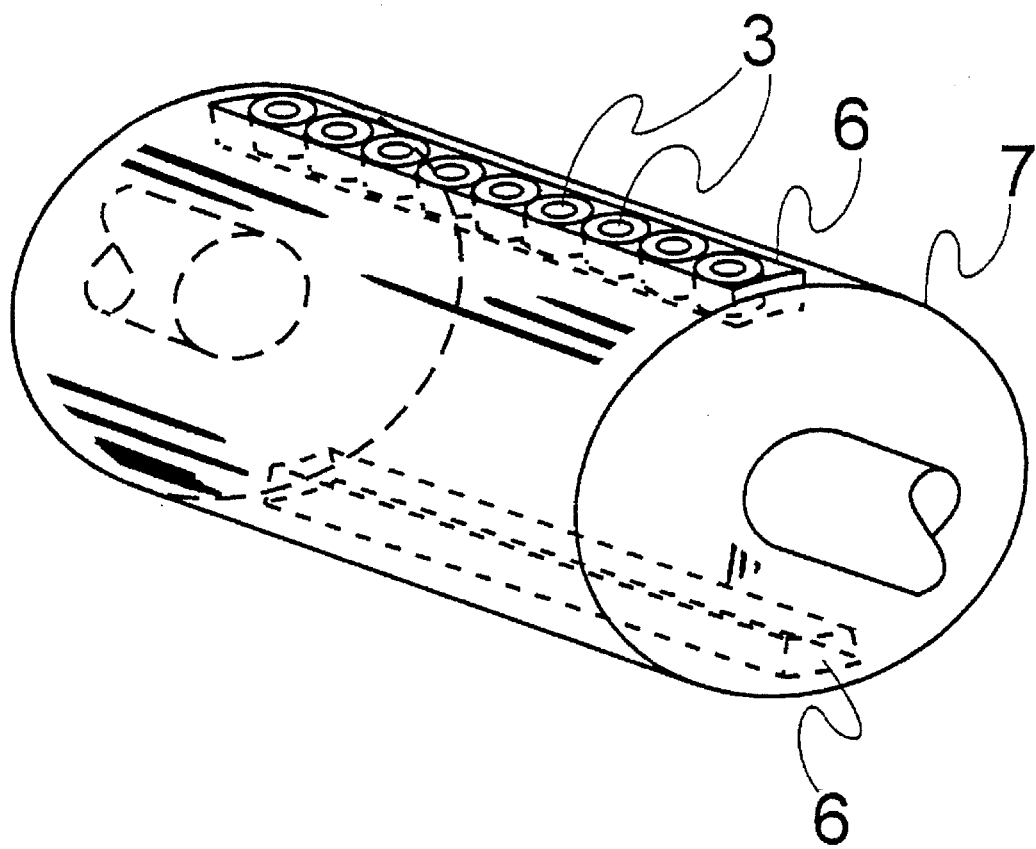
FIG. 6 is a perspective view of a rotating roller in the embodiment of FIG. 5.
Figure 7:
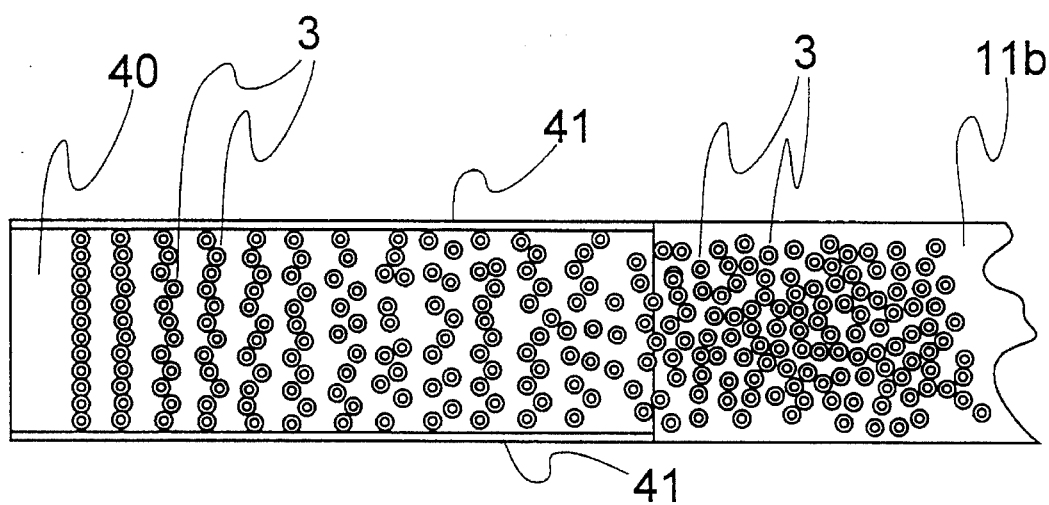
FIG. 7 is a fragmentary side view of a feed plate according to the embodiment of FIG. 5.

Referring to FIGS. 5–7, plastic foam material 3, produced as described above, is fed to a hopper 4. An exit hole 5 at a bottom of hopper 4 has a shape corresponding to cavities 6 on a circumference of a 200 mm radius rotating roller 7. Rotating roller 7 is near exit hole 5. Cavities 6 on the circumference of rotating roller 7 have a shape that corresponding to foamable tube 3, and are spaced at 100 mm intervals in the axis direction and 157 mm intervals along the circumference. Cavity 6 has a rectangular shape, and exit hole 5 of hopper 4 has a corresponding shape. Only 2 cavities are depicted, but it is possible to arrange 3 or more cavities as well.

Rotating roller 7 rotates in a counterclockwise direction. When cavity 6 is directly below exit hole 5, foamable tubes 3 in hopper 4 drop into cavity 6. Vibrating feed plate 40 slopes forward and downward between rotating roller 7 and a rear extension 11b of a tetrafluoroethylene continuous moving belt 11. Feed plate 40 is arranged so that the distance between the rear part of feed plate 10 and rotating roller 7 is roughly equal to the height of foamable tube 3, and the front part of feed plate 40 is arranged so that it is positioned above rear extension 11b. Side walls 41 are on both ends of feed plate 40.

Continuous moving belts 10, 11 are arranged in front of feed plate 40. An upper continuous moving belt facing side 10a and a lower continuous moving belt facing side 11a act as thickness-regulating bodies. The foamable tubes 3 as dropped from rotating roller 7 are arranged and supported naturally between continuous moving belt facing sides 10a, 11a by continuous moving belt 11, located below rotating roller 7. When foamable tubes 3 are sent from rotating roller 7 to feed plate 40, the weight of foamable tubes 3 as well as the vibrations of feed plate 40 cause foamable tubes 3 to move forward on feed plate 40. The vibrations of feed plate 40 is produced by conventional means and is therefore not shown, nor further described. Foamable tubes 3 are placed on rear extension 11b arranged in such a way that each foamable tube is in contact with at least one other foamable tube. A conventional heating device, not shown in the figures, applies 230° C. for 7 minutes, causing the blended resin composition to foam.

Table 4 shows the results of measuring the following properties of the resulting plastic foam material: the expansion ratio of the foam from the inner layer and the outer layer of the plastic foam material, the thickness of the resulting plastic foam material, 25 percent compression strength, compression-permanent-setting and heat conductivity. The measurements were made using the same methods as above.

EXAMPLES 30–33 OF TABLE 4

Figure 8:
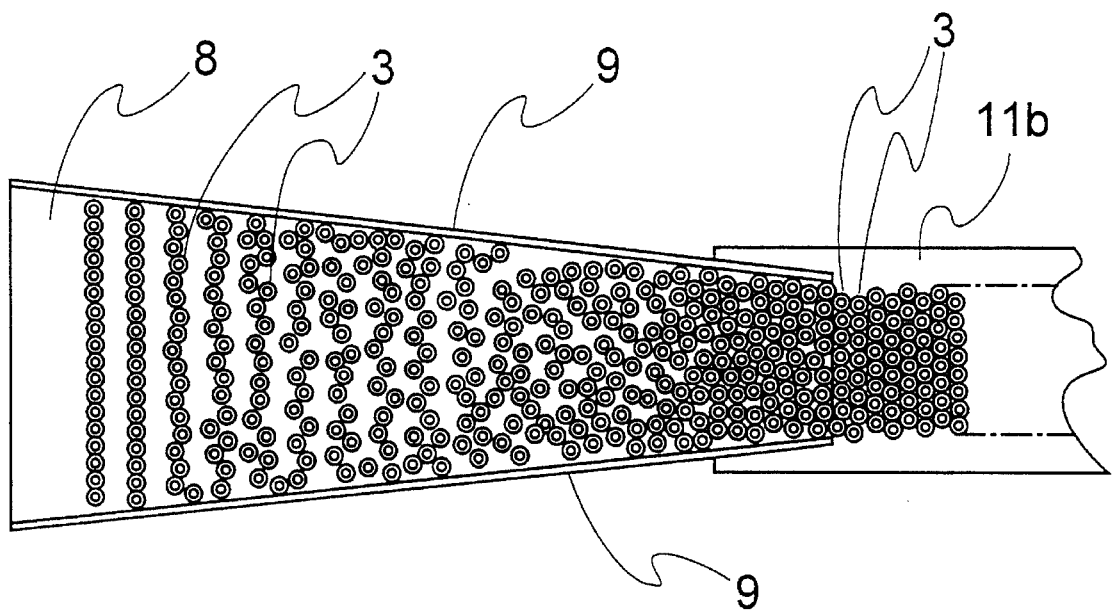
FIG. 8 is a fragmentary view of a feed plate according to an embodiment of the present invention.
Figure 9:
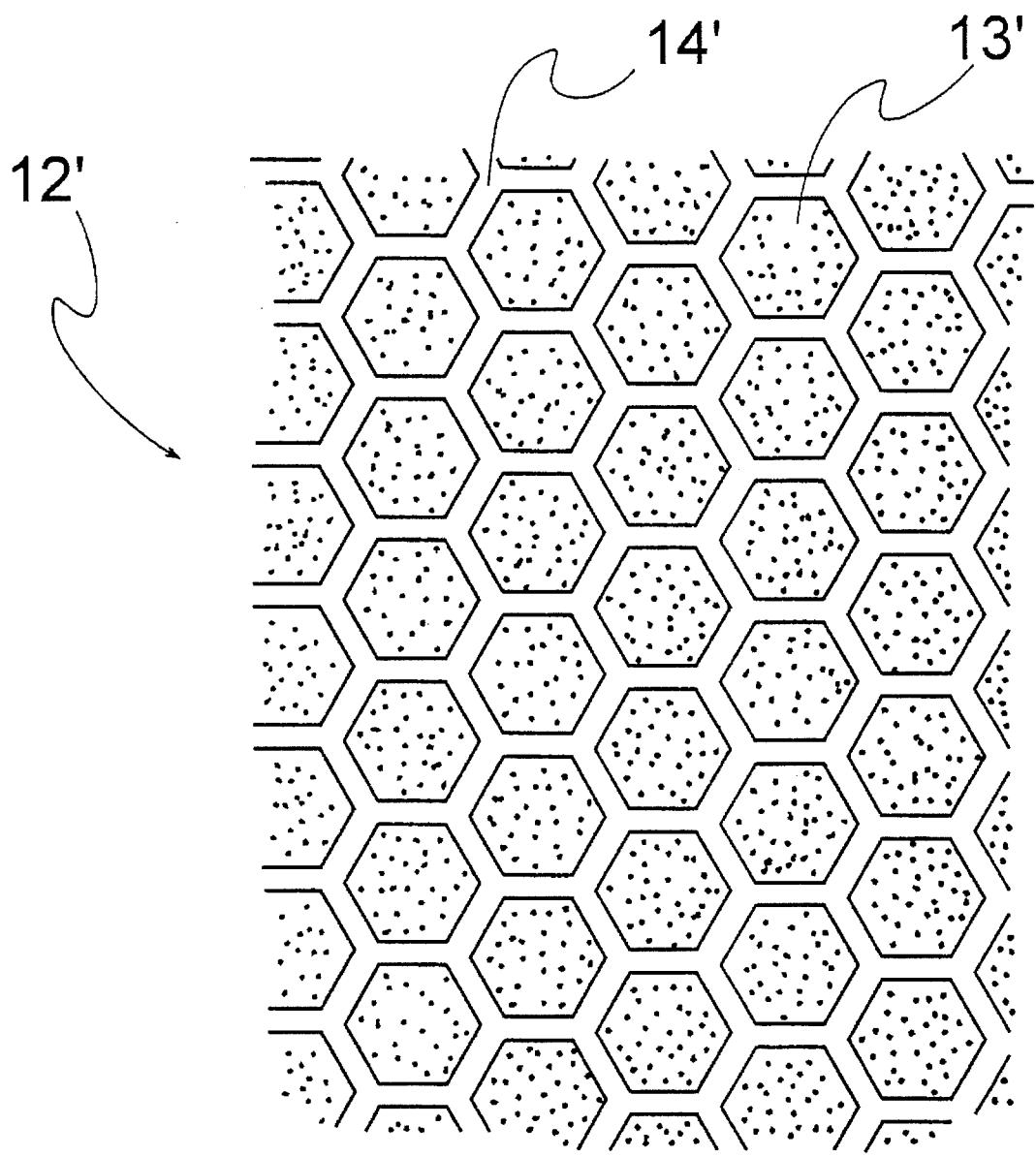
FIG. 9 is a detail plan view of a plastic foam material produced according to an embodiment of the present invention.

Referring to FIGS. 8 and 9, a plastic foam material as shown in FIG. 9 was obtained in the same manner as in Example 28 of Table 4 except that a feed plate 8, tapered toward the front or downward end, is used instead of feed plate 40.

When foamable tubes 3 move forward due to their own weight and the vibrations of feed plate 8, side walls 9 on feed plate 8 guide foamable tubes 3 toward the center line of feed plate 8 because of the tapering of feed plate 8.

Figure 10:
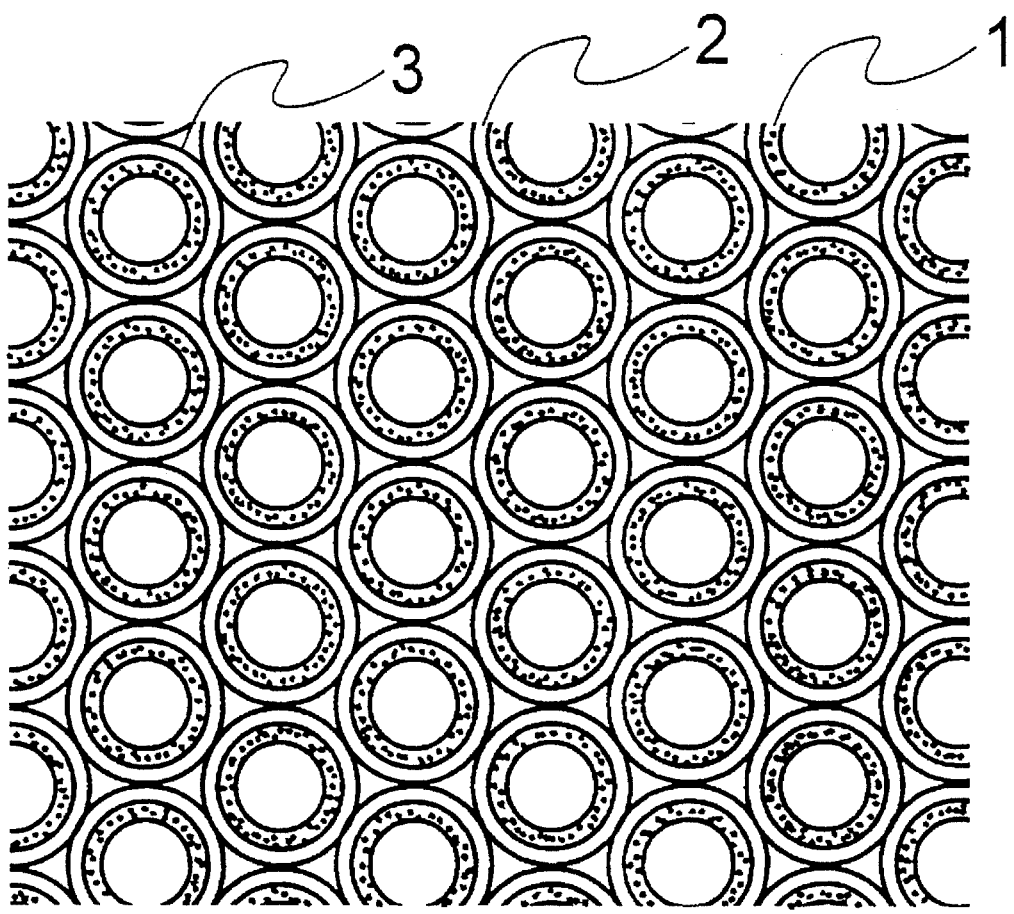
FIG. 10 is a detailed plan view of a plurality of tubes produced according to an embodiment of the present invention and arranged in a staggered formation.

Referring to FIG. 10, using feed plate 8 permits foamable tubes 3 to be arranged in a stable staggered fashion with each foamable tube touching at least one other foamable tube.

Arrangement B of Table 4 shows the results of measuring the following properties of the plastic foam material produced by using feed plate 8: the expansion ratio of the foam obtained from the inner layer and the outer layer, the thickness of the plastic foam material body, 25 percent compression strength, compression permanent setting and heat conductivity. The measurements were made using the same methods as above.

COMPARATIVE EXAMPLES 11–13 OF TABLE 4

A 50 mm single-axis extruder is fed with the following materials: 50 parts by weight of high-density polyethylene exemplified by Mitsubishi Petrochemicals product name EY40H, 50 parts by weight of polypropylene exemplified by Mitsubishi Petrochemicals product name PY 230, 20 parts by weight of silane-modified thermoplastic polypropylene exemplified by Mitsubishi Petrochemicals product name XPM800H, and 8 parts by weight of azodicarbonamide. This mixture is melt-mulled at 180° C., extruded in a tube shape, and cut to 25 mm lengths. The foamable tubes are completed after immersion in water for an hour at 98° C.

Plastic foam material were produced in the same way as in examples 26 and 28 using single layer foamable tubes instead of two-layer foamable tubes.

Table 4 shows the results of measuring the following properties of the resulting plastic foam material: the expansion ratio of the foam created by the inner layer and the outer layer of the plastic foam material, the thickness of the plastic foam material, 25 percent compression strength, compression permanent setting and heat conductivity. The measurements were made according to the same methods as used above.

Referring to Table 4, an arrangement of mutually touching foamable tubes arranged in a staggered fashion provides a better compression strength in the resulting plastic foam material compared to an arrangement where adjacent outer layers fuse together.

The method of producing plastic foam material of the present invention is described above. According to the present invention, it is possible to provide plastic foam materials having lattice-shaped or honeycomb-shaped cross sections, superior rigidity in compression strength, bending strength, and, because foam is present within the resin walls, superior heat-insulating properties and lightness.

A porous foam plate made from a plurality of foamable tubes 3 according to the method of the present invention has good permeability for water, air, and sound.

TABLE 4

| Resin forming the outer layer | Example | | | | | | | | Comparative Example | | |
|---|---|---|---|---|---|---|---|---|---|---|---|
| | 26 | 27 | 28 | 29 | 30 | 31 | 32 | 33 | 11 | 12 | 13 |
| High-density polyethylene | — | 50 | — | 50 | — | 50 | — | 50 | — | — | — |
| Polypropylene | 100 | 50 | 100 | 50 | 100 | 50 | 100 | 50 | — | — | — |
| Silane graft polyethylene | — | 20 | — | 20 | — | 20 | — | 20 | — | — | — |
| Azodicarbonamide | — | 1 | — | 1 | — | 1 | — | 1 | — | — | — |
| Inner diameter inner layer (mm) | 36 | 36 | 36 | 36 | 37.5 | 37.5 | 36 | 36 | 36 | 36 | 36 |
| Outer diameter inner layer (mm) | 38 | 38 | 38 | 38 | 38 | 38 | 38 | 38 | 38 | 38 | 38 |
| Thickness of outer layer (mm) | 1 | 1 | 1 | 1 | 1 | 1 | 1 | 1 | — | — | — |
| Expansion ratio of outer layer | — | 2.5 | — | 2.5 | — | 2.5 | — | 2.5 | — | — | — |
| Expansion ratio of inner layer | 20 | 19 | 20 | 19 | 20 | 20 | 20 | 19 | 20 | 20 | 20 |
| Thickness (mm) | 25 | 25 | 25 | 25 | 25 | 25 | 25 | 25 | 25 | 25 | 25 |
| 25% compression strength (kg/cm$^2$) | 3.86 | 3.23 | 4.20 | 3.64 | 4.87 | 4.04 | 5.02 | 4.83 | 1.40 | 2.38 | 2.47 |
| Compression-permanent-setting | 7.4 | 6.8 | 7.1 | 7.0 | 7.0 | 6.9 | 7.3 | 7.1 | 6.5 | 6.7 | 6.9 |
| Heat Conductivity | 0.04 | 0.03 | 0.04 | 0.03 | 0.07 | 0.05 | 0.04 | 0.03 | 0.03 | 0.03 | 0.03 |
| Arrangement of foam tubes | A | A | A | A | B | B | B | B | A | A | B |

Arrangement A is arrangement where outer layers fuse together.
Arrangement B is staggered arrangement with tubes touching each other.

The following is a description of preferred examples of the present invention, described in comparison with the comparative examples.

EXAMPLES 34 AND 35 OF TABLE 5

A blended resin composition is produced using a tumbler to mix 2.25 parts by weight of a high-density polyethylene exemplified by Mitsubishi Petrochemical product name PY20A, 2.30 parts by weight of a high-density polyethylene exemplified by Mitsubishi Petrochemical product name EY40H, 2.40 parts by weight of a homopolypropylene exemplified by Mitsubishi Petrochemical product name MA3, 0.25 parts by weight of a block homopolypropylene exemplified by Mitsubishi Petrochemical product name BC4, and 1.9 parts by weight of a silane-modified polypropylene exemplified by Mitsubishi Petrochemical product name Linklon XPM800HM. Then, a high-foaming blended resin composition is obtained by mixing 5 parts by weight of this blended resin composition and 0.30 parts by weight of a thermodecomposing foaming agent azodicarbonamide exemplified by Otsuka Chemical product name Uniform AZ SO-20.

Next, the blended resin composition and the high-foaming resin material are fed to two separate twin-axis extruders, melt-mixed at 180° C., and co-extruded to form a two-layer tube, which is cut every 30 mm. Referring to FIG. 1, the result is tube 3 having inner layer 1 comprising a high-foaming blended resin composition and outer layer 2 comprising a blended resin composition.

Referring to FIGS. 5 and 8, the resulting plurality of tubes 3 are deposited in hopper 4. Hopper 4 has wide exit hole 5. Rotating roller 7 having wide cavities 6 for holding tubes extending in the axis-direction and arranged symmetrically on the circumference is disposed below hopper 4 and near exit hole 5. An aperture of wide cavity 6 has a shape matching the shape of exit hole 5 of hopper 4. Rotating roller 7 turns in a counterclockwise direction. When cavity 6 comes directly below exit hole 5, a plurality of tubes 3 in hopper 4 fall into cavity 6 in a row.

Vibrating feed plate 8 is inclined frontward and downward below rotating roller 7. Feed plate 8 is shaped so that its width tapers from back to front, with side walls 9 arranged vertically on both side edges.

Referring also to FIG. 6, when rotating roller 7, holding a row of tubes in cavity 6, rotates 180 degrees, the opening of cavity 6 is turned downward so that tubes 3 inside cavity 6 fall onto feed plate 8 in one row. Instead of two cavities 6, it is possible to use three or more cavities 6 arranged radially. By the time tubes 3 reach the exit of feed plate 8, they are arranged in a stable staggered formation due to side walls 9 moving tubes 3 toward the center line of feed plate 8 and due to the vibrations of feed plate 8.

Continuous drive belts 10, 11 having thicknesses of 1 mm and separated by an distance roughly equal to the height of tube 3 are near the exit of feed plate 8. The exit of feed plate 8 is located near an upper surface of rear extension 11b. The two continuous belts 10, 11 serve as regulating members to restrict foaming in the axis direction during heat-foaming, with opposing surfaces 10a, 11a of continuous belts 10, 11 serving as the regulating surfaces for tubes 3. Opposing surfaces 10a, 11a are preferably moved at an identical speed from back to front.

Tubes 3, arranged in a staggered formation, move from the tip of feed plate 8 onto rear extension upper surface 11b of lower continuous belt 11 due to the vibrations of feed plate 8 as well as gravity. Referring to FIG. 10, the plurality of foamable tubes 3 on rear extension upper surface 11b are arranged in a staggered formation so that they touch each other. With the movement of upper and lower continuous belts 10, 11, tubes 3, arranged in the manner described, are supported naturally by the two opposing surfaces 10a, 11a.

Figure 11:
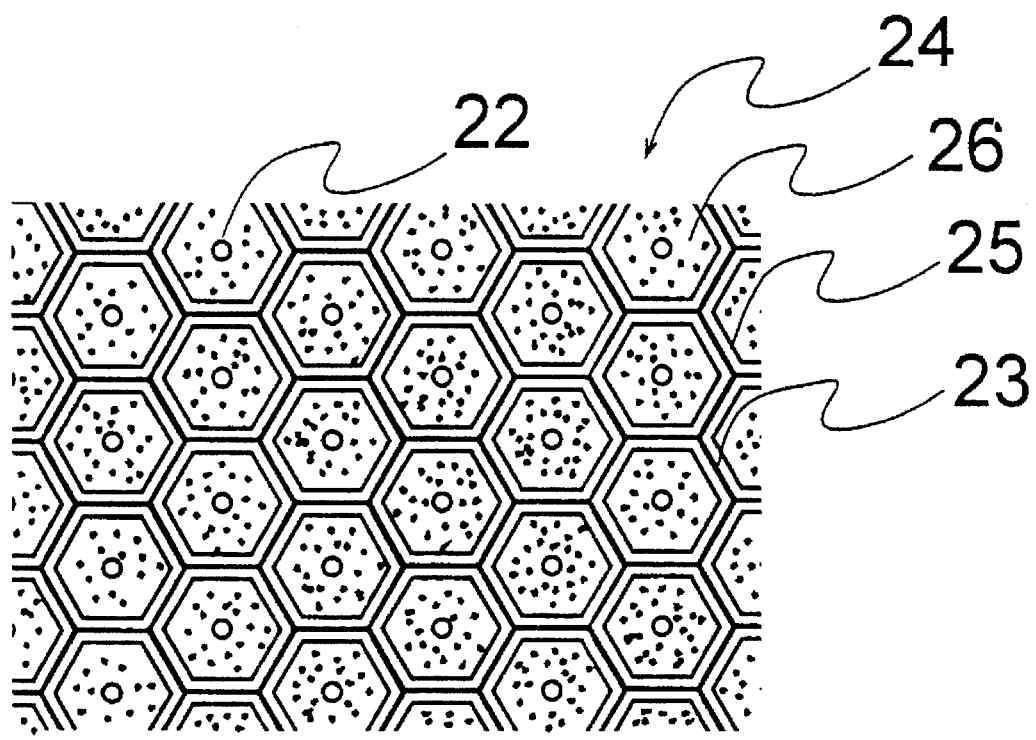
FIG. 11 is a detail plan view of a plastic foam material produced according to an embodiment of the present invention.

Tubes 3 are heated for 30 minutes at 210° C. by an electric heater not shown in the drawings. The foaming blended resin composition foams so that each tube 3 expands both inward and outward, thus filling the gaps between the tubes. Referring to FIG. 11, each tube 3 changes into a hexagonal tube 13 having a center hole 22 passing through the resulting plastic foam material. The outer layers fuse together, thus making a one-piece porous foam plate 24. Hexagonal shaft 23 has an outer layer 25 and an inner layer 26. Table 5 shows the inner diameter of the inner layer and the outer diameter of the outer layer for examples 34 and 35.

COMPARATIVE EXAMPLE 14

Referring to Table 5, a porous foam plate was obtained in the same way as in example 34 except that the inner diameter of the outer layer of the two-layer tube is different from examples 34 and 35.

EXAMPLES 36 AND 37 OF TABLE 5

Two blended resin compositions were obtained by mixing 4 parts by weight of the blended resin composition from example 34 and 0.04 and 0.24 parts by weight of the foaming agent.

Next, the blended resin compositions are fed to two separate twin-axis extruders so that the low foaming plastic resin compound obtained from the mixture using 0.04 parts by weight of thermodecomposing foaming agent forms the outer layer, and co-extrusion takes place. Other than what is described above, the examples obtain a porous foam plate in the same manner as in example 34. The inner diameter of the inner layer and the inner diameter of the outer layer of the tubes are as shown in FIG. 1.

COMPARATIVE EXAMPLE 15

A porous foam plate is obtained in the same manner as example 34 except that, as shown in Table 5, the inner diameter of the outer layer of the two-layer tube is different from examples 36 and 37.

A square of the porous foam plate from each of the examples was fixed in a container at a height just above the edge of the container so that the perimeter of the square was flush with the inner surface of the container. Water was poured from a height 20 cm above the top surface of the porous foam, and the amount of water falling to the bottom of the container in five minutes was measured. The results, and the diameter of the center holes in the different examples, are indicated in Table 5.

Figure 12:
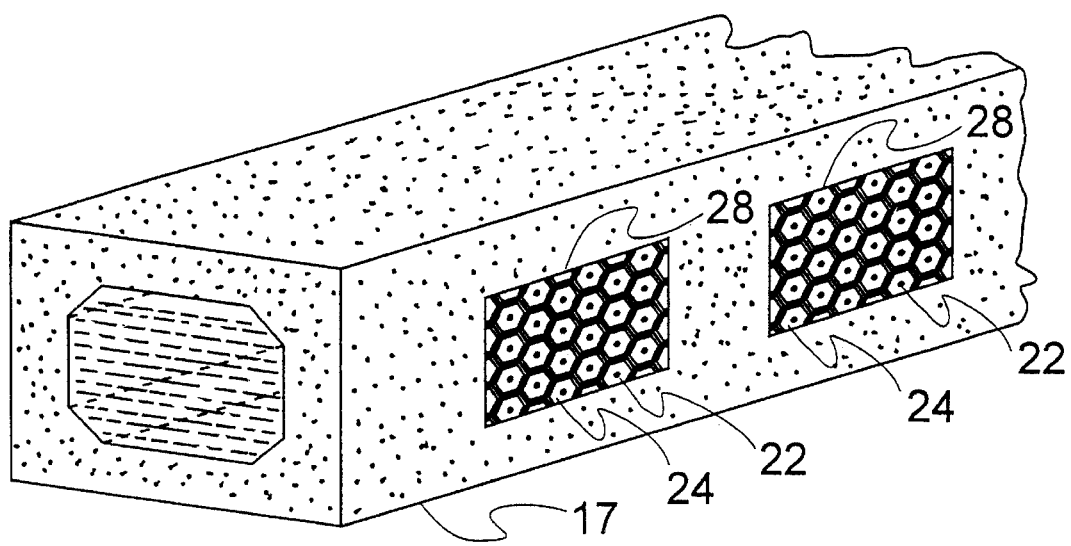
FIG. 12 is a fragmentary perspective view of a sewage pipe produced using porous foam plates produced according to an embodiment of the present invention.

Referring to FIG. 12, porous foam plate 24 used in a square concrete sewage pipe 17 is shown. Wide rectangular windows 28 are arranged at prescribed length-wise intervals on both sides of sewage pipe 17. A porous foam plate 24 having a size matching the aperture area is fitted and fixed in each window 28. Because porous foam plate 24 has a plurality of holes 22 therethrough, when water is poured into sewage pipe 17 to a fixed level or higher, water flows from sewage pipe 17 to the surrounding earth naturally and gradually through holes 22, thus preventing sewage pipe 17 from filling up with water.

Porous foam plates according to the method of the present invention have good permeability for water, air, and sound. Thus, they can be used in ways other than the one for sewage pipe 17 described above as well.

In the porous foam plate obtained by the method of the present invention, the outer layers of each of the transformed hexagonal tube forms a honeycomb structure of plastic resin or a low-foaming body having a expansion ratio of 3 or less. This results in good rigidity. The part inside the honeycomb structure is a high-foaming body with a expansion ratio of 5 or more. This increases the overall lightness of the porous foam plate. Also, because each transformed hexagonal tube has a hole therethrough with a diameter of from 1 to about 10 mm, the porous foam plate itself has a plurality of holes with diameters of from 1 to about 10 mm in an orderly arrangement at fixed intervals, thus making it appropriate for sewage pipes, as described above. Furthermore, production is easy and efficient.

EMBODIMENT 4

According to the fourth embodiment, a plastic foam material is formed from a thermoplastic core foam material (hereinafter referred to as "core material") which is integrally placed within each lattice or hexagonal space of a thermoplastic cover foam material (hereinafter referred to as "cover material") having a cross-section with a lattice or honeycomb shape. The cover material includes at least one of a cover material and a thermoplastic resin.

The expansion ratio of the core material is from about 10 to about 50, while the expansion ratio of the cover material is lower than the expansion ratio of the core material, with the difference of the expansion ratios being at least 5 or greater. The present embodiment can also include thermoplastic core foam materials formed integrally in each lattice or hexagonal space of a thermoplastic resin body having cross-section with a lattice or honeycomb shape.

The cover material, the core material and the thermoplastic resin body above include a thermoplastic resin which can be used individually or in combination with other resins. Such a thermoplastic resin includes at least one of an olefin resin such as low-density polyethylene, high-density polyethylene, straight-chain low-density polyethylene, random polypropylene, homopolypropylene, block polypropylene, polyvinyl chloride, chlorinated polyvinyl chloride, ABS resin, polystyrene, polycarbonate, polyamide, polyvinylidene fluoride, polyphenylene sulfide, polysulfone, polyether ether ketone, or copolymers thereof.

It is desirable to use one or a mixture of an olefin resin such as low-density polyethylene, high-density polyethylene, straight-chain low-density polyethylene, random polypropylene, homopolypropylene, or block polypropylene as the thermoplastic resin in the cover material, the core material, and the thermoplastic material because the final plastic foam material will exhibit improved resiliency. In particular, high-density polyethylene and homopolypropylene are especially desirable.

Identical or different thermoplastic resins can be used for the cover material and the core material, as well as the resin body and the core material.

The thermoplastic resins used in the cover material and the core material can be cross-linked if necessary. Cross-linking is advantageous because it improves the expansion ratio and allows the final plastic foam material to be light.

It is possible to add a reinforcing agent such as short-fiber glass, short-fiber carbon, or short-fiber polyester or a filler such as calcium carbonate, aluminum hydroxide, or glass powder to the thermoplastic resins used in the cover material, the core material, and the resin body in order to improve the strength of the plastic foam material.

When short fibers are added as a reinforcer, too much fiber can cause cell destruction during foaming, thus preventing a high expansion ratio. Very little fiber content can substantially decrease the reinforcing effect on the plastic foam material.

Therefore it is desirable to use from about 1 to about 20 parts by weight of the short fiber per 100 parts by weight of the thermoplastic resins used in the cover material, the core material, and the resin body. Using from about 3 to about 10 parts by weight is especially desirable.

The length the of the short fibers is similar to the previous embodiments.

When adding a filler, it is desirable to add from about 10 to about 100 parts by weight of the filler per 100 parts by weight of the thermoplastic resins for use in forming the cover material, the core material and the thermoplastic resin.

If too much filler is added, the resulting plastic foam material is too heavy. If too little is added, the resulting plastic foam material is inadequately reinforced. It is preferable to add from about 30 to about 50 parts by weight of the filler.

An increase in the expansion ratio of the core material causes a subsequent increase in the radial heat transfer of the plastic foam material which, in turn, increases heat conductivity of the plastic foam material while decreasing its insulating properties.

If the expansion ratio of the core material is too low, the resulting plastic foam material is too heavy. Therefore the expansion ratio of the core material should be from about 10 to about 50, more preferably from about 10 to about 50, and most preferably from about 15 to about 40. A expansion ratio of from 15 to about 30 is especially desirable.

If the core material is too thick, the plastic foam material is substantially weakened. If it is the core material is very thin, the resulting plastic foam material becomes heavy. Therefore a thickness of from about 10 to about 200 mm is desirable, and preferably from about 20 to about 100 mm.

The thickness of the core material does not need to be uniform. It can be non-uniform. The thickness of the core material referred to here refers to the maximum thickness measured along a cross section.

The expansion ratio of the cover material should be lower than the expansion ratio of the core material. The difference between the expansion ratios should be at least 5 or greater. However, if the difference between the two materials is less than 5, the strength of the plastic foam material is compromised, resulting in a weak foam material.

Therefore, it is preferred that the differences in the expansion ratios between the core and the cover materials be from about 5 to about 39, and more preferably from about 15 to about 29.

If the cover material is too thick, the plastic foam material is heavy, while if it is too thin, the strength of the plastic foam material is too low. Therefore the cover material should measure from about 0.05 to about 5 mm in thickness, and more preferably from about 0.1 to about 2 mm.

If the thermoplastic resin body is too thick, the plastic foam material is heavy, while if it is too thin, the strength of the plastic foam material is low. Therefore the resin body should measure from about 0.05 to about 30 mm in thickness, and more particularly from about 0.1 to about 2.0 mm.

The thickness of the cover material and the resin body can be either uniform or non-uniform. The thickness of the cover material and the thermoplastic resin body referred to here refers to the average thickness of the walls forming the lattice or honeycomb along the cross section of the plastic foam material.

If the proportion of the cover material in the plastic foam material is too high, the plastic foam material is too heavy. If it is very low, the strength of the plastic foam material decreases. Therefore the amount of the cover material in the plastic foam material should be from about 10 to about 50 parts by weight, with 10 to about 30 parts by weight being preferred.

For similar reasons, it is desirable that the proportion of the thermoplastic resin body in the plastic foam material be from about 5 to about 35 parts by weight, with from about 8 to about 25 parts by weight being preferred.

The plastic foam material of the present embodiment comprises a cover material and a core material, or a thermoplastic resin body and a core material wherein a cross section of the cover material and the thermoplastic resin body forms a lattice shape or a honeycomb shape. The use of a thermoplastic resin body or a honeycomb shape is advantageous because it improves rigidity in the thickness-direction of the plastic foam material. The shapes of the spaces in the lattice do not have to be identical.

In the present embodiment, honeycomb refers to a cross-section having the shape of cells in a bee hive. Specifically, it refers to hexagonal shapes extended in two dimensions so that each side of each of the hexagons are shared with other hexagons. The hexagons do not have to be identical in shape, and do not have to have to be equilateral as long as they can be identified as hexagons by sight.

The plastic foam material of the present embodiment comprising a cover material and a core material, or a thermoplastic resin body and a core material, is generally formed as a sheet. However, the method of integrating the cover material and the core material, or the thermoplastic resin body and the core material, is not particularly specified.

Thermal fusion is generally used, but an adhesive material can also be used. In thermal fusion, if different thermoplastic resins are used for the cover material and the core material, or the thermoplastic resin body and the core material, the thermoplastic resins must be capable of being thermally fused to each other.

The following combinations are examples of suitable thermoplastic resins which can be thermally fused with one another: high-density polyethylene and low-density polyethylene, high-density polyethylene and straight-chain low-density polyethylene, high-density polyethylene and homopolypropylene, and polyvinyl chloride and polyvinyl acetate.

The following combinations are desirable because they improve the strength and resilience of the final plastic foam material: high-density polyethylene and low-density polyethylene, high-density polyethylene and straight-chain low-density polyethylene, and high-density polyethylene and homopolypropylene. In particular, the combination of high-density polyethylene and homopolypropylene is especially desirable.

The polymer for use in forming the adhesive material must be capable of effectively joining the cover material and the core material or the thermoplastic resin and the core material. Suitable polymers for the adhesive material include ethylene vinyl acetate, ethylene vinyl chloride copolymer, a copolymer of the thermoplastic resin monomers forming the cover material and the core material, and a copolymer of the thermoplastic resin monomers used for forming the thermoplastic resin body and the core material.

To improve the adhesive properties of the adhesive, a copolymer of the monomers from the thermoplastic resin used for forming the cover material, the core material, or the thermoplastic resin body is preferred.

The method of making the "plastic foam material" of the present embodiment may include one of the following methods:

(1) Using a plurality of foamable pieces, wherein each one of the plurality of foamable pieces have identical heights and are arranged on a first thickness regulating body. Each one of the plurality of foamable pieces is positioned such that its lower surfaces touches the first thickness regulating body. This allows the adjacent cover materials to fuse together. When foaming takes place, adjacent cover materials fuse together. Upon foaming, the adjacent cover materials fuse together.

Identical pieces which have the same height comprise: (a) a column-shaped core material made of a high-foaming resin containing a thermoplastic resin and a foaming agent, and (b) one of a low-foaming resin cover material containing a thermoplastic resin and a foaming agent and a resin cover material containing a thermoplastic resin covering at least a side-surface of the column-shaped core material.

This plurality of shaped foam pieces are used to form a stacked body which is created by arranging a second thickness regulating body on top. The body is heated and foamed while a fixed interval between the thickness regulating bodies is maintained.

(2) Using a plurality of shaped foam pieces having the same height which comprises: (a) a column-shaped core material made of a high-foaming resin containing a thermoplastic resin and a thermodecomposing foaming agent, and (b) a low-foaming resin cover material containing a thermoplastic resin and a thermodecomposing foaming agent or a resin cover material containing a thermoplastic resin covering the entire surface of the column-shaped core material. This plurality of shaped foam pieces is arranged on a first thickness regulating body so that they do not overlap and so that adjacent cover materials fuse together during foaming. A stacked body created by arranging a second thickness regulating body on top is heated and foamed while a fixed interval between the thickness regulating bodies is maintained.

(3) Using a plurality of shaped foam pieces having the same height which comprises: (a) a column-shaped core material made of a high-foaming resin containing a thermoplastic resin and a thermodecomposing foaming agent, and (b) a low-foaming resin cover material containing a thermoplastic resin and a thermodecomposing foaming agent or a resin cover material containing a thermoplastic resin covering at least the side-surface of the column-shaped core material. This plurality of shaped foam pieces is arranged on a first thickness regulating body so that one shaped foam piece is arranged for each point and inner area of hexagon in a honeycomb shape which is hypothetically arranged on the first thickness regulating body. The arrangement is such that bottom surfaces of the foam pieces touch the first thickness regulating body, and adjacent cover materials fuse together during foaming.

A stacked body is created by arranging a second thickness regulating body on top. The stacked body is heated and foamed while a fixed interval between the thickness regulating bodies is maintained.

The three methods described above are preferred, but in certain cases, the following method is also used:

(4) A core material, a cover material, and a thermoplastic resin body are prepared beforehand. The core material is covered with the cover material or covered with the thermoplastic resin using thermal fusion or an adhesive to form a plastic foam material.

Method (3) must be used if a plastic foam material is to be made such that the cross-section of the cover material and the resin body forms a honeycomb shape.

In the methods described above, the high-foaming resin core material and the low-foaming resin cover material contain a thermoplastic resin which is thermoplastic, together with a foaming agent. The resin cover material contains a thermoplastic resin.

The thermoplastic resin described above need not be particularly specified as it can include at least one of resins such as low-density polyethylene, high-density polyethylene, straight-chain low-density polyethylene, random polypropylene, homopolypropylene, block polypropylene, polyvinyl chloride, chlorinated polyvinyl chloride, ABS resin, polystyrene, polycarbonate, polyamide, polyvinylidene fluoride, polyphenylene sulfide, polysulfone, polyether ether ketone, or copolymers thereof.

Using one, or a mixture of, olefin resins such as low-density polyethylene, high-density polyethylene, straight-chain low-density polyethylene, random polypropylene, homopolypropylene, or block polypropylene as the thermoplastic resin is preferred in the high foaming resin core material, the low foaming resin cover material, and the resin cover material because the plastic foam material would have improved resiliency. In particular, high-density polyethylene and homopolypropylene are especially desirable The thermoplastic resin used in the high foaming resin core material and the low foaming resin cover material can be cross-linked. The method used for cross-linking may include the same methods recited previously with regards to embodiment 3.

The silane-modified thermoplastic resins for use in melt-mulling are similar to the ones used in embodiment 3.

Similar to embodiment 3, silane-modified thermoplastic resin refers to a thermoplastic resin modified with an unsaturated silane compound.

Generally, unsaturated silane compounds are expressed as $$RR'_m SiY_{3-m}$$

where:

R includes an alkenyl exemplified by vinyl, allyl, propenyl, or cyclohexenyl or an organic functional group such as a halogenated alkyl exemplified by glycidyl, amino, methacryl, $\gamma$-chloroethyl, or $\gamma$-bromoethyl;

R' includes an aliphatic saturated aromatic hydrocarbon such as methyl, ethyl, propyl, or decyl;

Y includes a hydrolytic organic function group such as methoxy, ethoxy, formyloxy, propionoxy allyl amino; and m is 0, 1, or 2.

In particular, an unsaturated silane compound represented by $$CH_2=CHSi(OA)_3$$

is desirable because of its fast cross-linking reaction, where

A is an aliphatic saturated hydrocarbon with 1 to 8 carbons, with 1 to 4 carbons being preferred. Examples of the unsaturated compound exemplified by $CH_2=CHSi(OA)_3$ include vinyl trimethoxy silane, vinyl triethoxy silane, and vinyl triacetoxy silane. The method for making the silane-modified thermoplastic resin described above can be a conventional method, and is not particularly specified. For example, a silane-modified polyethylene can be made by performing a reaction with polyethylene, an organic peroxide, and an unsaturated silane compound expressed as $$RR'SiY_2,$$

where:

R is an olefin unsaturated group I hydrocarbon or a hydrocarbonoxy,

Y includes a hydrolytic organic group, and

R' is either a R group or a Y group as defined above.

In silane-modified thermoplastic resins having a silyl group, for example, if Y is a methoxy, contact with water leads to hydrolysis, thus creating a hydroxyl. The hydroxyl of different molecules react, creating an Si—O—Si bond, thereby effectively cross-linking the silane-modified thermoplastic resins.

The method for mixing the silane-modified thermoplastic resin is similar to embodiment 3.

The water processing step including is also similar to the step utilized in the third embodiment.

Similar to the third embodiment, water processing may be performed by exposure to steam under pressure and at a temperature higher than 100° C.

If the water or steam temperature during water processing is too low, the cross-linking reaction proceeds too slowly. If the temperature is too high, the outer materials fuse to each other. Therefore, a temperature of from about 50° to about 130° C. is desirable, preferably from about 90° to about 120° C.

If the duration of the water processing is too short, the cross-linking reaction may not proceed to completion, and if the duration is too long, the outer materials may fuse to each other. Therefore, a duration time of from 5 minutes to about 12 hours is preferred.

Excessive amounts of the silane-modified thermoplastic resin causes excessive cross-linking which in turn yields a plastic foam material with a low expansion ratio. Alternatively, if the amount is too small, the foam cells burst, preventing uniform cells. Therefore, about 5 to about 50 parts by weight of the silane-modified thermoplastic resin to 100 parts by weight of thermoplastic resin is preferred, more preferably from about 20 to about 35 parts by weight.

Similar to the previous embodiments, a cross-linking catalyst may be added if necessary to effectively cross-link the various resins. Suitable examples of cross-linking catalysts have been described with regard to the previous embodiments.

It is preferable that the amount of the cross-linking catalyst per 100 parts by weight of the thermoplastic resin be from about 0.001–10 parts by weight, and more preferably from about 0.01 to about 0.1 parts by weight.

The peroxide used in the cross-linking method is the same as previously described. The peroxide for use in the cross-linking gent is similar to the one used in the previous embodiments. In particular, dicumyl peroxide and tertian butyl cumyl peroxide are desirable, and dicumyl peroxide is especially desirable.

For 100 parts by weight of the thermoplastic resin, it is desirable to use from about 0.5 to about 5 parts by weight of a peroxide. From about 1 to about 3 parts by weight is especially desirable.

The method for cross-linking the thermoplastic resins using radiation is similar to embodiment 3, including the specified dosages. From about 1 to about 20 Mrad of radiation dosage is preferred, with about 3 to about 10 Mrad being optimal.

The method for irradiating the thermoplastic resins may include the use of two electron beam generating devices between which a thermoplastic resin is passed, in order to irradiate the thermoplastic resins.

The "high foaming" and "low foaming" referred to in the high foaming resin core material and the low foaming resin cover material are labels referring to the relative expansion ratios of the two. Of the two foam resins, the one which produces the plastic foam material with the higher expansion ratio is called the high foaming resin, while the other is called the low foaming resin.

The foaming agent used in the high foaming resin core material and the low foaming resin cover material is not particularly specified as long as it has a higher decomposition point than the melting point of the thermoplastic resin being used. Suitable examples of foaming agent for use in conjunction with the high foaming core material and the low foaming resin cover material include inorganic thermodecomposing foaming agents such as sodium bicarbonate, ammonium carbonate, ammonium bicarbonate, azide compounds, sodium bicarbonate, azodicarbonamide, azobisisobutylonitryl, N,N'-dinitrosopentamethylene tetramine, P,P'-dinitrosopentamethylene tetramine, P,P'-oxybisbenzenesulfonyl, hydrazide, barium azodicarbonate, trihydradinotriazine. In particular, azodicarbonamide is desirable.

The expansion ratio of the cover material and the core material can be adjusted through selection of the type of thermoplastic resin used in the foaming resin, the degree of polymerization, crystallization, presence of cross-linking, density, type of thermodecomposing foaming agent and amount of foam added.

The expansion ratio is adjusted by controlling the amount of foaming agent added. In such cases, if the amount of foaming agent added is too high, cells break, preventing uniform cell formation and decreasing the compression strength of the plastic foam material. If the amount added is too low, foaming does not occur.

Accordingly, for 100 parts by weight of thermoplastic resins, it is preferable that the amount of the foaming agent be from 1 to about 25 parts by weight.

Adjustments can be made by finding the gas yield corresponding to the desired expansion ratio, and adding an amount of foaming agent capable of generating this gas yield.

The method for making the shaped foamable piece is not particularly specified. In one method, the thermoplastic resin for the high-foaming resin core material and a foaming agent or the like are fed to a twin-axis extruder. The resulting resin is melt-mulled at a temperature lower than the decomposition point of the thermodecomposing foaming agent.

The thermoplastic resin for the low-foaming resin cover material, a foaming agent and the like, or the thermoplastic resin for the low-foaming resin cover material are fed into a different twin-axis extruder and then co-extruded at a temperature lower than the decomposition point of the thermodecomposing foaming agent.

Co-extrusion is performed to extrude a strand-shaped body, which is then cut to prescribed dimensions.

In yet another method, the thermoplastic resin for the high foaming resin core material and a foaming agent are fed to a twin-axis extruder. The resin is extruded at a temperature lower than the decomposition point of the foaming agent. A strand-shaped body is extruded and cut. This is then immersed in an organic solvent in which is dissolved either a low foaming resin or a thermoplastic resin.

If the method involving immersion in an organic solvent is used, the organic solvent is not particularly specified as long as it can dissolve the thermoplastic resin used in the cover material, and the thermodecomposing foaming agent. Examples include aromatic hydrocarbons such as toluene and xylene, halogenated hydrocarbons such as methylene chloride and dichloromethane, and ketone compounds such as acetone and methylethyl ketone.

Specifically, it is desirable to use methylene chloride if the thermoplastic resin for the cover material is polystyrene or polyvinyl chloride, and it is desirable to use methylethyl ketone if polyvinyl chloride is to be used.

The shape of the foamable piece is not important. The shape can include a circular column or a polygonal column such as a square column or a triangular column. A circular column shape should have a symmetrical cross-section in the plastic foam material, so that there is no fluctuation in foaming. This permits the cover material or the thermoplastic resin body to have a neat lattice shape or honeycomb shape, thus providing improved rigidity in the compression strength in the final plastic foam material.

When a circular column shape is used as the foamable piece, its average cross-sectional diameter should be from about 3 to about 20 mm, with a diameter of from 5 to about 10 mm being preferred.

When the diameter of the circular column shape exceeds 20 mm, the ratio of width to height is thought to be considerably high, which substantially weakens the plastic foam material. Alternatively, if the diameter of the foamable circular shape falls below 3 mm, the plastic foam material is very heavy.

If the low-foaming resin cover material is thicker than 3 mm, the plastic foam material is increasingly heavy. If the low-foaming resin cover material is thinner than 0.05 mm, the compression strength of the plastic foam material is considerable weakened.

For similar reasons, it is desirable that the thickness of the resin cover material be from about 0.05 to about 5.0 mm, and more preferable that the thickness be from about 0.5 to about 3.0 mm.

The plurality of shaped foam pieces used in the present embodiment needs to have the same height. In the present embodiment however, they do not need to have the exact same heights as long as their heights are roughly the same.

The thickness regulating bodies used in the present embodiment are determined by a heating method but are not particularly specified. For example, if heating is done by circulating oil, metal can be used. If heating is done through hot air, mesh can be used.

The thickness regulating bodies can be stationary or they can be moving at a fixed speed.

However, if the thickness regulating bodies are driven at a fixed speed, the pair of thickness regulating bodies need to move in the same direction at the same speed.

The method of feeding the shaped foam pieces to the first thickness regulating body is not particularly specified as long as the bottom surface of the shaped foam pieces touch the first thickness regulating body. For example, a rotating roller having holes for the shaped foam pieces arranged perpendicular to the circumference can be used so that shaped foam pieces are supplied to the upper part, and the shaped foam pieces fall straight down from the lower part.

It is desirable that the shaped foamable pieces be arranged in a roughly uniform manner so that the expansion ratio of the plastic foam material does not exhibit local variations.

When the shaped foam pieces are placed on the first thickness regulating body so that their bottom surfaces touch the regulating body and adjacent cover materials fuse together during foaming, it is desirable to arrange the foam pieces so that they have fixed vertical and horizontal intervals. This permits the cross section of the thermoplastic resin or the cover material to form an orderly lattice, thus increasing compression strength in the final plastic foam material.

Also, by arranging the shaped foam pieces so that the center of the bottom surface is positioned at the center and vertices of hexagons making up an imaginary honeycomb arranged on the first thickness regulating body, the cross section of the cover material or the thermoplastic resin is an orderly honeycomb shape. This provides further improvements in the compression strength of the final plastic foam material.

The center of the bottom surface of a shaped foamable piece referred to here refers not to the precise center, but to the central region of the bottom surface.

The length of a side of the hexagon making up the honeycomb shape is determined by factors such as the expansion ratio of the cover and core materials, the thickness of the thermoplastic resin and the desired plastic foam material compression strength. If the sides are too long, the compression strength of the plastic foam material decreases, while if they are too short, the expansion ratio of the plastic foam material decreases. Therefore a length of 5–100 mm is desirable, with a range of 10–50 mm being especially desirable.

Furthermore, it is preferred that the hexagons which make up the imaginary honeycomb shape on the first thickness regulating body should be equilateral. Further, it is preferred that these hexagons fulfill the conditions in the equation:

$$R^2 < L^2 < TS/\sqrt{3},$$

where:

L is the length of one side of the equilateral hexagon,

T is the expansion ratio of the core material,

S is the area of the bottom surface of the shaped foam piece, and

R is the maximum length of the bottom surface of the shaped foam piece. (The maximum length of the bottom surface of the shaped foam piece refers to the length of the longest line on the bottom surface connecting the two points on the outer perimeter of the bottom surface).

When using circular column-shaped foamable pieces, if the hexagons making up the imaginary honeycomb on the first thickness regulating body are equilateral, it is preferred that the high foaming resin core material column body to fulfill the conditions of the equation:

$$4r^2 < L'^2 < T'r\pi/\sqrt{3},$$

where:

L' is the length of one side of an equilateral hexagon,

T' is the expansion ratio of the core material, and r is the radius of the bottom surface of the high foaming resin core material column, which is covered by the low foaming resin cover material.

When shaped foamable pieces with a high-foaming resin core material materials covered entirely by low foaming resin cover materials or resin cover materials are used, the method of sending them to the first thickness regulating body is not particularly specified as long as they do not overlap. One possible method is to scatter the shaped foam pieces arbitrarily onto the first thickness regulating body, and then vibrate the first thickness regulating body so that overlaps are eliminated and the shaped foam pieces are distributed evenly.

The use of a reinforcing sheet between the thickness regulating body and the shaped foamable pieces improves the compression strength of the plastic foam material and is desirable. The sheet can comprise material such as glass paper, chopped-strand mats, thermoplastic resin sheets, thermosetting resin sheets, metal sheets, or the like.

If the glass paper or the glass fibers used therein are too heavy, the plastic foam material is too heavy. If they are too light, the strength of the plastic foam material is inadequate. Therefore a weight of from about 10 to about 100 $g/m^2$ is desirable, with 20 to about 50 $g/m^2$ being especially desirable.

The thermoplastic resin used in the thermoplastic resin sheet described above is not particularly specified and can be made from polyethylene, polypropylene, polyethylene terephthalate, or the like. It is desirable to use the same type of polyolefin resin as is used in the plastic foam material so that the sheet and the plastic foam material can adhere well to each other.

The thermosetting resin used in the thermosetting resin sheet described above is similar to the ones used in embodiment 3.

The metal used in the metal sheet described above is similar to the one used in embodiment 3.

Similar to the previous embodiment, if the sheet described above is too thick, the resulting plastic foam material is too heavy. Alternatively, if the sheet is very thin, the plastic foam material is not reinforced adequately. Accordingly, a sheet measuring in thickness from about 0.05 to about 1 mm is preferred, with a thickness of from about 0.1 to about 0.5 mm being optimal.

The details of the method involving supporting the shaped foam pieces between the thickness regulating bodies and applying heat while a fixed distance is maintained between the thickness regulating bodies are not particularly specified as long as the temperature goes above the decomposition point of the thermodecomposing foaming agent forming the high-foaming resin core material and the low-foaming resin cover material.

For example, heat can be applied using an electric heater, a far-infrared radiation heater or a heating device circulating a heating medium such as oil or air.

To reiterate, the plastic foam material of the present embodiment comprises a cover material and a core material, or a thermoplastic resin body and a core material. The cover material and the thermoplastic resin body have a cross-section shaped in the form of a lattice or a honeycomb.

The cover material and the thermoplastic resin are, in relative terms, low foaming or non-foaming, providing superior compression strength. On the other hand, the core material is relatively high foaming, and although compressibility decreases, it is very light. Therefore, in the present embodiment, the cover material and the thermoplastic resin body make up for the shortcomings of the core material, while conversely, the core material makes up for the shortcomings of the cover material or the thermoplastic resin body. This provides a product that is light and has superior compression strength.

The expansion ratio of the core material generally ranges from about 10 to about 50, a range in which lightness is not greatly compromised. Since the expansion ratio of the cover material is lower than that of the core material by a ratio of 5 or more, compression strength is good.

Furthermore, since the cover material and the thermoplastic resin have a cross-section shape of a lattice or honeycomb-shape, the compression strength is further improved.

In the plastic foam material of the present embodiment, the cover material and the thermoplastic resin body form a lattice, providing superior properties such as compression strength. This is the result of the method for making foam bodies of the present embodiment, in which shaped foam pieces, comprising a core material and a cover material covering at least the side surfaces of the core material, are arranged so that their bottom surfaces are on a first thickness regulating body and so that they form a lattice pattern in which adjacent cover materials fuses together.

A second thickness regulating body is arranged above, and foaming takes place while a fixed distance is maintained between the thickness regulating bodies. This makes foaming of the shaped foam piece possible only in the direction parallel to the surfaces of the thickness regulating bodies, and the arrangement is such that the cover materials fuse together.

Furthermore the final foam bodies have improved properties such as compression strength because the cross-section of the cover material and the thermoplastic resin forms a honeycomb shape. This is the result of arranging the shaped foam pieces on the first thickness regulating body so that the center of the bottom surfaces are positioned at the center and the vertices of the hexagons making up an imaginary honeycomb-shape arranged on the first thickness regulating body, and so that adjacent cover materials fuse together when foaming takes place. The second thickness regulating body is then arranged from the top, and heat is applied so that foaming can take place while a fixed interval is maintained between the thickness regulating bodies.

Also, during this process, if the arrangement fulfills the conditions of the equation:

$$R^2 < L^2 < TS/\sqrt{3},$$

the cross-section of the thermoplastic resin body and the core material can form an orderly honeycomb shape, thus improving the properties of the plastic foam material such as the compression strength.

If the shaped foam pieces are shaped as circular columns and are arranged to fulfill the conditions of the equation:

$$4r^2 < L^2 < T'r\pi/\sqrt{3},$$

foaming can take place evenly because of the symmetry of the shaped foam pieces. Thus, an even more orderly honeycomb shape is provided for the cross section of the cover material and the thermoplastic resin body, and the properties of the plastic foam material such as compression strength are improved.

If shaped foam pieces in which the entire surface of the core material is covered by the cover material, there is no need to arrange them on the first thickness regulating body so that their bottom surfaces touch the thickness regulating body, This simplifies the implementation of the embodiment.

The following is a description of the aforementioned embodiment of the present invention, which should be read while referring to the accompanying drawings.

Figure 13:
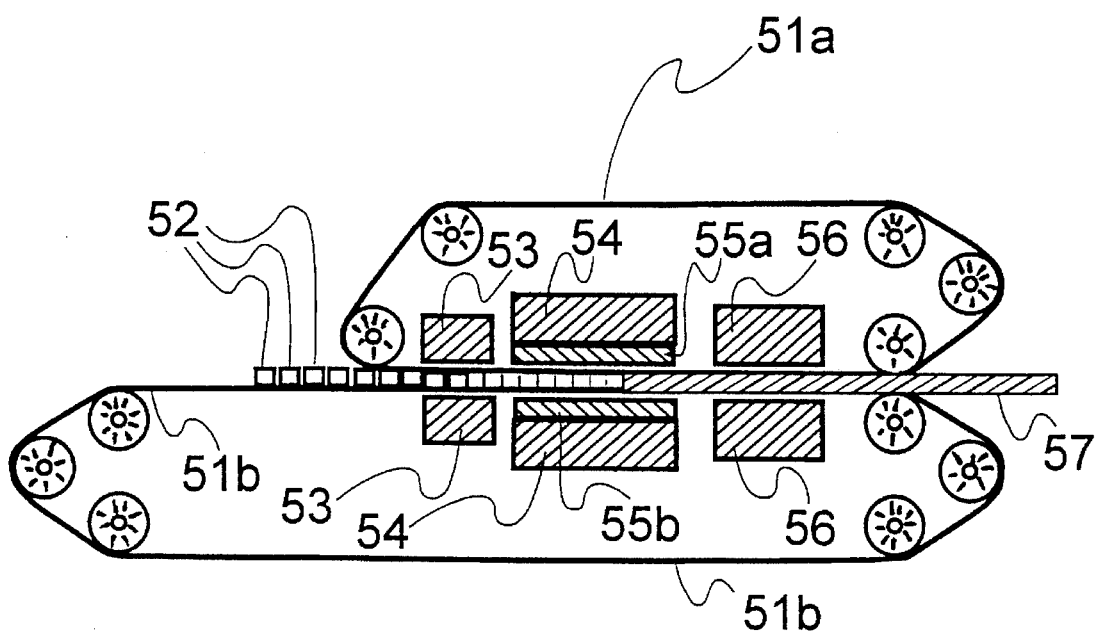
FIG. 13 is a fragmentary side view of an embodiment of a device used to produce foam bodies according to an embodiment of the present invention.

Referring to FIG. 13, there is shown a production device used in the aforementioned embodiment. "Front" or "forward" refers to the rightward direction in the drawing.

Referring to FIG. 13, there are shown two continuous drive belts 51a and 51b. The distance between continuous drive belts 51a, 51b is 25 mm. Lower continuous drive belt 51b extends further toward the rear than upper continuous drive belt 51a. A preheating device 53, a heating device 54, two thickness regulating plates 55a and 55b, and a cooling device 56 are arranged in that order, starting from the back. Thickness regulating plates 55a, 55b are separated by a distance of 27 mm.

EXAMPLE 38

High-density polyethylene exemplified by Mitsubishi Petrochemicals product name EY 40H, polypropylene exemplified by Mitsubishi Petrochemicals product name PY230, silane graft polypropylene exemplified by Mitsubishi Petrochemicals product name XPM 800H, and azodicarbonamide are contained in the amounts shown in Table 6 in the composition forming the high-foaming resin core material. This composition is then fed to a 50 mm diameter single axis extruder, melt-mulled at 180° C., and extruded as a circular strand having a 5 mm diameter circular cross-section. High-density polyethylene exemplified by Mitsubishi Petrochemicals product name EY40H, polypropylene exemplified by Mitsubishi Petrochemicals product name PY230, silane-modified thermoplastic polypropylene exemplified by Mitsubishi Petrochemicals product name XPM800H, and azodicarbonamide are contained in the amounts shown in Table 6 in the composition forming the low foaming resin core material. This composition is then fed to a 25 mm diameter single-axis extruder, melt-mulled at 180° C., and double-extruded with a cross-head die so that it covers the strand described above. A strand with a circular cross-section is extruded, cooled, cut to 25 mm lengths, immersed in water for one hour at 98° C., and dried. This produces a shaped foam piece 52 which is 25 mm high and has a low foaming resin cover material 1.0 mm thick and a high-foaming resin core material 5 mm in diameter.

The resulting shaped foam pieces 52 are placed on lower continuous drive belt 51b in the quantity 1325 g/m² in a lattice arrangement so that the bottom surfaces touch the drive belt and adjacent cover materials fuse together. Shaped foam pieces 52, arranged between continuous drive belts 51a, 51b are heated to 200° C. by preheating device 53. Thickness regulating bodies 55a, 55b maintain a fixed distance between continuous drive belts 51a, 51b while heating device 54 applies 220° C., foaming the foam pieces 52. Cooling device 56 cools to 30° C., resulting in a plastic foam material 57 in which the cross-section of the core material forms a lattice shape.

Table 6 shows the results of measuring the following factors according to the methods described below: the expansion ratios of the core material and the cover material, the bending strength of plastic foam

TABLE 5

|  | Example 34 | Example 35 | Comparative Example 14 | Example 36 | Example 37 | Comparative Example 15 |
|---|---|---|---|---|---|---|
| $d_2$ | 30 | 30 | 30 | 30 | 30 | 30 |
| $d_1$ | 31.07 | 31.16 | 31.2 | 30.93 | 31.92 | 31.2 |
| $d_3$ | 32.07 | 32.16 | 32.20 | 31.93 | 32.02 | 32.20 |
| TI | 15 | 15 | 15 | 15 | 15 | 15 |
| TO | 1 | 1 | 1 | 3 | 3 | 3 |
| Length of center hole (mm) | 9.2 | 2.6 | 0 | 9.3 | 2.9 | 0 |
| Amount of water penetrating (cc) | 18000 | 250 | 0 | 18000 | 300 | 0 |

$d_2$ is inner diameter of inner layer in mm
$d_1$ is inner diameter of outer layer in mm
$d_3$ is outer diameter of outer layer in mm
TI is expansion ratio of inner layer
TO is expansion ratio of outer layer

TABLE 6

|  | Example | | | | | | | | | |
|---|---|---|---|---|---|---|---|---|---|---|
|  | 38 | 39 | 40 | 41 | 42 | 43 | 44 | 45 | 46 | 47 |
| High foaming resin core material layer | | | | | | | | | | |
| High-density polyethylene | 50 | 50 | 50 | 50 | 50 | 50 | 50 | 50 | 50 | 50 |
| Polypropylene | 50 | 50 | 50 | 50 | 50 | 50 | 50 | 50 | 50 | 50 |
| Silane graft polyethylene | 20 | 20 | 20 | 20 | 20 | 20 | 20 | 20 | 20 | 20 |
| Azodicarbonamide | 8 | 8 | 8 | 8 | 8 | 8 | 8 | 8 | 8 | 8 |
| Low foaming resin cover material layer | | | | | | | | | | |
| High-density polyethylene | 50 | 50 | — | — | 50 | 50 | 50 | 50 | 50 | 50 |
| Polypropylene | 50 | 50 | — | — | 50 | 50 | 50 | 50 | 50 | 50 |
| Silane graft polyethylene | 20 | 20 | — | — | 20 | 20 | 20 | 20 | 20 | 20 |
| Azodicarbonamide | 2 | 2 | 2 | 2 | 2 | 2 | 2 | 2 | 2 | 2 |
| Polystyrene | — | — | 100 | 100 | | | | | | |
| Shape of shaped foam pieces | circ. | circ. | circ. | circ. | sq. | sq. | sq. | circ. | circ. | sq. |
| Distribution (g/m²) | 1325 | 1325 | 1325 | 1325 | 1325 | 1280 | 1325 | 1325 | 1325 | 1325 |

TABLE 6-continued

|  | Example | | | | | | | | | |
|---|---|---|---|---|---|---|---|---|---|---|
|  | 38 | 39 | 40 | 41 | 42 | 43 | 44 | 45 | 46 | 47 |
| Glass paper (Yes/No) | N | Y | N | N | N | N | N | N | N | Y |
| Area of core material covered by cover layer | sides | sides | all | all | sides | sides | sides | sides | sides | sides |
| Arrangement of shaped foam pieces | n1 | n1 | n1 | n2 | n3 | n3 | n4 | n3 | n5 | n3 |
| Expansion factor of core layer | 20 | 20 | 20 | 20 | 20 | 20 | 20 | 20 | 20 | 20 |
| Expansion factor of cover layer | 5 | 5 | 5 | 5 | 5 | 12.5 | 5 | 5 | 5 | 5 |
| Bending strength (Kg/cm²) | 8.5 | 18.7 | 9.2 | 9.0 | 8.7 | 8.2 | 9.5 | 8.9 | 9.8 | 20.7 |
| 25% compression strength (kg/cm²) | 2.30 | 2.34 | 5.00 | 4.87 | 4.80 | 2.38 | 5.02 | 4.98 | 5.38 | 4.86 |
| Compression setting (%) | 7.1 | 7.3 | 8.2 | 8.1 | 7.3 | 7.1 | 7.5 | 7.4 | 7.7 | 7.4 |
| Heat conductivity (kcal/mhr °C.) | 0.03 | 0.03 | 0.03 | 0.03 | 0.03 | 0.025 | 0.03 | 0.03 | 0.03 | 0.03 |

Notes n1–n5 are explained at the bottom of Table 8.

material 57, the 25% compression strength, compression setting, and heat conductivity.

The expansion ratio is measured according to JIS K6767. The bending strength is measured according to JIS A9511. The 25% compression strength is measured according to JIS K6767. The compression setting is measured according to JIS K6767. The heat conductivity is measured according to JIS A1413.

EXAMPLE 39

Glass paper exemplified by Oribest Corp. product name FEO-025 is arranged on lower continuous drive belt 5 lb. Shaped foam pieces 52 as obtained in Example 38 are arranged on the glass paper at 1325 g/m² so that the bottom surface touches the glass paper and so that adjacent cover materials fuse together. Glass paper exemplified by Oribest Corp. product name FEO-025 is also arranged between the shaped foam pieces and upper continuous drive belt 51a. Otherwise a plastic foam material 57 with the core material having a lattice-shaped cross-section is obtained in the same way as in Example 38.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 6.

EXAMPLE 40

A composition indicated in Table 6 for a high foaming resin core material, as in Example 38, is fed to a 50 mm diameter single-axis extruder, melt-mulled at 180° C., and extruded as a strand having a circular cross section 5 mm in diameter. The resulting strand is cut in lengths of 25 mm, immersed in water for an hour at 98° C., and then left to dry. This produces a preliminary shaped foam piece 25 mm in height and having a 5 mm diameter.

The preliminary shaped foam piece is immersed for 10 minutes in an organic solvent solution formed by a polystyrene exemplified by Asahi Kasei Kogyo Corp. Ltd. product name GP Staroyn 691 and azodicarbonamide, in the amounts shown in Table 6, dissolved in 30 parts by weight of methylene chloride. This is then dried at 25° C. The process is repeated nine times to produce shaped foam pieces 52 having a low foaming resin cover material 1.00 mm thick.

Resulting foam pieces 52 are processed in the same way as in Example 38 to produce a plastic foam material 57 with the core material cross-section forming a lattice shape.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 6.

EXAMPLE 41

A plastic foam material 57 with the core material cross-section forming a lattice shape is produced in the same manner as in Example 40 except that shaped foam pieces 52 arranged on lower continuous drive belt 51b do not necessarily have their lower surfaces touching continuous drive belt 51b as long as the foam pieces do not overlap.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 6.

EXAMPLE 42

A high-foaming resin core material composition identical to the one in Example 38, as shown in Table 6, is fed to a 50 mm diameter single-axis extruder, melt-mulled at 180° C., and extruded as a strand with a rectangular cross-section having 4 mm sides. A low-foaming resin cover material composition identical to the one in Example 38, as shown in Table 6, is fed to a 25 mm diameter single-axis extruder, melt-mulled at 180° C., co-extruded with a cross head die, cooled, cut into 25 mm lengths, immersed in water at 98° C. for an hour and left out to dry. The result is shaped foam pieces 52 with low-foaming resin cover materials 1.0 mm thick, with high-foaming resin core material materials having square 4 mm×4 mm cross-sections, with a height of 25 mm.

Resulting shaped foam pieces 52 are arranged at 1325 g/m² on lower continuous drive belt 51b so that their bottom surfaces touch the drive belt and so that the center of their bottom surfaces are positioned at the centers and vertices of hexagons that form an imaginary honeycomb arranged on lower continuous drive belt 51b. Shaped foam pieces 52, arranged between continuous drive belts 51a, 51b, are heated by preheating device 53 at 200° C. and then heated by heating device 54 at 220° C. while thickness regulating bodies 55a, 55b maintain a fixed distance between continuous drive belts 51a, 51b to produce foaming. After foaming, cooling device 56 cools the product to 30° C. The result is plastic foam material 57 whose cover materials have a honeycomb-shaped cross-section.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 6.

EXAMPLE 43

Shaped foam pieces 52 are produced according to the same method used in Example 38 except that the amount of azodicarbonamide added to produce the low-foaming resin cover material is 5 parts by weight.

Using these shaped foam pieces 52, plastic foam material 57 with a cover material having a honeycomb-shaped cross-section is produced in the same manner as in example 5 except that a distribution of 1280 g/cm$^2$ is used.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 6.

EXAMPLE 44

Using shaped foam pieces 52 as produced in Example 42, plastic foam material 57 with a cover material having a honeycomb-shaped cross-section is produced in the same manner as in Example 42 except that shaped foam pieces 52 are arranged on lower continuous drive belt 51b so that each shaped foam piece 52 is positioned on a vertex or center of an equilateral hexagon having 13 mm sides making up an imaginary honeycomb arranged on lower belt drive 51b. The length L of the sides of the equilateral hexagons making up the honeycomb is 13 mm, expansion ratio T of the cover material is 20, the area S of the bottom surface of the shaped foam pieces is 17.64 mm$^2$, and the maximum length R of the bottom surface of the shaped foam pieces is 5.93 mm.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 6.

EXAMPLE 45

Using shaped foam pieces 52 as produced in Example 38, plastic foam material 57 with the cover material having a honeycomb-shaped cross-section is produced in the same manner as in example 42.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 6.

EXAMPLE 46

Using shaped foam pieces 52 as produced in Example 38, plastic foam material 57 with the cover material having a honeycomb-shaped cross-section is produced in the same manner as in Example 44. The length L' of the sides of the equilateral hexagons making up the honeycomb is 15 mm, the expansion ratio T' of the cover material is 20, and the radius r of the bottom surface of the shaped foam pieces is 2.6 mm$^2$.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 6.

EXAMPLE 47

Plastic foam material 57 with the cover material having a honeycomb-shaped cross-section is produced in the same manner as in Example 42 except that glass paper exemplified by Oribest Corp. product name FEO-025 is arranged on lower continuous drive belt 51b. Shaped foam pieces 52 as obtained in Example 42 are arranged on the glass paper at 1325 g/m$^2$ so that the bottom surface touches the glass paper and so that adjacent cover materials fuse together. Glass paper exemplified by Oribest Corp. product name FEO-025 is also arranged between the shaped foam pieces 52 and upper continuous drive belt 51a.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 6.

EXAMPLE 48

High-density polyethylene exemplified by Mitsubishi Petrochemicals product name EY 40H, polypropylene exemplified by Mitsubishi Petrochemicals product name PY230, silane-modified thermoplastic polypropylene exemplified by Mitsubishi Petrochemicals product name XPM 800H, and azodicarbonamide are contained, in the amounts shown in Table 8, in the composition forming the high-foaming resin core material. This composition is then fed to a 50 mm diameter single axis extruder, melt-mulled at 180° C., and extruded as a circular strand having a 5 mm diameter circular cross-section. Polypropylene exemplified by Mitsubishi Petrochemicals product name PY230, which makes up the resin core material, is fed to a 25 mm diameter single-axis extruder, melt-mulled at 180° C., and co-extruded with a crosshead die so that it covers the strand described above. A strand with a circular cross-section is extruded, cooled, cut to 25 mm lengths, immersed in water for one hour at 98° C. and dried. This produces a shaped foam piece 52 which is 25 mm high and has a low-foaming resin cover material 1.0 mm thick and a high-foaming resin core material 5 mm in diameter.

TABLE 7

| | Comparative Examples | | | | |
|---|---|---|---|---|---|
| | 16 | 17 | 18 | 19 | 20 |
| High foaming resin core material layer | | | | | |
| High-density polyethylene | 50 | 50 | 50 | 50 | 50 |
| Polypropylene | 50 | 50 | 50 | 50 | 50 |
| Silane graft polyethylene | 20 | 20 | 20 | 20 | 20 |
| Azodicarbonamide | 8 | 3 | 8 | 8 | 3 |
| Low foaming resin cover material layer | | | | | |
| High-density polyethylene | — | 50 | 50 | — | 50 |
| Polypropylene | — | 50 | 50 | — | 50 |
| Silane graft | — | 20 | 20 | — | 20 |

TABLE 7-continued

|  | Comparative Examples | | | | |
|---|---|---|---|---|---|
|  | 16 | 17 | 18 | 19 | 20 |
| polyethylene |  |  |  |  |  |
| Azodicarbonamide | — | 2 | 7 | — | 2 |
| Shape of shaped foam pieces | circ. | circ. | circ. | sq. | circ. |
| Distribution (g/m²) | 1250 | 3420 | 1260 | 1250 | 3420 |
| Glass paper (Yes/No) | N | N | N | N | N |
| Area of core material covered by cover layer | sides | sides | sides | sides | sides |
| Arrangement of shaped foam pieces | n1 | n1 | n1 | n3 | n3 |
| Expansion ratio of core layer | 20 | 7.5 | 20 | 20 | 7.5 |
| Expansion ratio of cover layer | — | 5 | 17.5 | — | 5 |
| Bending strength (kg/cm²) | 6.5 | 12.8 | 7.2 | 6.5 | 12.8 |
| 25% compression strength (kg/cm²) | 1.23 | 9.07 | 1.39 | 1.23 | 9.39 |
| Compression setting (%) | 6.1 | 14.5 | 6.5 | 6.1 | 15.8 |
| Heat conductivity (kcal/mhr °C.) | 0.02 | 0.04 | 0.025 | 0.02 | 0.04 | n1: Bottom surfaces touch the first thickness regulating body.
n2: Mounted at centers and vertices of hexagons forming an imaginary honeycomb on the first thickness regulating body.

EXAMPLE 49

A plastic foam material with a thermoplastic resin having a lattice-shaped cross-section is produced in the same manner as in Example 39 except that shaped foam pieces 52 obtained from Example 48 are used.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 8.

EXAMPLE 50

The high-foaming resin core material composition from example 48, as shown in Table 8, is fed to a 50 mm diameter single-axis extruder, melt-mulled at 180° C., extruded as a strand having a circular cross-section 5 mm in diameter, cut in 25 mm lengths, immersed in water for one hour at 98° C. and left to dry. This produces preliminary shaped foam pieces 5 mm in diameter and 25 mm high.

The resulting preliminary shaped foam pieces are immersed for 10 minutes in an organic solvent solution, in which 100 parts by weight of polystyrene exemplified by Asahi Kasei Kogyo Corp. Ltd. product name GP Staroyn 691 is dissolved in 30 parts by weight of methylene chloride. This is then dried at 25° C. The process is repeated nine

TABLE 8

|  | Example | | | | | | | | |
|---|---|---|---|---|---|---|---|---|---|
|  | 48 | 49 | 50 | 51 | 52 | 53 | 54 | 55 | 56 |
| High foaming resin core material layer |  |  |  |  |  |  |  |  |  |
| High-density polyethylene | 50 | 50 | 50 | 50 | 50 | 50 | 50 | 50 | 50 |
| Polypropylene | 50 | 50 | 50 | 50 | 50 | 50 | 50 | 50 | 50 |
| Silane graft polyethylene | 20 | 20 | 20 | 20 | 20 | 20 | 20 | 20 | 20 |
| Azodicarbonamide | 8 | 8 | 8 | 8 | 8 | 8 | 8 | 8 | 8 |
| Shape of shaped foam pieces | circ. | circ. | circ. | circ. | sq. | sq. | circ. | circ. | sq. |
| Distribution (g/m²) | 1325 | 1325 | 1325 | 1325 | 1325 | 1325 | 1325 | 1325 | 1325 |
| Glass paper (Yes/No) | N | Y | N | N | N | N | N | N | Y |
| Area of core material covered by cover layer | sides | sides | all | all | sides | sides | sides | sides | sides |
| Arrangement of shaped foam pieces | n1 | n1 | n1 | n2 | n3 | n4 | n3 | n5 | n3 |
| Expansion ratio of core layer | 20 | 20 | 20 | 20 | 20 | 20 | 20 | 20 | 20 |
| Bending strength (Kg/cm²) | 9.3 | 20.9 | 10.5 | 10.2 | 9.5 | 10.3 | 9.8 | 10.0 | 23.8 |
| 25% compression strength (kg/cm²) | 2.81 | 2.82 | 6.22 | 6.08 | 5.72 | 6.21 | 6.20 | 6.51 | 6.09 |
| Compression setting (%) | 7.5 | 7.6 | 10.1 | 10.1 | 7.6 | 7.9 | 7.7 | 10.2 | 7.7 |
| Heat conductivity (kcal/mhr °C.) | 0.04 | 0.04 | 0.04 | 0.04 | 0.04 | 0.04 | 0.04 | 0.04 | 0.04 | n1: Bottom surfaces touch first thickness regulating body.
n2: No overlapping of shaped foam pieces occurs.
n3: Mounted at centers and vertices of hexagons forming an imaginary honeycomb on the first thickness regulating body.
n4: Same as n3, except hexagons are equilateral and $R^2 \leq L^2 \leq TS/h3$.
n5: Same as n3, except hexagons are equilateral and $4r^2 \leq L'^2 \leq T'\pi/h3$.

Using these shaped foam pieces 52, plastic foam material 57 with a thermoplastic resin body having a lattice-shaped cross-section is produced in the same manner as in Example 38.

The expansion ratios of the cover material and the core material making up final plastic foam material 57, the bending strength of plastic foam material 57, 25 percent compression strength, compression setting and heat conductivity were measured using the same methods as in Example 38, and the results are shown in Table 8.

times to produce shaped foam pieces 52 with a 1.0 mm thick resin cover material.

Using resulting shaped foam pieces 52, plastic foam material 57 with a thermoplastic resin body having a lattice-shaped cross-section is produced in the same manner as in Example 38.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 8.

EXAMPLE 51

Plastic foam material 57 with a thermoplastic resin body having a lattice-shaped cross-section is produced in the same manner as in example 4 except for the use of shaped foam pieces 52 obtained from Example 50.

The expansion ratios of the core material making up final plastic foam material 57, the bending strength of plastic foam material 57, the 25% compression strength, the compression setting, and the heat conductivity are measured using the same methods as in Example 38, and the results are shown in Table 8.

EXAMPLE 52

The high-foaming resin core material composition from Example 48, as shown in Table 8, is fed to a 50 mm diameter single-axis extruder, melt-mulled at 180° C., extruded as a strand having a square cross-section with 4 mm sides, cut in 25 mm lengths, immersed in water for one hour at 98° C. and left to dry. This produces shaped foam pieces having 1.0 mm thick low-foaming resin cover materials, high-foaming resin core material materials with 4 mm×4 mm square cross sections, and heights of 25 mm.

Plastic foam material 57 with a thermoplastic resin body having a honeycomb-shaped cross-section is produced in the same manner as in Example 42 except that shaped foam pieces 52 described above are used.

The expansion ratios of the core material and the cover material making up final plastic foam material 57, the bending strength of plastic loam material 57, the 25% compression strength, the compression setting, and the heat conductivity are measured using the same methods as in Example 38, and the results are shown in Table 8.

EXAMPLE 53

Plastic foam material 57 with a thermoplastic resin body having a honeycomb-shaped cross-section is produced in the same way as described in Example 44 except for the use of shaped foam pieces 52 obtained from Example 52.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 8.

EXAMPLE 54

Plastic foam material 57 with a thermoplastic resin body having a honeycomb-shaped cross-section is produced in the same way as described in Example 45 except for the use of shaped foam pieces 52 obtained from Example 48.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 8.

EXAMPLE 55

Plastic foam material 57 with a thermoplastic resin body having a honeycomb-shaped cross-section is produced in the same way as described in Example 56 except for the use of shaped foam pieces 52 obtained from Example 48.

The expansion ratios of the core material and the cover material making up final plastic foam material 57, the bending strength of plastic foam material 57, the 25% compression strength, the compression setting, and the heat conductivity are measured using the same methods as in Example 38, and the results are shown in Table 8.

EXAMPLE 56

Plastic foam material 57 with a thermoplastic resin body having a honeycomb-shaped cross-section is produced in the same manner as in Example 52 except that glass paper exemplified by Oribest Corp. product name FEO-025 is arranged on lower continuous drive belt 51b. Shaped foam pieces 52 as obtained in example 15 are arranged as in example 15. Glass paper exemplified by Oribest Corp. product name FEO-025 is also arranged between the shaped foam pieces 52 and upper continuous drive belt 51a.

The expansion ratios of the core material making up final plastic foam material 57, the bending strength of plastic foam material 57, the 25% compression strength, the compression setting, and the heat conductivity are measured using the same methods as in Example 38, and the results are shown in Table 8.

COMPARATIVE EXAMPLE 16

High-density polyethylene exemplified by Mitsubishi Petrochemicals product name 40H, polypropylene exemplified by Mitsubishi Petrochemicals product name PY230, silane-modified thermoplastic polypropylene exemplified by Mitsubishi Petrochemicals product name XPM 800H, and azodicarbonamide are fed to a 50 mm diameter single-axis extruder in the amounts shown in Table 7, melt-mulled at 180° C., extruded as a strand having a circular cross-section 5.2 mm in diameter, cut to 25 mm lengths. The results are preliminary shaped foam pieces 5.2 mm in diameter and 25 mm high.

Using these preliminary shaped foam pieces, a plastic foam material is obtained in the same manner as in Example 38 except that the distribution was set to 1250 g/m$^2$.

The expansion ratio of the core material making up the plastic foam material, the bending strength of the plastic foam material, the 25% compression strength, the compression setting, and the heat conductivity are measured using the same methods as in Example 38, and the results are shown in Table 7.

COMPARATIVE EXAMPLE 17

Shaped foam pieces were obtained in the same manner as in Example 38 except that for 50 parts by weight of high-density polyethylene, 3 parts by weight of azodicarbonamide were added to form the high-foaming resin core material.

A plastic foam material was obtained in the same manner as in Example 38 except that the distribution of the shaped foam pieces was set to 3420 g/m$^2$.

The expansion ratios of the core material and the cover material making up the plastic foam material, the bending strength of the plastic foam material, the 25% compression strength, the compression setting, and the heat conductivity are measured using the same methods as in Example 38, and the results are shown in Table 7.

COMPARATIVE EXAMPLE 18

Shaped foam pieces are obtained in the same manner as in Example 38 except that for 50 parts by weight of high-density polyethylene, 7 parts by weight of azodicarbonamide are added to form the low-foaming resin cover material.

A plastic foam material is obtained in the same manner as in Example 38 except that the shaped foam pieces are distributed at 1260 g/m$^2$.

The expansion ratios of the core material and the cover material making up the plastic foam material, the bending strength of the plastic foam material, the 25% compression strength, the compression setting, and the heat conductivity are measured using the same methods as in Example 38, and the results are shown in Table 7.

COMPARATIVE EXAMPLE 19

High-density polyethylene exemplified by Mitsubishi Petrochemicals product name 40H, polypropylene exemplified by Mitsubishi Petrochemicals product name PY230, silane-modified thermoplastic polypropylene exemplified by Mitsubishi Petrochemicals product name XPM 800H, and azodicarbonamide are fed to a 50 mm diameter single-axis extruder in the amounts shown in Table 7, melt-mulled at 180° C., extruded as a strand having a 4.2 mm×4.2 mm square cross-section, and cut to 25 mm lengths. The results are preliminary shaped foam pieces 25 mm high.

Using these preliminary shaped foam pieces, a plastic foam material is obtained in the same manner as in example 5 except that the distribution was set to 1250 g/m$^2$.

The expansion ratio of the core material making up the plastic foam material, the bending strength of the plastic foam material, the 25% compression strength, the compression setting, and the heat conductivity are measured using the same methods as in Example 38, and the results are shown in Table 7.

COMPARATIVE EXAMPLE 20

Using shaped foam pieces obtained from Comparative Example 17, a plastic foam material is obtained in the same manner as in Example 42 except that the shaped foam pieces are distributed at 3420 g/cm$^2$.

The expansion ratios of the core material and the cover material making up the plastic foam material, the bending strength of the plastic foam material, the 25% compression strength, the compression setting, and the heat conductivity are measured using the same methods as in Example 38, and the results are shown in Table 7.

Referring to Table 6, the final foam bodies have superior compression strength, bending strength. Furthermore, when shaped foam pieces are arranged so that they are positioned at the vertices and centers of the hexagons making up a imaginary honeycomb, further improvements in the plastic foam material's compression strength and bending strength are obtained.

The composition of the present invention is as described above. The plastic foam material of the present comprises a core material having a relatively high expansion ratio and a cover material having a relatively low expansion ratio or a non-foaming thermoplastic resin. Each lattice or hexagonal space in the cover material or thermoplastic resin is formed integrally with the core material.

Because the cover material and the thermoplastic resin body have cross-sections shaped as lattices or honeycombs, the plastic foam material of the present invention provides superior compression strength. The core material is light and has good heat-insulating properties. Also, since the cover material and the core material are formed integrally in the present invention, lightness, compression strength, heat-insulating properties, as well as resilience are better than is possible by using the cover material, the core material, or the thermoplastic resin by themselves.

Also, by using the method for making foam bodies according to the present invention, it is possible to produce the foam bodies having the advantages described above very easily.

The raw material and the reagents used are listed below:
(1) Thermoplastic resins (un-cross-linked)

High density polyethylene 1: manufactured by Mitsubishi Petrochemical Company, Limited; commercial name EY40H; density 0.954 g/cm$^3$; melt index 1.5 g per 10 minutes.

High density polyethylene 2: manufactured by Mitsubishi Petrochemical Company, Limited; commercial name PY20A; density 0.951 g/cm$^3$; melt index 9 g per 10 minutes.

High density polyethylene 3: manufactured by Idemitsu Petrochemical Company, Limited; commercial name 130J; density 0.956 g/cm$^3$; melt index 11 g per 10 minutes.

High density polyethylene 4: manufactured by Mitsubishi Petrochemical Company, Limited; commercial name JX20; density 0.954 g/cm$^3$; melt index 20 g per 10 minutes.

High density polyethylene 5: manufactured by Mitsubishi Petrochemical Company, Limited; commercial name BZ50A; density 0.953 g/cm$^3$; melt index 0.35 g per 10 minutes.

High density polyethylene 6: manufactured by Mitsubishi Petrochemical Company, Limited; commercial name HY330B; density 0.952 g/cm$^3$; melt index 0.6 g per 10 minutes.

Polypropylene 1: manufactured by Mitsubishi Petrochemical Company, Limited; commercial name MH6; density 0.90 g/cm$^3$; melt index 1.2 g per 10 minutes.

Polypropylene 2: manufactured by Mitsubishi Petrochemical Company, Limited; commercial name MA3; density 0.90 g/cm$^3$; melt index 11 g per 10 minutes.

Polypropylene 3: manufactured by Mitsubishi Petrochemical Company, Limited; commercial name BC5C; density 0.90 g/cm$^3$; melt index 2.8 g per 10 minutes; containing 8–10 parts by weight of ethylene component.

Ethylene-vinyl acetate copolymer: manufactured by Mitsubishi Petrochemical Company, Limited; commercial name V113K; density 0.925 g/cm$^3$; melt index 3 g per 10 minutes.

Polystyrene: manufactured by Asahi Kasei Company, Limited; commercial name 681; density 1.05 g/cm$^3$; melt index 3 g per 10 minutes.

(2) Silane-modified thermoplastic resins

Silane-modified, cross-linked, polyethylene: manufactured by Mitsubishi Petrochemical Company, Limited; commercial name LINKLON HM-600; melt index 10 g per 10 minutes; gel fraction after cross-linking 60 parts by weight.

Silane-modified, cross-linked, polypropylene: manufactured by Mitsubishi Petrochemical Company, Limited; commercial name LINKLON XPM-800HM; melt index 11 g per 10 minutes; gel fraction after cross-linking 80 parts by weight.

(3) Cross-linking catalyst

Dibutyl tin dilaurate (4) Foaming Agent

Azodicarbonamide: manufactured by Otsuka Chemical Company, Limited; commercial name SO-20; decomposition temperature 201° C.

Having described preferred embodiments of the invention with reference to the accompanying drawings, it is to be understood that the invention is not limited to those precise embodiments, and that various changes and modifications may be effected therein by one skilled in the art without departing the scope or spirit of the invention as defined in the appended claims.

What is claimed:

1. A plastic foam material comprising:
   100 parts by weight of at least two substantially incompatible thermoplastic resins selected from the group consisting of polyethylene, polypropylene, ethylene-propylene copolymer, ethylene-vinyl acetate copolymer, and polystyrene;
   from about 1 to about 50 parts by weight of a silane-modified thermoplastic resin of the same polymer type as at least one of said two substantially incompatible resins;
   from about 0.001 to about 2.5 parts by weight of a cross-linking catalyst effective to cross-link said silane-modified thermoplastic resin; and
   from about 1 to about 20 parts by weight of a foaming agent.

2. The plastic foam material of claim 1, wherein said polypropylene comprises at least one member selected from the group consisting of a homopolypropylene, block polypropylene, and random polypropylene.

3. The plastic foam material of claim 1, wherein said at least two substantially incompatible resins are selected from the group consisting of polyethylene, polypropylene, and polystyrene.

4. The plastic foam material of claim 1, wherein:
   said polyethylene has a degree of polymerization of from about 500 to about 6000;
   said polypropylene has a degree of polymerization of from about 800 to about 12,000; and
   said polystyrene has a degree of polymerization of from about 250 to about 5,000.

5. The plastic foam material of claim 1, wherein said at least two substantially incompatible thermoplastic resins have a melt index of from about 0.1 to about 50 g per 10 minutes.

6. The plastic foam material of claim 1, wherein a density of said polyethylene is at least 0.91 g/cm$^3$; and
   a density of said polypropylene is at least 0.89 g/cm$^3$.

7. The plastic foam material of claim 1, wherein a density of said ethylene-vinyl acetate copolymer is from about 0.92 g/cm$^3$ to about 0.95 g/cm$^3$; and
   said density of polystyrene is at least 1.04 g/cm$^3$ to about 1.60 g/cm$^3$.

8. The plastic foam material of claim 1, wherein a difference in melt index between said two substantially incompatible thermoplastic resins is from about 3 to about 15 g per 10 minutes.

9. The plastic foam material of claim 1, wherein a gel fraction of said silane-modified thermoplastic resin, after cross-linking, is from about 60 to about 85 parts by weight.

10. The plastic foam material of claim 1, wherein said silane-modified thermoplastic resin is at least one member selected from the group consisting of silane-modified thermoplastic resin of polyethylene, silane-modified thermoplastic resin of polypropylene, silane-modified thermoplastic resin of an ethylene-vinyl acetate copolymer, and silane-modified thermoplastic resin of polystyrene.

11. The plastic foam material of claim 1, wherein said silane-modified thermoplastic resin further comprises at least one member selected from the group consisting of silane-modified thermoplastic resin of polyethylene, polypropylene, and polystyrene.

12. The plastic foam material of claim 1, wherein said silane-modified thermoplastic resin comprises a thermoplastic resin modified by an unsaturated silane compound by modified thermoplastic polymerization.

13. The plastic foam material of claim 12, wherein said unsaturated silane compound further comprises a member represented by the following formula:

$$R'SiR''_m Y_{3-m}.$$

where,
R' comprises at least one member selected from the group consisting of an alkenyl group, a glycidyl group, an amino group, a methacrylic group and a halogenated alkyl group, wherein said alkenyl group contains from 2 to 6 carbon atoms and said alkyl group contains from 1 to 10 carbon atoms:

R'' comprises at least one member selected from the group consisting of an alkyl group and an aryl group;

m represents one of 0, 1, or 2; and

Y represents a hydrolyzable organic group.

14. The plastic foam material of claim 13, wherein said unsaturated silane compound comprises at least one member represented by the following formula:

$$CH_2=CHSi(OA)_3$$

where,
A comprises a hydrocarbon group with 1 to 8 carbon atoms.

15. The plastic foam material of claim 14, wherein said A comprises a hydrocarbon group containing from 1 to 4 carbon atoms.

16. The plastic foam material of claim 14, wherein said unsaturated silane compound is at least one member selected from the group consisting of vinyl trimethoxysilane, vinyl triethoxysilane, and vinyl triacetoxysilane.

17. The plastic foam material of claim 1, wherein said cross-linking catalyst comprises at least one member selected from the group consisting of a dibutyl tin diacetate, dibutyl tin dilaurate, dioctyl tin dilaurate, tin octanoate, tin oleate, lead octanoate, 2-ethyl hexane zinc, cobalt octanoate, lead naphtenate, zinc caprylate, and zinc stearate.

18. The plastic foam material of claim 1, wherein said foaming agent decomposes at sufficiently high temperatures.

19. The plastic foam material of claim 1, wherein said foaming agent comprises at least one member selected from the group consisting of an azodicarbonamide (1,1'-azobis-formamide), azobisisobutylonitrile, N,N'-dinitrosopentamethylene tetramine, 4,4-oxybis(benzene sulfonyl hydrazide)

barium azodicarboxylate, trihydrazinotriazine, benzene sulfonyl hydrazide, toluene sulfonyl hydrazide.

20. The plastic foam material of claim 1, wherein said foaming agent comprises azodicarbonamide.

21. The plastic foam material of claim 1 further comprising:

from about 1 to about 20 parts by weight of a glass fiber effective to improve strength and dimensional stability of said plastic foam material.

22. The plastic foam material of claim 21, wherein said glass fiber has a diameter of from about 5 µm to about 30 µm.

23. The plastic foam material of claim 1, wherein said silane-modified thermoplastic resin is present in an amount of from about 5 to about 40 parts by weight.

24. A plastic foam material comprising:

100 parts by weight of at least two thermoplastic resins selected from the group consisting of a polyethylene, polypropylene, and ethylene-propylene copolymer;

from about 1 to about 50 parts by weight of a silane-modified thermoplastic resin of the same polymer type as at least one of said two resins;

from about 0.001 to about 2.5 parts by weight of a cross-linking catalyst effective to cross-link said silane-modified thermoplastic resin; and from about 1 to about 20 parts by weight of a foaming agent.

25. The plastic foam material of claim 24, wherein:

said polyethylene has a degree of polymerization of from about 1000 to about 10,000;

said polypropylene has a degree of polymerization of from about 5,000 to about 12,000; and said ethylene-propylene copolymer has a degree of polymerization of from about 8,000 to about 10,000.

26. The plastic foam material of claim 24, wherein:

said polyethylene has a melt index of from about 0.6 to about 20 g/10 minutes;

said polypropylene has a melt index of from about 2 to about 25 g/10 minutes; and said ethylene-propylene copolymer has a melt index of from about 3 to about 8 g/10 minutes.

27. The plastic foam material of claim 24, wherein:

a density of polyethylene is at least 0.91 g/cm$^3$;

a density of polypropylene is at least 0.89 g/cm$^3$; and a density of ethylene-propylene copolymer is at least 0.90 g/cm$^3$.

28. The plastic foam material of claim 24, wherein an ethylene content in said uncross-linked mixture is from about 20 to about 80 parts by weight.

29. The plastic foam material of claim 24, wherein said silane-modified thermoplastic resin comprises at least one member selected from the group consisting of silane-modified thermoplastic polyethylene, a silane-modified thermoplastic polypropylene, and a silane-modified thermoplastic ethylene-propylene copolymer.

30. The plastic foam material of claim 29, wherein said silane-modified thermoplastic resin comprises a thermoplastic resin modified by an unsaturated silane compound by graft polymerization.

31. The plastic foam material of claim 30, wherein said silane-modified thermoplastic resin is prepared by reacting a polyethylene with one of a silane compound and an organic peroxide.

32. The plastic foam material of claim 31, wherein said silane compound is represented by the following formula:

where,

R represents an organic functional group that comprises at least one member selected from the group consisting of an alkenyl group, a glycidyl group, an amino group, a methacrylic group, and a halogenated alkyl group, wherein said alkenyl group contains from 2 to 6 carbon atoms and said alkyl group contains from 1 to 10 carbon atoms;

Y represents an hydrolyzable organic group, and

R' represents one of a R group or a Y group as defined above.

33. The plastic foam material of claim 24, wherein said silane-modified thermoplastic resin is present in an amount of from about 5 to about 40 parts by weight.

34. The plastic foam material of claim 24, said cross-linking catalyst comprises at least one member selected from the group consisting of a dibutyl tin diacetate, dibutyl tin dilaurate, dioctyl tin dilaurate, tin octanoate, tin oleate, lead octanoate, 2-ethyl hexane zinc, cobalt octanoate, lead naphtenate, zinc caprylate, and zinc stearate.

35. The plastic foam material of claim 24, wherein said foaming agent decomposes at sufficiently high temperatures.

36. The plastic foam material of claim 24, wherein said foaming agent comprises at least one member selected from the group consisting of an azodicarbonamide, azobisisobutylonitrile, N,N'-dinitrosopentamethylene tetramine, 4,4-oxybis(benzene sulfonyl hydrazide) barium azodicarboxylate, trihydrazinotriazine, benzene sulfonyl hydrazide, toluene sulfonyl hydrazide.

37. The plastic foam material of claim 24, wherein said foaming agent includes Azodicarbonamide.

38. The plastic foam material of claim 24 further comprising:

from about 1 to about 20 parts by weight of a glass fiber effective to improve strength and dimensional stability of said plastic foam material.

39. The plastic foam material of claim 38, wherein said glass fiber has a diameter of from 5 µm to about 30 µm.

40. The plastic foam material of claim 38, wherein said glass fibre is at least 3 mm long.

* * * * *

UNITED STATES PATENT AND TRADEMARK OFFICE
CERTIFICATE OF CORRECTION

PATENT NO. : 5,552,448
DATED : September 3, 1996
INVENTOR(S) : Tomoyuki KOBAYASHI, et al.

It is certified that an error appears in the above-identified patent and that said Letters Patent is hereby corrected as shown below:

Column 29, line 54, change $<$ to $\leq$.

Column 29, line 54, change $\varnothing_2/\varnothing_3)$ to $(\varnothing_2/\varnothing_3)'$.

Column 31, line 48, change $<$ to $\leq$.
Column 46, line 14, change $\sqrt{}/3$ to $\sqrt{3}$.
Column 46, line 14, change $<$ to $\leq$ twice.
Column 46, line 31, change $\sqrt{}/3$ to $\sqrt{3}$.
Column 46, line 31, change $<$ to $\leq$ twice.
Column 48, line 9, change $<$ to $\leq$ twice.
Column 48, line 18, change $<$ to $\leq$ twice.
Table 8, note 4, change $\hbar 3$ to $\sqrt{3}$.
Table 8, note 5, change $\hbar 3$ to $\sqrt{3}$.

Signed and Sealed this

Twenty-ninth Day of September, 1998

Attest:

BRUCE LEHMAN

*Attesting Officer*     Commissioner of Patents and Trademarks